(12) United States Patent
Suzuki et al.

(10) Patent No.: US 9,732,264 B2
(45) Date of Patent: Aug. 15, 2017

(54) HEAT STORAGE MATERIAL COMPOSITION AND METHOD FOR USING HEAT STORAGE MATERIAL COMPOSITION

(71) Applicant: Panasonic Corporation, Osaka (JP)

(72) Inventors: Motohiro Suzuki, Osaka (JP); Izumi Hirasawa, Tokyo (JP)

(73) Assignee: PANASONIC CORPORATION, Osaka (JP)

( * ) Notice: Subject to any disclaimer, the term of this patent is extended or adjusted under 35 U.S.C. 154(b) by 238 days.

(21) Appl. No.: 14/496,235

(22) Filed: Sep. 25, 2014

(65) Prior Publication Data

US 2015/0090422 A1 Apr. 2, 2015

(30) Foreign Application Priority Data

Sep. 30, 2013 (JP) ................................. 2013-203933
Jun. 20, 2014 (JP) ................................. 2014-127111

(51) Int. Cl.
| | | |
|---|---|---|
| C09K 5/00 | (2006.01) | |
| C09K 5/10 | (2006.01) | |
| C09K 5/06 | (2006.01) | |
| F28D 20/00 | (2006.01) | |
| C09K 5/20 | (2006.01) | |

(52) U.S. Cl.
CPC ............... *C09K 5/10* (2013.01); *C09K 5/063* (2013.01); *C09K 5/066* (2013.01); *F28D 20/0056* (2013.01); *C09K 5/20* (2013.01)

(58) Field of Classification Search
CPC ............ C09K 5/00; C09K 5/06; C09K 5/063; C09K 5/066; C09K 5/20

USPC .......................................................... 252/71
See application file for complete search history.

(56) References Cited

U.S. PATENT DOCUMENTS

| 3,977,202 A | * | 8/1976 | Forusz | ................... | A61F 7/106 |
| | | | | | 206/219 |
| 4,331,556 A | | 5/1982 | Arrhenius | | |
| 4,388,203 A | * | 6/1983 | Nimerick | ............... | C09K 3/185 |
| | | | | | 106/13 |

(Continued)

FOREIGN PATENT DOCUMENTS

| EP | 0 210 954 | 2/1987 |
| EP | 0 309 227 | 3/1989 |

(Continued)

OTHER PUBLICATIONS

Extended European Search Report issued Feb. 2, 2015 in corresponding European Patent Application No. 14186823.2.

*Primary Examiner* — Jane L Stanley
(74) *Attorney, Agent, or Firm* — Wenderoth, Lind & Ponack, L.L.P.

(57) ABSTRACT

A heat storage material composition contains sodium acetate, water, and an organic compound comprising a hydrophobic group and a hydrophilic group. A weight ratio R (sodium acetate/water) of the sodium acetate to the water is 57/43 or less. A concentration Ws of the sodium acetate in three components of the sodium acetate, the water, and the organic compound comprising a hydrophobic group and a hydrophilic group is 52% by weight or more. A concentration Wa of the organic compound comprising a hydrophobic group and a hydrophilic group in the three components is 1% by weight or more.

2 Claims, 10 Drawing Sheets

(56) References Cited

U.S. PATENT DOCUMENTS

| | | | | |
|---|---|---|---|---|
| 4,439,337 | A | * | 3/1984 | Nimerick .................. C09K 3/18 106/13 |
| 4,503,838 | A | * | 3/1985 | Arrhenius ............... C09K 5/063 126/263.03 |
| 4,533,483 | A | * | 8/1985 | Watson ................... C09K 5/063 126/263.03 |
| 4,561,989 | A | * | 12/1985 | Wada ..................... C09K 5/063 126/400 |
| 4,696,338 | A | * | 9/1987 | Jensen .................. F28D 20/025 165/10 |
| 4,849,121 | A | | 7/1989 | Dinter |
| 5,065,598 | A | * | 11/1991 | Kurisu .................... C09K 5/063 62/330 |
| 5,329,096 | A | * | 7/1994 | Suematsu ............ A47C 21/048 219/217 |
| 5,402,650 | A | * | 4/1995 | Stewart, Jr. ............ C09K 5/063 62/347 |
| 2002/0177886 | A1 | | 11/2002 | Sharma et al. |
| 2003/0168625 | A1 | * | 9/2003 | Sapienza ................ C09K 3/185 252/70 |
| 2008/0302997 | A1 | * | 12/2008 | Oota ...................... C09K 3/185 252/70 |
| 2012/0126166 | A1 | * | 5/2012 | Wang ..................... C09K 3/185 252/70 |
| 2016/0168438 | A1 | * | 6/2016 | Harding ................. C09K 5/063 131/329 |

FOREIGN PATENT DOCUMENTS

| | | |
|---|---|---|
| JP | 61-009484 | 1/1986 |
| JP | 62-205184 | 9/1987 |
| JP | 02-092986 | 4/1990 |
| JP | 03-041185 | 2/1991 |
| JP | 04-324092 | 11/1992 |
| JP | 2001-031956 | 2/2001 |
| JP | 2001-139939 | 5/2001 |
| JP | 2007-112865 | 5/2007 |
| JP | 2008-020177 | 1/2008 |
| JP | 2008-063487 | 3/2008 |
| JP | 5013499 | 8/2012 |
| JP | 5140255 | 2/2013 |
| WO | 84/01167 | 3/1984 |
| WO | 2014/024883 | 2/2014 |

* cited by examiner

HEAT STORAGE MATERIAL COMPOSITION AND METHOD FOR USING HEAT STORAGE MATERIAL COMPOSITION

BACKGROUND OF THE INVENTION

1. Field of the Invention

The present disclosure relates to a heat storage material composition and a method for using a heat storage material composition.

2. Description of the Related Art

In the case where thermal energy is used for industrial or domestic purposes, the amount of thermal energy used or the timing at which thermal energy is to be used is often different from the amount of thermal energy generated or the timing at which thermal energy is generated. Therefore, in order to effectively utilize all the heat that has been generated, the use of a medium that temporarily stores thermal energy, that is, a so-called "heat storage material", has been proposed.

Heat storage materials are broadly divided into sensible heat storage materials and latent heat storage materials. Latent heat storage materials utilize a phase change such as fusion of a substance. Latent heat storage materials are advantageous in that a temperature at which heat is extracted is stable because the thermal storage density is higher than that of sensible heat storage materials and a phase-change temperature is constant. Accordingly, latent heat storage materials have been practically used. Heat storage using a latent heat storage material is performed as follows. In the case where heat is stored, the latent heat storage material is heated so as to be in a liquid state. Subsequently, the latent heat storage material is preserved while the temperature is maintained so as to maintain the liquid state. Heat stored in the preserved latent heat storage material can be extracted by crystallizing (coagulating) the latent heat storage material when needed.

Among such latent heat storage materials, sodium acetate trihydrate has a relatively large latent heat of fusion and thus is known as a substance that can efficiently store heat with a small volume. Sodium acetate trihydrate does not exhibit toxicity and is a safe substance. For example, Japanese Unexamined Patent Application Publication No. 2008-20177 (Patent Literature 1) discloses a system in which sodium acetate trihydrate is used as a heat storage material. Japanese Patent No. 5013499 (Patent Literature 2) discloses that sodium acetate trihydrate is used in a slurry for transportation of latent heat, the slurry being used in thermal equipment or the like.

The following is known about sodium acetate trihydrate. At the time of fusion, sodium acetate trihydrate is fused at a temperature (melting point) that is intrinsic to the substance. However, at the time of coagulation, sodium acetate trihydrate does not coagulate and is in a so-called supercooled state (supercooled liquid state) even at a temperature lower than the melting point.

Consequently, it has been proposed that sodium acetate trihydrate be used as a heat storage material, and the heat storage material that has been heated and has been in a liquid state be preserved in the supercooled state. At the time of heat dissipation, heat stored in the heat storage material can be extracted by breaking the supercooled state.

A heat storage material composition whose stability of the supercooled state can be enhanced, the composition being used in such a method for storing heat utilizing the supercooled state, has been proposed. For example, Japanese Unexamined Patent Application Publication No. 61-9484 (Patent Literature 3) has proposed a heat storage material composition obtained by adding salt-resistant carboxymethyl cellulose to sodium acetate trihydrate. Patent Literature 3 further describes that this heat storage material composition in the supercooled state can be stably preserved in an environment at room temperature. Japanese Unexamined Patent Application Publication No. 4-324092 (Patent Literature 4) has proposed a heat storage material composition obtained by adding 10% to 30% by weight of pure water to sodium acetate trihydrate. Patent Literature 4 further describes that the supercooled state of this heat storage material composition can be stabilized in a low-temperature environment of −13° C. or lower.

SUMMARY OF THE INVENTION

In some uses of a system in which a heat storage material composition is used or in some environments in which such a system is used, it has been desired to provide a heat storage material composition that can be stably preserved in the supercooled state even in an environment at a temperature lower than room temperature and below the freezing point (in a low-temperature environment).

However, in the existing heat storage material compositions proposed in Patent Literatures 3 and 4, it was difficult to increase stability of a supercooled state in a low-temperature environment while ensuring a sufficient thermal storage density.

In view of the above circumstances, one non-limiting and exemplary embodiment provides a novel heat storage material composition that has a high thermal storage density and that can be stably preserved in the supercooled state even in a low-temperature environment.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

An embodiment according to the present disclosure includes a heat storage material composition containing sodium acetate, water, and an organic compound comprising a hydrophobic group and a hydrophilic group, in which a weight ratio R (sodium acetate/water) of the sodium acetate to the water is 57/43 or less, a concentration Ws of the sodium acetate in three components of the sodium acetate, the water, and the organic compound comprising a hydrophobic group and a hydrophilic group is 52% by weight or more, and a concentration Wa of the organic compound comprising a hydrophobic group and a hydrophilic group in the three components is 1% by weight or more.

These general and specific aspects may be implemented using a system and a method, and any combination of systems and methods.

According to the present disclosure, it is possible to provide a novel heat storage material composition that has a high thermal storage density and that can be stably preserved in the supercooled state even in a low-temperature environment.

DESCRIPTION OF THE PREFERRED EMBODIMENTS

Figure 1:
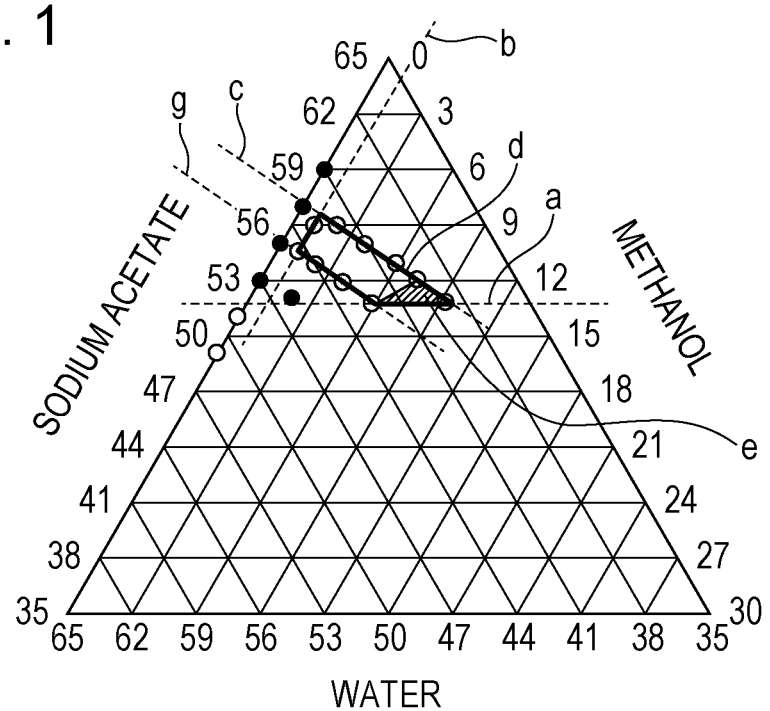
FIG. 1 is a diagram showing a composition range in which the supercooled state is stable in heat storage material compositions containing sodium acetate, water, and methanol.

As described above, in a heat storage system in which a heat storage material composition containing sodium acetate trihydrate is used, the heat storage material composition in which heat is stored and which is in the supercooled state may be preserved until a point in time when heat is necessary. However, in the case where the heat storage material composition is used in, for example, a system in which waste heat of an internal combustion engine of an automobile or a boiler is used as a heat source, sodium acetate trihydrate may be unintentionally crystallized (coagulated) by a decrease in the temperature of the heat storage material composition during the preservation of the heat storage material composition. Accordingly, it is desirable to more stably preserve a heat storage material composition in a supercooled state in a low-temperature environment. In particular, in some environments in which a heat storage material composition is used, it is desirable that the heat storage material composition have sufficient stability of the supercooled state in a temperature environment of cold regions (for example, in a low-temperature environment of −20° C.).

According to studies conducted by the inventor of the present disclosure, in the heat storage material composition proposed in Patent Literature 3, although stability of the heat storage material composition in the supercooled state can be improved in a room temperature environment, it is difficult to obtain sufficient stability of the heat storage material composition in the supercooled state in a low-temperature environment.

Patent Literature 4 discloses that stability of the supercooled state is enhanced by adding water to sodium acetate trihydrate. Patent Literature 4 describes that, for example, the solidification temperature can be lowered to −23° C. to −31° C. by adding water in an amount of 20% by weight relative to sodium acetate trihydrate. Referring to the description of Patent Literature 4, it is believed that, in the heat storage material composition described in Patent Literature 4, the stability of the heat storage material composition in the supercooled state in a low-temperature environment of −20° C. can be enhanced by suppressing the sodium acetate concentration to 50.2% by weight or less by the addition of water. However, since the sodium acetate concentration is decreased by the addition of pure water, the latent heat of fusion decreases and a sufficient thermal storage density may not be obtained.

The inventor of the present disclosure studied a method in which sodium acetate trihydrate can be more stably preserved in the supercooled state in a low-temperature environment while ensuring a high thermal storage density. As a result, it was found that crystallization (coagulation) of sodium acetate trihydrate is suppressed and supercooling is accelerated by using an interaction between sodium acetate, water, and an organic compound comprising a hydrophobic group and a hydrophilic group. The inventor of the present disclosure further conducted intensive studies on the basis of the above finding and conceived the disclosure of the subject application.

Patent Literature 2 discloses a composition (slurry for transportation of latent heat) containing sodium acetate, water, and an organic compound (alcohol) comprising a hydrophobic group and a hydrophilic group (for example, Examples 1 to 5 of Patent Literature 2). The technology disclosed in Patent Literature 2 is based on the assumption that heat storage and heat dissipation are performed by allowing the heat storage material to flow as a slurry. Therefore, the contents of sodium acetate, water, and an alcohol are adjusted so that the heat storage material has a high fluidity. More specifically, Patent Literature 2 discloses that the ratio of the solid relative to the entire slurry is suppressed to 30% or less in order to ensure fluidity even in a low-temperature range. According to a calculation conducted by the inventor of the present disclosure, in the case where sodium acetate trihydrate is used as a heat storage material, the concentration of sodium acetate is 36.5% by weight or less in order to suppress the ratio of the solid to 30% or less. Thus, the sodium acetate concentration is very low and it is difficult to obtain a sufficient thermal storage density.

A summary of embodiments according to the present disclosure will now be described.

A heat storage material composition according to a first aspect of the present disclosure contains, as essential components, sodium acetate, water, and an organic compound comprising a hydrophobic group and a hydrophilic group. A weight ratio R (sodium acetate/water) of the sodium acetate to the water is 57/43 or less. A concentration Ws of sodium acetate in the three components of the sodium acetate, the water, and the organic compound comprising a hydrophobic group and a hydrophilic group is 52% by weight or more. A concentration Wa of the organic compound in the three components is 1% by weight or more. In the heat storage material composition, crystallization (coagulation) of sodium acetate trihydrate is suppressed by an interaction between sodium acetate, water, and the organic compound comprising a hydrophobic group and a hydrophilic group, and thus supercooling is accelerated. Accordingly, this heat storage material composition can be stably preserved in the supercooled state even in a low-temperature environment (for example, at −20° C.). Sodium acetate, which has a high polarity, does not exhibit a higher solubility in an organic compound, which usually has a lower polarity than that of water, than the solubility in water. Accordingly, the amount of sodium acetate trihydrate in a solid phase is not decreased by adding the organic compound at a temperature equal to or lower than the melting point of sodium acetate trihydrate. Therefore, when the concentration Ws of sodium acetate in an aqueous sodium acetate solution containing an organic compound comprising a hydrophobic group and a hydrophilic group is 52% by weight or more, the effect of improving the stability of the supercooled state can be obtained by adding the organic compound comprising a hydrophobic group and a hydrophilic group while a decrease in the thermal storage density is suppressed.

According to a second aspect of the present disclosure, in addition to the first aspect, examples of the hydrophobic group in the organic compound include, but are not particularly limited to, hydrocarbon groups. According to a third aspect of the present disclosure, in addition to the first aspect, examples of the hydrocarbon groups include, but are not particularly limited to, alkyl groups.

Examples of the alkyl groups include, but are not particularly limited to, a methyl group, an ethyl group, a propyl group, and a butyl group.

According to a fourth aspect of the present disclosure, in addition to any one of the first to the third aspects, examples of the hydrophilic group in the organic compound include, but are not particularly limited to, a hydroxy group.

According to a fifth aspect of the present disclosure, in addition to the fourth aspect, examples of the organic compound include, but are not particularly limited to, alcohols.

According to a sixth aspect of the present disclosure, in addition to any one of the first to third aspects, examples of the organic compound include, but are not particularly limited to, an amino group.

According to a seventh aspect of the present disclosure, in addition to any one of the first to third aspects, examples of the organic compound include, but are not particularly limited to, amines.

According to an eighth aspect of the present disclosure, in addition to the fifth aspect, examples of the alcohols include monohydric alcohols.

According to a ninth aspect of the present disclosure, in addition to the fifth aspect, examples of the alcohols include straight-chain alcohols.

According to a tenth aspect of the present disclosure, in addition to the fifth aspect, examples of the alcohols include polyhydric alcohols.

According to a 11th aspect of the present disclosure, in addition to the eighth aspect, the monohydric alcohol may be methanol, and the weight ratio R of the sodium acetate to the water may be 55/45 or more.

According to a 12th aspect of the present disclosure, in addition to the eighth aspect, the monohydric alcohol may be ethanol, and in a triangular diagram which shows the composition of the sodium acetate, the water, and the alcohol in units of weight percent, the concentration Wa of the alcohol may be equal to or more than a concentration represented by a straight line connecting a first point A and a second point B.

A (sodium acetate: 52 wt %, water: 46 wt %, alcohol: 2 wt %)

B (sodium acetate: 54 wt %, water: 45 wt %, alcohol: 1 wt %)

According to a 13th aspect of the present disclosure, in addition to the eighth aspect, the monohydric alcohol may be 1-propanol.

According to a 14th aspect of the present disclosure, in addition to the eighth aspect, the monohydric alcohol may be 2-propanol, the weight ratio R of the sodium acetate to the water may be 55/45 or less, and the concentration Wa of the alcohol may be 2% by weight or more.

According to a 15th aspect of the present disclosure, in addition to the eighth aspect, the monohydric alcohol may be n-butyl alcohol, and in a triangular diagram which shows the composition of the sodium acetate, the water, and the alcohol in units of weight percent, the concentration Wa of the alcohol may be equal to or more than a concentration represented by a straight line connecting a first point A and a second point B.

A (sodium acetate: 52 wt %, water: 47 wt %, alcohol: 1 wt %)

B (sodium acetate: 56 wt %, water: 42 wt %, alcohol: 2 wt %)

According to a 16th aspect of the present disclosure, in addition to the eighth aspect, the monohydric alcohol may be tert-butyl alcohol, the weight ratio R of the sodium acetate to the water may be 55/45 or more, and the concentration Wa of the alcohol may be 2% by weight or more.

According to a 17th aspect of the present disclosure, in addition to the eighth aspect, the polyhydric alcohol may be ethylene glycol, and in a triangular diagram which shows the composition of the sodium acetate, the water, and the alcohol in units of weight percent, the concentration Wa of the alcohol may be equal to or more than a concentration represented by a straight line connecting a first point A and a second point B.

A (sodium acetate: 56 wt %, water: 42 wt %, alcohol: 2 wt %)

B (sodium acetate: 52 wt %, water: 47 wt %, alcohol: 1 wt %)

According to a 18th aspect of the present disclosure, in addition to the eighth aspect, the polyhydric alcohol may be propylene glycol, the weight ratio R of the sodium acetate to the water may be 55/45 or more, and the concentration Wa of the alcohol may be 2% by weight or more. In this case, in a triangular diagram which shows the composition of the sodium acetate, the water, and the alcohol in units of weight percent, the concentration Ws of the sodium acetate may be equal to or more than a concentration represented by a straight line connecting a first point A and a second point B.

A (sodium acetate: 52 wt %, water: 39 wt %, alcohol: 9 wt %)
B (sodium acetate: 53 wt %, water: 43 wt %, alcohol: 4 wt %)

According to a 19th aspect of the present disclosure, in addition to the eighth aspect, the polyhydric alcohol may be glycerin, the weight ratio R of the sodium acetate to the water may be 55/45 or more, and in a triangular diagram which shows the composition of the sodium acetate, the water, and the alcohol in units of weigh percent, the concentration Wa of the alcohol may be equal to or more than a concentration represented by a straight line connecting a first point A and a second point B.

A (sodium acetate: 56 wt %, water: 42 wt %, alcohol: 2 wt %)
B (sodium acetate: 54 wt %, water: 45 wt %, alcohol: 1 wt %)

According to a 20th aspect of the present disclosure, in addition to the first to the 19th aspects, a method for storing heat according to an embodiment of the present disclosure is a method for using any one of the heat storage material compositions described above, the method including the steps of (a) heating a heat storage material composition in a first state, the heat storage material composition containing sodium acetate trihydrate in a solid phase and being contained in a heat storage material container, to a first temperature equal to or higher than a phase-change temperature of the sodium acetate trihydrate by allowing a heat medium to flow such that heat exchange is performed between the heat medium and the heat storage material container to thereby melt the sodium acetate trihydrate and change the state of the heat storage material composition to a second state; (b) preserving the heat storage material composition in the second state in the heat storage material container at a second temperature lower than the phase-change temperature of the sodium acetate trihydrate; (c) coagulating the sodium acetate trihydrate in the heat storage material container to thereby change the state of the preserved heat storage material composition in the second state to the first state; and (d) recovering at least part of heat released from the heat storage material composition by coagulation of the sodium acetate trihydrate by allowing a heat medium to flow such that heat exchange is performed between the heat medium and the heat storage material container.

Herein, the term "weight ratio R of sodium acetate to water" refers to the ratio (sodium acetate/water) of the weight of sodium acetate to the weight of water. The term "concentration Ws of sodium acetate" refers to the ratio (% by weight) of the weight of sodium acetate to the total weight of three components of sodium acetate, water, and an organic compound comprising a hydrophobic group and a hydrophilic group. Similarly, the term "concentration Ww of water" refers to the ratio (% by weight) of the weight of water to the total weight of the three components. Similarly, the term "concentration Wa of an organic compound comprising a hydrophobic group and a hydrophilic group" refers to the ratio (% by weight) of the weight of the organic compound comprising a hydrophobic group and a hydrophilic group to the total weight of the three components.

The alcohols are not particularly limited. Monohydric alcohols such as methanol, ethanol, 1-propanol, 2-propanol, n-butyl alcohol, and tert-butyl alcohol may be used. Alternatively, polyhydric alcohols such as ethylene glycol, propylene glycol, and glycerin may be used. Straight-chain alcohols may be used. For example, n-butyl alcohol, which is a straight-chain monohydric alcohol, may be used. The amines are not particularly limited. For example, methyl orange (sodium 4'-(dimethylamino)azobenzene-4-sulfonate) may be used.

(Embodiments)

Heat storage material compositions containing different types of alcohols and having different composition ratios were prepared in Examples. The relationship between the composition (% by weight) of an alcohol, water, and sodium acetate and stability of a supercooled state of each of the heat storage material compositions was examined. Furthermore, heat storage material compositions containing an amine and having different composition ratios were also prepared in Examples. The relationship between the composition (% by weight) of the amine, water, and sodium acetate and stability of a supercooled state of each of the heat storage material compositions was examined. Experimental methods and the results in the Examples will be described below. Note that, in experiments described below, the amount of sodium acetate trihydrate in a solid phase does not decrease at a temperature equal to or lower than a melting point of sodium acetate trihydrate as a result of the addition of an alcohol to sodium acetate. The reason for this is as follows. A substance having a high polarity dissolves in a solvent having a high polarity. Sodium acetate is a substance having a high polarity, and water is a solvent having a polarity higher than the polarity of alcohols. Accordingly, the solubility of sodium acetate in an alcohol tends to be lower than the solubility of sodium acetate in water. For example, the solubility of sodium acetate in water is 33.5% at 25° C. In contrast, the solubility of sodium acetate in ethanol is very low. In the case where an amine is added to sodium acetate, similarly, the amount of sodium acetate trihydrate in a solid phase does not decrease at a temperature equal to or lower than the melting point of sodium acetate trihydrate. This is also because the polarity of water is higher than that of amines.

(A) Stability of Supercooled State of Aqueous Sodium Acetate Solution

First, the effect of a concentration of sodium acetate w on stability of a supercooled state of an aqueous sodium acetate solution was examined. Herein, a concentration (wt %) of sodium acetate in an aqueous sodium acetate solution, that is, the ratio of the weight of sodium acetate to the total weight of sodium acetate and water is abbreviated as "sodium acetate concentration w", and is distinguished from the "concentration Ws of sodium acetate" in the three components of sodium acetate, water, and an organic compound.

In Comparative Examples A1 to A9, aqueous sodium acetate solutions having different sodium acetate concentrations w (wt %) were prepared, and each of the aqueous sodium acetate solutions was cooled in a low-temperature environment of −20° C. The time until sodium acetate trihydrate (solid phase) was produced (the time during which the aqueous sodium acetate solution is preserved in the supercooled state (hereinafter referred to as "supercooled state-preservation time")) was determined.

A method for preparing an aqueous sodium acetate solution and a method for measuring the supercooled state-preservation time of each of the Comparative Examples will be described below. The measurement results of the supercooled state-preservation time are shown in Table 1.

COMPARATIVE EXAMPLE A1

A composition containing sodium acetate trihydrate (analytical grade) manufactured by Kanto Chemical Co., Inc. and pure water was prepared in a glass sample bottle such that the sodium acetate concentration w became 59% by weight. The total weight of sodium acetate and water was adjusted to 25.0 g. Subsequently, the sample bottle containing the composition was placed in a drying furnace set at 70° C. to heat the composition. Thus, an aqueous sodium acetate solution was prepared.

Subsequently, the sample bottle containing the aqueous sodium acetate solution was placed in a freezer set at −20° C. to cool the aqueous sodium acetate solution. According to the results, the production of anhydrous sodium acetate was confirmed. In this Comparative Example, an aqueous sodium acetate solution in the supercooled state could not be obtained.

COMPARATIVE EXAMPLE A2

An aqueous sodium acetate solution was prepared as in Comparative Example A1 except that the total weight of sodium acetate and water was adjusted to 25.1 g such that the sodium acetate concentration w became 57% by weight.

Subsequently, the aqueous sodium acetate solution was cooled in the low-temperature environment of −20° C. as in Comparative Example A1, and the time until sodium acetate trihydrate (solid phase) was produced in the aqueous sodium acetate solution (supercooled state-preservation time) was determined. According to the results, it was confirmed that the supercooled state-preservation time at −20° C. was less than 5 minutes.

COMPARATIVE EXAMPLE A3

An aqueous sodium acetate solution was prepared as in Comparative Example A1 except that the total weight of sodium acetate and water was adjusted to 25.0 g such that the sodium acetate concentration w became 56% by weight.

Subsequently, the supercooled state-preservation time was determined as in Comparative Example A1. It was confirmed that the supercooled state-preservation time at −20° C. was less than 15 minutes.

COMPARATIVE EXAMPLE A4

An aqueous sodium acetate solution was prepared as in Comparative Example A1 except that the total weight of sodium acetate and water was adjusted to 25.3 g such that the sodium acetate concentration w became 55% by weight.

Subsequently, the supercooled state-preservation time was determined as in Comparative Example A1. It was confirmed that the supercooled state-preservation time at −20° C. was less than 15 minutes.

COMPARATIVE EXAMPLE A5

An aqueous sodium acetate solution was prepared as in Comparative Example A1 except that the total weight of sodium acetate and water was adjusted to 25.0 g such that the sodium acetate concentration w became 54% by weight.

Subsequently, the supercooled state-preservation time was determined as in Comparative Example A1. It was confirmed that the supercooled state-preservation time at −20° C. was less than 10 minutes.

COMPARATIVE EXAMPLE A6

An aqueous sodium acetate solution was prepared as in Comparative Example A1 except that the total weight of sodium acetate and water was adjusted to 25.0 g such that the sodium acetate concentration w became 53% by weight.

Subsequently, the supercooled state-preservation time was determined as in Comparative Example A1. It was confirmed that the supercooled state-preservation time at −20° C. was less than 15 minutes.

COMPARATIVE EXAMPLE A7

An aqueous sodium acetate solution was prepared as in Comparative Example A1 except that the total weight of sodium acetate and water was adjusted to 25.0 g such that the sodium acetate concentration w became 52% by weight.

Subsequently, the supercooled state-preservation time was determined as in Comparative Example A1. It was confirmed that the supercooled state-preservation time at −20° C. was less than 30 minutes.

COMPARATIVE EXAMPLE A8

An aqueous sodium acetate solution was prepared as in Comparative Example A1 except that the total weight of sodium acetate and water was adjusted to 25.1 g such that the sodium acetate concentration w became 51% by weight.

Subsequently, the supercooled state-preservation time was determined as in Comparative Example A1. The supercooled state-preservation time at −20° C. was 12 hours or more. Thus, it was confirmed that the aqueous sodium acetate solution was highly stable in the supercooled state. However, since the aqueous sodium acetate solution has a low concentration Ws of sodium acetate, the amount of latent heat per weight of the composition is small. This may cause a decrease in the thermal storage density.

COMPARATIVE EXAMPLE A9

An aqueous sodium acetate solution was prepared as in Comparative Example A1 except that the total weight of sodium acetate and water was adjusted to 25.2 g such that the sodium acetate concentration w became 49% by weight.

Subsequently, the supercooled state-preservation time was determined as in Comparative Example A1. The supercooled state-preservation time at −20° C. was 12 hours or more. Thus, it was confirmed that the aqueous sodium acetate solution was highly stable in the supercooled state. However, since the aqueous sodium acetate solution has a low concentration Ws of sodium acetate, the amount of latent heat per weight of the composition is small.

TABLE 1

| Comparative Example | Alcohol Type | Alcohol Amount added [g] | Aqueous sodium acetate solution Concentration w [wt %] | Aqueous sodium acetate solution Weight [g] | Concentration [wt %] Sodium acetate Ws | Concentration [wt %] Water Ww | Concentration [wt %] Alcohol Wa | Supercooled state-preservation time at −20° C. | Remarks |
|---|---|---|---|---|---|---|---|---|---|
| A1 | — | — | 59% | 25.0 g | 59% | 41% | 0% | — | Anhydride was produced. |

TABLE 1-continued

| Comparative Example | Alcohol Type | Alcohol Amount added [g] | Aqueous sodium acetate solution Concentration w [wt %] | Aqueous sodium acetate solution Weight [g] | Concentration [wt %] Sodium acetate Ws | Concentration [wt %] Water Ww | Concentration [wt %] Alcohol Wa | Supercooled state-preservation time at −20° C. | Remarks |
|---|---|---|---|---|---|---|---|---|---|
| A2 | — | | 57% | 25.1 g | 57% | 43% | 0% | Less than 5 minutes | |
| A3 | — | | 56% | 25.0 g | 56% | 44% | 0% | Less than 15 minutes | |
| A4 | — | | 55% | 25.3 g | 55% | 45% | 0% | Less than 15 minutes | |
| A5 | — | | 54% | 25.0 g | 54% | 46% | 0% | Less than 10 minutes | |
| A6 | — | | 53% | 25.0 g | 53% | 47% | 0% | Less than 15 minutes | |
| A7 | — | | 52% | 25.0 g | 52% | 48% | 0% | Less than 30 minutes | |
| A8 | — | | 51% | 25.1 g | 51% | 49% | 0% | 12 hours or more | The amount of latent heat was small. |
| A9 | — | | 49% | 25.2 g | 49% | 51% | 0% | 12 hours or more | The amount of latent heat was small. |

The above results show that the stability of the supercooled state of an aqueous sodium acetate solution in a low-temperature environment of −20° C. can be improved by increasing the amount of water added to sodium acetate trihydrate. On the other hand, when the amount of water added is increased, the concentration Ws of sodium acetate decreases and thus the amount of latent heat per weight of the aqueous sodium acetate solution decreases. Therefore, it is difficult to realize both high stability of the supercooled state and a large amount of latent heat by adding water to sodium acetate trihydrate.

(B) Stability of Supercooled State when Methanol was Added

Next, methanol, which is a monohydric alcohol, was added to a sodium acetate solution containing sodium acetate as a main component. The effect of the addition of methanol on the stability of the supercooled state was examined.

In Examples B1 to B11, heat storage material compositions containing sodium acetate, water, and methanol were prepared, and the supercooled state-preservation time of each of the heat storage material compositions was determined.

Methods for preparing heat storage material compositions and measurement results of the supercooled state-preservation time of the Examples are described below. The method for measuring the supercooled state-preservation time is the same as that used in Comparative Examples A1 to A9 described above, and thus the description of the method is omitted.

Table 2 shows the concentration Ws of sodium acetate relative to three components of sodium acetate, water, and methanol in each of the heat storage material compositions of the Examples, the concentration Ww of water relative to the three components, the concentration Wa of methanol relative to the three components, and the measurement results of the supercooled state-preservation time in each of the heat storage material compositions. Note that there is also an Example in which the sum of the concentration Ws of sodium acetate, the concentration Ww of water, and the concentration Wa of methanol is not 100%. This is because the values of the concentrations were determined by rounding off to the nearest integer.

EXAMPLE B1

A composition containing sodium acetate trihydrate (analytical grade) manufactured by Kanto Chemical Co., Inc. and pure water was prepared in a glass sample bottle such that the sodium acetate concentration w became 57% by weight. The total weight of sodium acetate and water was adjusted to 25.1 g. Subsequently, the sample bottle containing the composition was placed in a drying furnace set at 70° C. to heat the composition. Thus, an aqueous sodium acetate solution was prepared. Next, 0.3 g of methanol was added to the aqueous sodium acetate solution to prepare a heat storage material composition of this Example.

The heat storage material composition was heated in the drying furnace set at 70° C. Thus, a solution containing sodium acetate, water, and methanol (sodium acetate 56 wt %-water 43 wt %-methanol 1 wt %) was prepared.

The solution was then cooled as in Comparative Examples A1 to A9 described above, and the supercooled state-preservation time at −20° C. was determined. The supercooled state-preservation time at −20° C. was longer than that of Comparative Example A3 described above, and was 1 hour or more and 2 hours or less.

EXAMPLE B2

The preparation and heating of a heat storage material composition were conducted as in Example B1 except that the amount of methanol added was changed to 0.5 g. A solution containing sodium acetate, water, and methanol (sodium acetate 56 wt %-water 42 wt %-methanol 2 wt %) was prepared.

The supercooled state-preservation time at −20° C. of this solution was longer than that of Comparative Example A3 described above, and was 3 hours or more and 5 hours or less.

EXAMPLE B3

The preparation and heating of a heat storage material composition were conducted as in Example B1 except that the total weight of sodium acetate trihydrate (analytical grade) and pure water was 25.1 g and the amount of methanol added was changed to 1.0 g. A solution containing sodium acetate, water, and methanol (sodium acetate 55 wt %-water 41 wt %-methanol 4 wt %) was prepared.

The supercooled state-preservation time at −20° C. of this solution was longer than that of Comparative Example A4 described above, and was 2 hours or more and 3 hours or less.

EXAMPLE B4

The preparation and heating of a heat storage material composition were conducted as in Example B1 except that the total weight of sodium acetate trihydrate (analytical grade) and pure water was changed to 25.2 g and the amount of methanol added was changed to 1.5 g. A solution containing sodium acetate, water, and methanol (sodium acetate 54 wt %-water 41 wt %-methanol 6 wt %) was prepared.

The supercooled state-preservation time at −20° C. of this solution was longer than that of Comparative Example A5 described above, and was 1 hour or more and 2 hours or less.

EXAMPLE B5

The preparation and heating of a heat storage material composition were conducted as in Example B1 except that the total weight of sodium acetate trihydrate (analytical grade) and pure water was 25.1 g and the amount of methanol added was changed to 2.0 g. A solution containing sodium acetate, water, and methanol (sodium acetate 53 wt %-water 40 wt %-methanol 7 wt %) was prepared.

The supercooled state-preservation time at −20° C. of this solution was longer than that of Comparative Example A6 described above, and was 12 hours or more. Thus, it was confirmed that this solution was particularly highly stable in the supercooled state.

EXAMPLE B6

The preparation and heating of a heat storage material composition were conducted as in Example B1 except that the total weight of sodium acetate trihydrate (analytical grade) and pure water was 25.1 g and the amount of methanol added was changed to 2.5 g. A solution containing sodium acetate, water, and methanol (sodium acetate 52 wt %-water 39 wt %-methanol 9 wt %) was prepared.

The supercooled state-preservation time at −20° C. of this solution was longer than that of Comparative Example A7 described above, and was 12 hours or more. Thus, it was confirmed that this solution was particularly highly stable in the supercooled state.

EXAMPLE B7

The preparation and heating of a heat storage material composition were conducted as in Example B1 except that the sodium acetate concentration w in the aqueous sodium acetate solution was changed to 55% by weight, the total weight of sodium acetate trihydrate (analytical grade) and pure water was changed to 25.0 g, and the amount of methanol added was changed to 0.2 g. A solution containing sodium acetate, water, and methanol (sodium acetate 54 wt %-water 45 wt %-methanol 1 wt %) was prepared.

The supercooled state-preservation time at −20° C. of this solution was longer than that of Comparative Example A5 described above, and was 1 hour or more and 2 hours or less.

EXAMPLE B8

The preparation and heating of a heat storage material composition were conducted as in Example B1 except that the sodium acetate concentration w in the aqueous sodium acetate solution was changed to 55% by weight, the total weight of sodium acetate trihydrate (analytical grade) and pure water was 25.1 g, and the amount of methanol added was changed to 0.5 g. A solution containing sodium acetate, water, and methanol (sodium acetate 54 wt %-water 44 wt %-methanol 2 wt %) was prepared.

The supercooled state-preservation time at −20° C. of this solution was longer than that of Comparative Example A5 described above, and was 12 hours or more. Thus, it was confirmed that this solution was particularly highly stable in the supercooled state.

EXAMPLE B9

The preparation and heating of a heat storage material composition were conducted as in Example B1 except that the sodium acetate concentration w in the aqueous sodium acetate solution was changed to 55% by weight, the total weight of sodium acetate trihydrate (analytical grade) and pure water was 25.1 g, and the amount of methanol added was changed to 1.0 g. A solution containing sodium acetate, water, and methanol (sodium acetate 53 wt %-water 43 wt %-methanol 4 wt %) was prepared.

The supercooled state-preservation time at −20° C. of this solution was longer than that of Comparative Example A6 described above, and was 1 hour or more and 2 hours or less.

EXAMPLE B10

The preparation and heating of a heat storage material composition were conducted as in Example B1 except that the sodium acetate concentration w in the aqueous sodium acetate solution was changed to 55% by weight, the total weight of sodium acetate trihydrate (analytical grade) and pure water was changed to 25.0 g, and the amount of methanol added was changed to 1.5 g. A solution containing sodium acetate, water, and methanol (sodium acetate 52 wt %-water 42 wt %-methanol 6 wt %) was prepared.

The supercooled state-preservation time at −20° C. of this solution was longer than that of Comparative Example A7 described above, and was 12 hours or more. Thus, it was confirmed that this solution was particularly highly stable in the supercooled state.

EXAMPLE B11

The preparation and heating of a heat storage material composition were conducted as in Example B1 except that the sodium acetate concentration w in the aqueous sodium acetate solution was changed to 53% by weight, the total weight of sodium acetate trihydrate (analytical grade) and pure water was changed to 25.0 g, and the amount of methanol added was changed to 0.5 g. A solution containing sodium acetate, water, and methanol (sodium acetate 52 wt %-water 46 wt %-methanol 2 wt %) was prepared.

The supercooled state-preservation time at −20° C. of this solution was longer than that of Comparative Example A7 described above, and the effect of the addition of methanol was observed. However, the supercooled state-preservation time at −20° C. of this solution was 30 minutes or more and less than 1 hour.

TABLE 2

| Example | Alcohol Type | Alcohol Amount added [g] | Aqueous sodium acetate solution Concentration w [wt %] | Aqueous sodium acetate solution Weight [g] | Concentration [wt %] Sodium acetate Ws | Concentration [wt %] Water Ww | Concentration [wt %] Alcohol Wa | Supercooled state-preservation time at −20° C. |
|---|---|---|---|---|---|---|---|---|
| B1 | Methanol | 0.3 g | 57% | 25.1 g | 56% | 43% | 1% | 1 to 2 h |
| B2 | Methanol | 0.5 g | 57% | 25.1 g | 56% | 42% | 2% | 3 to 5 h |
| B3 | Methanol | 1.0 g | 57% | 25.1 g | 55% | 41% | 4% | 2 to 3 h |
| B4 | Methanol | 1.5 g | 57% | 25.2 g | 54% | 41% | 6% | 1 to 2 h |
| B5 | Methanol | 2.0 g | 57% | 25.1 g | 53% | 40% | 7% | 12 h or more |
| B6 | Methanol | 2.5 g | 57% | 25.1 g | 52% | 39% | 9% | 12 h or more |
| B7 | Methanol | 0.2 g | 55% | 25.0 g | 54% | 45% | 1% | 1 to 2 h |
| B8 | Methanol | 0.5 g | 55% | 25.1 g | 54% | 44% | 2% | 12 h or more |
| B9 | Methanol | 1.0 g | 55% | 25.1 g | 53% | 43% | 4% | 1 to 2 h |
| B10 | Methanol | 1.5 g | 55% | 25.0 g | 52% | 42% | 6% | 12 h or more |
| B11 | Methanol | 0.5 g | 53% | 25.0 g | 52% | 46% | 2% | 30 min to 1 h |

The results of Examples B1 to B11 and Comparative Examples A1 to A9 showed that, by adding methanol to an aqueous sodium acetate solution, the stability of the supercooled state could be improved while a decrease in the thermal storage density was suppressed.

On the basis of the results of Examples B1 to B11 and Comparative Examples A1 to A9, a composition range in which both a large amount of latent heat and high stability of the supercooled state can be realized was found in the heat storage material compositions containing sodium acetate, water, and methanol. The composition range will be described below.

FIG. 1 is a triangular diagram showing the compositions of sodium acetate, water, and methanol in units of weight percent. The broken line a in FIG. 1 shows that the concentration Ws of sodium acetate in three components of sodium acetate, water, and methanol is 52% by weight. The broken line b shows that the concentration Wa of methanol in the three components is 1% by weight. The broken line c shows that the weight ratio R of sodium acetate to water is 57/43. Examples B1 to B11 described above each have a composition in a region surrounded by the broken lines a, b, and c. When the composition of the components contained in a heat storage material composition is located in the region surrounded by the broken lines a, b, and c, the stability of the supercooled state can be made higher than that of existing heat storage material compositions while a decrease in the amount of latent heat is suppressed. Specifically, when the concentration Ws of sodium acetate in the three components is 52% by weight or more, a decrease in the amount of latent heat per weight can be suppressed. When the concentration Wa of methanol in the three components is 1% by weight or more, the stability of the supercooled state can be enhanced by the addition of methanol. Furthermore, as is apparent from the results of Comparative Examples A1 to A9, a solution of a heat storage material composition can be stably preserved at a low temperature by controlling the weight ratio R of sodium acetate to water to 57/43 or less.

The stability of the supercooled state can be further improved in a region d (shown by the line d in FIG. 1) where the weight ratio R of sodium acetate to water is 55/45 or more, the region d being a part of the region surrounded by the broken lines a, b, and c. In FIG. 1, the broken line g indicates R=55/45. Accordingly, the region d is a region surrounded by the broken lines a, b, c, and g. Among the Examples described above, Examples B1 to B10 each have a composition located in the region d.

Furthermore, in FIG. 1, in a region e (shown by the hatched region) surrounded by lines connecting three points indicating the concentrations Ws, Ww, and Wa of respective components of Examples B5, B6, and B10, the supercooled state-preservation time in the low-temperature environment of −20° C. is 12 hours or more, and thus the supercooled state can be further stably maintained.

(C) Stability of Supercooled State when Ethanol was Added

Next, ethanol, which is a monohydric alcohol, was added to a sodium acetate solution containing sodium acetate as a main component. The effect of the addition of ethanol on the stability of the supercooled state was examined.

In Examples C1 to C12, heat storage material compositions containing sodium acetate, water, and ethanol were prepared, and the supercooled state-preservation time of each of the heat storage material compositions was determined.

Methods for preparing heat storage material compositions and measurement results of the supercooled state-preservation time of the Examples are described below. The method for measuring the supercooled state-preservation time is the same as that used in Comparative Examples A1 to A9 described above, and thus the description of the method is omitted. Table 3 shows the measurement results of the supercooled state-preservation time of each of the Examples.

EXAMPLE C1

A composition containing sodium acetate trihydrate (analytical grade) manufactured by Kanto Chemical Co., Inc. and pure water was prepared in a glass sample bottle such that the sodium acetate concentration w became 57% by weight. The total weight of sodium acetate and water was adjusted to 25.0 g. Subsequently, the sample bottle containing the composition was placed in a drying furnace set at 70° C. to heat the composition. Thus, an aqueous sodium acetate solution was prepared. Next, 0.3 g of ethanol was added to the aqueous sodium acetate solution to prepare a heat storage material composition of this Example.

The heat storage material composition was heated in the drying furnace set at 70° C. Thus, a solution containing sodium acetate, water, and ethanol (sodium acetate 56 wt %-water 43 wt %-ethanol 1 wt %) was prepared.

The solution was then cooled as in Comparative Examples A1 to A9 described above, and the supercooled state-preservation time at −20° C. was determined. The supercooled state-preservation time at −20° C. was longer than that of Comparative Example A3 described above, and was 1 hour or more and 2 hours or less.

EXAMPLE C2

The preparation and heating of a heat storage material composition were conducted as in Example C1 except that the amount of ethanol added was changed to 0.5 g. A solution containing sodium acetate, water, and ethanol (sodium acetate 56 wt %-water 42 wt %-ethanol 2 wt %) was prepared.

The solution was then cooled, and the supercooled state-preservation time at −20° C. was determined. The supercooled state-preservation time at −20° C. was longer than that of Comparative Example A3 described above, and was 1 hour or more and 2 hours or less.

EXAMPLE C3

The preparation and heating of a heat storage material composition were conducted as in Example C1 except that the amount of ethanol added was changed to 1.0 g. A solution containing sodium acetate, water, and ethanol (sodium acetate 55 wt %-water 41 wt %-ethanol 4 wt %) was prepared.

The supercooled state-preservation time at −20° C. of this solution was longer than that of Comparative Example A4 described above, and was 1 hour or more and 2 hours or less.

EXAMPLE C4

The preparation and heating of a heat storage material composition were conducted as in Example C1 except that the total weight of sodium acetate trihydrate (analytical grade) and pure water was changed to 25.1 g and the amount of ethanol added was changed to 1.5 g. A solution containing sodium acetate, water, and ethanol (sodium acetate 54 wt %-water 41 wt %-ethanol 6 wt %) was prepared.

The supercooled state-preservation time at −20° C. of this solution was longer than that of Comparative Example A5 described above, and was 3 hours or more and 5 hours or less.

EXAMPLE C5

The preparation and heating of a heat storage material composition were conducted as in Example C1 except that the total weight of sodium acetate trihydrate (analytical grade) and pure water was changed to 25.5 g and the amount of ethanol added was changed to 2.0 g. A solution containing sodium acetate, water, and ethanol (sodium acetate 53 wt %-water 40 wt %-ethanol 7 wt %) was prepared.

The supercooled state-preservation time at −20° C. of this solution was longer than that of Comparative Example A6 described above, and was 12 hours or more. Thus, it was confirmed that this solution was particularly highly stable in the supercooled state.

EXAMPLE C6

The preparation and heating of a heat storage material composition were conducted as in Example C1 except that the total weight of sodium acetate trihydrate (analytical grade) and pure water was changed to 25.1 g and the amount of ethanol added was changed to 2.5 g. A solution containing sodium acetate, water, and ethanol (sodium acetate 52 wt %-water 39 wt %-ethanol 9 wt %) was prepared.

The supercooled state-preservation time at −20° C. of this solution was longer than that of Comparative Example A7 described above, and was 12 hours or more. Thus, it was confirmed that this solution was particularly highly stable in the supercooled state.

EXAMPLE C7

The preparation and heating of a heat storage material composition were conducted as in Example C1 except that the sodium acetate concentration w in the aqueous sodium acetate solution was changed to 55% by weight, the total weight of sodium acetate trihydrate (analytical grade) and pure water was 25.0 g, and the amount of ethanol added was 0.3 g. A solution containing sodium acetate, water, and ethanol (sodium acetate 54 wt %-water 45 wt %-ethanol 1 wt %) was prepared.

The supercooled state-preservation time at −20° C. of this solution was longer than that of Comparative Example A5 described above, and was 1 hour or more and 2 hours or less.

EXAMPLE C8

The preparation and heating of a heat storage material composition were conducted as in Example C1 except that the sodium acetate concentration w in the aqueous sodium acetate solution was changed to 55% by weight, the total weight of sodium acetate trihydrate (analytical grade) and pure water was 25.0 g, and the amount of ethanol added was changed to 0.5 g. A solution containing sodium acetate, water, and ethanol (sodium acetate 54 wt %-water 44 wt %-ethanol 2 wt %) was prepared.

The supercooled state-preservation time at −20° C. of this solution was longer than that of Comparative Example A5 described above, and was 12 hours or more. Thus, it was confirmed that this solution was particularly highly stable in the supercooled state.

EXAMPLE C9

The preparation and heating of a heat storage material composition were conducted as in Example C1 except that the sodium acetate concentration w in the aqueous sodium acetate solution was changed to 55% by weight, the total weight of sodium acetate trihydrate (analytical grade) and pure water was 25.0 g, and the amount of ethanol added was changed to 1.1 g. A solution containing sodium acetate, water, and ethanol (sodium acetate 53 wt %-water 43 wt %-ethanol 4 wt %) was prepared.

The supercooled state-preservation time at −20° C. of this solution was longer than that of Comparative Example A6 described above, and was 5 hours or more and 6 hours or less.

EXAMPLE C10

The preparation and heating of a heat storage material composition were conducted as in Example C1 except that the sodium acetate concentration w in the aqueous sodium acetate solution was changed to 55% by weight, the total weight of sodium acetate trihydrate (analytical grade) and pure water was changed to 25.2 g, and the amount of ethanol added was changed to 1.5 g. A solution containing sodium acetate, water, and ethanol (sodium acetate 52 wt %-water 42 wt %-ethanol 6 wt %) was prepared.

The supercooled state-preservation time at −20° C. of this solution was longer than that of Comparative Example A7 described above, and was 12 hours or more. Thus, it was confirmed that this solution was particularly highly stable in the supercooled state.

EXAMPLE C11

The preparation and heating of a heat storage material composition were conducted as in Example C1 except that the sodium acetate concentration w in the aqueous sodium acetate solution was changed to 53% by weight, the total weight of sodium acetate trihydrate (analytical grade) and pure water was changed to 25.2 g, and the amount of ethanol added was changed to 0.5 g. A solution containing sodium acetate, water, and ethanol (sodium acetate 52 wt %-water 46 wt %-ethanol 2 wt %) was prepared.

The supercooled state-preservation time at −20° C. of this solution was longer than that of Comparative Example A7 described above, and was 1 hour or more and 2 hours or less.

EXAMPLE C12

The preparation and heating of a heat storage material composition were conducted as in Example C1 except that the sodium acetate concentration w in the aqueous sodium acetate solution was changed to 53% by weight, the total weight of sodium acetate trihydrate (analytical grade) and pure water was 25.0 g, and the amount of ethanol added was 0.3 g. A solution containing sodium acetate, water, and ethanol (sodium acetate 52 wt %-water 47 wt %-ethanol 1 wt %) was prepared.

The supercooled state-preservation time at −20° C. of this solution was longer than that of Comparative Example A7 described above, and the effect of the addition of ethanol was observed. However, the supercooled state-preservation time at −20° C. of this solution was 30 minutes or more and less than 1 hour.

Figure 2:
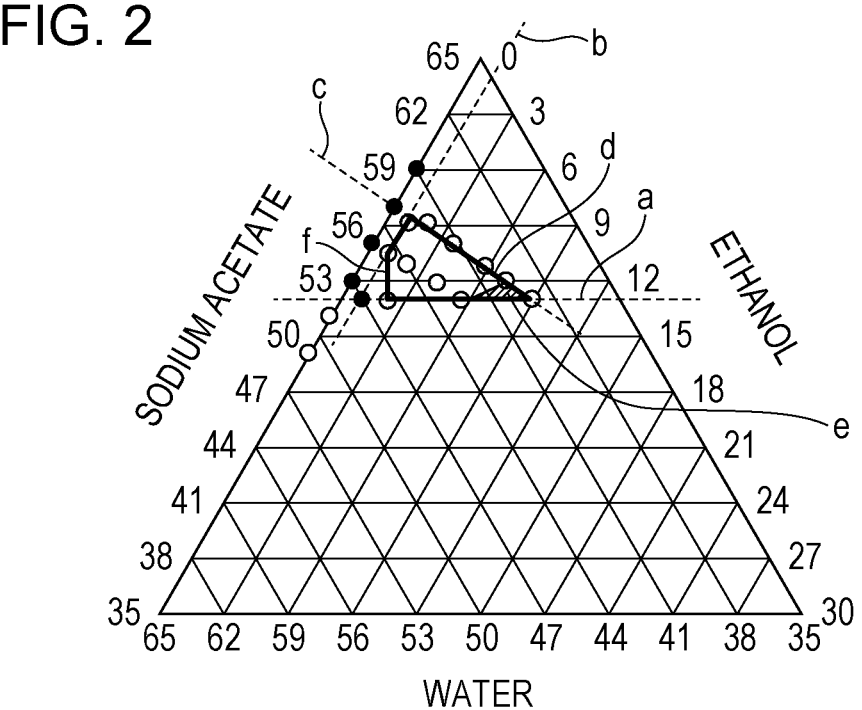
FIG. 2 is a diagram showing a composition range in which the supercooled state is stable in heat storage material compositions containing sodium acetate, water, and ethanol.

FIG. 2 is a triangular diagram showing the compositions of sodium acetate, water, and ethanol in units of weight percent. As described with reference to FIG. 1, the broken lines a, b, and c in FIG. 2 respectively indicate Ws=52 (wt %), Wa=1 (wt %), and R=57/43.

Examples C1 to C12 described above each have a composition in the region surrounded by the broken lines a, b, and c. Accordingly, it was confirmed that, also in the case where ethanol was used as an organic compound, when the composition of the components contained in a heat storage material composition was located in the region surrounded by the broken lines a, b, and c, the stability of the supercooled state could be made higher than that of existing heat storage material compositions while a decrease in the amount of latent heat was suppressed.

Regarding heat storage material compositions in which ethanol is used as an organic compound, the stability of the supercooled state can be further improved in a region d (shown by the line d in FIG. 2) where the concentration Wa of ethanol is equal to or more than a concentration represented by a straight line connecting a first point A and a second point B described below, the region d being a part of the region surrounded by the broken lines a, b, and c.

A (sodium acetate: 52 wt %, water: 46 wt %, alcohol: 2 wt %)

B (sodium acetate: 54 wt %, water: 45 wt %, alcohol: 1 wt %)

In FIG. 2, the straight line connecting the first point A and the second point B is shown by the broken line f. Among the Examples described above, Examples C1 to C11 each have a composition located in the region d.

Furthermore, in FIG. 2, in a region e (shown by the hatched region) surrounded by lines connecting three points indicating the concentrations Ws, Ww, and Wa of respective components of Examples C5, C6, and C10, the supercooled

TABLE 3

| Example | Alcohol Type | Alcohol Amount added [g] | Aqueous sodium acetate solution Concentration w [wt %] | Aqueous sodium acetate solution Weight [g] | Concentration [wt %] Sodium acetate Ws | Concentration [wt %] Water Ww | Concentration [wt %] Alcohol Wa | Supercooled state-preservation time at −20° C. |
|---|---|---|---|---|---|---|---|---|
| C1 | Ethanol | 0.3 g | 57% | 25.0 g | 56% | 43% | 1% | 1 to 2 h |
| C2 | Ethanol | 0.5 g | 57% | 25.0 g | 56% | 42% | 2% | 1 to 2 h |
| C3 | Ethanol | 1.0 g | 57% | 25.0 g | 55% | 41% | 4% | 1 to 2 h |
| C4 | Ethanol | 1.5 g | 57% | 25.1 g | 54% | 41% | 6% | 3 to 5 h |
| C5 | Ethanol | 2.0 g | 57% | 25.5 g | 53% | 40% | 7% | 12 h or more |
| C6 | Ethanol | 2.5 g | 57% | 25.1 g | 52% | 39% | 9% | 12 h or more |
| C7 | Ethanol | 0.3 g | 55% | 25.0 g | 54% | 45% | 1% | 1 to 2 h |
| C8 | Ethanol | 0.5 g | 55% | 25.0 g | 54% | 44% | 2% | 12 h or more |
| C9 | Ethanol | 1.1 g | 55% | 25.0 g | 53% | 43% | 4% | 5 to 6 h |
| C10 | Ethanol | 1.5 g | 55% | 25.2 g | 52% | 42% | 6% | 12 h or more |
| C11 | Ethanol | 0.5 g | 53% | 25.2 g | 52% | 46% | 2% | 1 to 2 h |
| C12 | Ethanol | 0.3 g | 53% | 25.0 g | 52% | 47% | 1% | 30 min to 1 h |

The results of Examples C1 to C12 and Comparative Examples A1 to A9 showed that, by adding ethanol to an aqueous sodium acetate solution, the stability of the supercooled state could be improved while a decrease in the thermal storage density was suppressed.

On the basis of the results of Examples C1 to C12 and Comparative Examples A1 to A9, a composition range in which both a large amount of latent heat and high stability of the supercooled state can be realized was found in the heat storage material compositions containing sodium acetate, water, and ethanol. The composition range will be described below.

state-preservation time in the low-temperature environment of −20° C. is 12 hours or more, and thus the supercooled state can be further stably maintained.

(D) Stability of Supercooled State when 1-Propanol was Added

Next, 1-propanol, which is a monohydric alcohol, was added to a sodium acetate solution containing sodium acetate as a main component. The effect of the addition of 1-propanol on the stability of the supercooled state was examined.

In Examples D1 to D12 and Comparative Example DC1, heat storage material compositions containing sodium acetate, water, and 1-propanol were prepared, and the supercooled state-preservation time of each of the heat storage material compositions was determined.

Methods for preparing heat storage material compositions and measurement results of the supercooled state-preservation time of the Examples and Comparative Example are described below. The method for measuring the supercooled state-preservation time is the same as that used in Comparative Examples A1 to A9 described above, and thus the description of the method is omitted. Table 4 shows the measurement results of the supercooled state-preservation time of each of the Examples and Comparative Example.

EXAMPLE D1

A composition containing sodium acetate trihydrate (analytical grade) manufactured by Kanto Chemical Co., Inc. and pure water was prepared in a glass sample bottle such that the sodium acetate concentration w became 57% by weight. The total weight of sodium acetate and water was adjusted to 25.2 g. Subsequently, the sample bottle containing the composition was placed in a drying furnace set at 70° C. to heat the composition. Thus, an aqueous sodium acetate solution was prepared. Next, 0.3 g of 1-propanol was added to the aqueous sodium acetate solution to prepare a heat storage material composition of this Example.

The heat storage material composition was heated in the drying furnace set at 70° C. Thus, a solution containing sodium acetate, water, and 1-propanol (sodium acetate 56 wt %-water 43 wt %-1-propanol 1 wt %) was prepared.

The solution was then cooled as in Comparative Examples A1 to A9 described above, and the supercooled state-preservation time at −20° C. was determined. The supercooled state-preservation time at −20° C. was longer than that of Comparative Example A3 described above, and was 1 hour or more and 2 hours or less.

EXAMPLE D2

The preparation and heating of a heat storage material composition were conducted as in Example D1 except that the amount of 1-propanol added was changed to 0.5 g. A solution containing sodium acetate, water, and 1-propanol (sodium acetate 56 wt %-water 42 wt %-1-propanol 2 wt %) was prepared.

The solution was then cooled, and the supercooled state-preservation time at −20° C. was determined. The supercooled state-preservation time at −20° C. was longer than that of Comparative Example A3 described above, and was 3 hours or more and 5 hours or less.

EXAMPLE D3

The preparation and heating of a heat storage material composition were conducted as in Example D1 except that the total weight of sodium acetate trihydrate (analytical grade) and pure water was changed to 25.3 g and the amount of 1-propanol added was changed to 1.0 g. A solution containing sodium acetate, water, and 1-propanol (sodium acetate 55 wt %-water 41 wt %-1-propanol 4 wt %) was prepared.

The solution was then cooled, and the supercooled state-preservation time at −20° C. was determined. The supercooled state-preservation time at −20° C. was longer than that of Comparative Example A4 described above, and was 2 hours or more and 3 hours or less.

EXAMPLE D4

The preparation and heating of a heat storage material composition were conducted as in Example D1 except that the total weight of sodium acetate trihydrate (analytical grade) and pure water was changed to 25.1 g and the amount of 1-propanol added was changed to 1.6 g. A solution containing sodium acetate, water, and 1-propanol (sodium acetate 54 wt %-water 40 wt %-1-propanol 6 wt %) was prepared.

The solution was then cooled, and the supercooled state-preservation time at −20° C. was determined. The supercooled state-preservation time at −20° C. was longer than that of Comparative Example A5 described above, and was 12 hours or more. Thus, it was confirmed that this solution was particularly highly stable in the supercooled state.

EXAMPLE D5

The preparation and heating of a heat storage material composition were conducted as in Example D1 except that the total weight of sodium acetate trihydrate (analytical grade) and pure water was changed to 25.1 g and the amount of 1-propanol added was changed to 2.0 g. A solution containing sodium acetate, water, and 1-propanol (sodium acetate 53 wt %-water 40 wt %-1-propanol 8 wt %) was prepared.

The solution was then cooled, and the supercooled state-preservation time at −20° C. was determined. The supercooled state-preservation time at −20° C. was longer than that of Comparative Example A6 described above, and was 12 hours or more. Thus, it was confirmed that this solution was particularly highly stable in the supercooled state.

EXAMPLE D6

The preparation and heating of a heat storage material composition were conducted as in Example D1 except that the total weight of sodium acetate trihydrate (analytical grade) and pure water was changed to 25.3 g and the amount of 1-propanol added was changed to 2.5 g. A solution containing sodium acetate, water, and 1-propanol (sodium acetate 52 wt %-water 39 wt %-1-propanol 9 wt %) was prepared.

The solution was then cooled, and the supercooled state-preservation time at −20° C. was determined. The supercooled state-preservation time at −20° C. was longer than that of Comparative Example A7 described above, and was 12 hours or more. Thus, it was confirmed that this solution was particularly highly stable in the supercooled state.

EXAMPLE D7

The preparation and heating of a heat storage material composition were conducted as in Example D1 except that the sodium acetate concentration w in the aqueous sodium acetate solution was changed to 55% by weight, the total weight of sodium acetate trihydrate (analytical grade) and pure water was changed to 25.1 g, and the amount of 1-propanol added was changed to 0.2 g. A solution containing sodium acetate, water, and 1-propanol (sodium acetate 55 wt %-water 45 wt %-1-propanol 1 wt %) was prepared.

The solution was then cooled, and the supercooled state-preservation time at −20° C. was determined. The supercooled state-preservation time at −20° C. was longer than that of Comparative Example A5 described above, and was 1 hour or more and 2 hours or less.

EXAMPLE D8

The preparation and heating of a heat storage material composition were conducted as in Example D1 except that the sodium acetate concentration w in the aqueous sodium acetate solution was changed to 55% by weight, the total weight of sodium acetate trihydrate (analytical grade) and pure water was changed to 25.1 g, and the amount of 1-propanol added was changed to 0.5 g. A solution containing sodium acetate, water, and 1-propanol (sodium acetate 54 wt %-water 44 wt %-1-propanol 2 wt %) was prepared.

The solution was then cooled, and the supercooled state-preservation time at −20° C. was determined. The supercooled state-preservation time at −20° C. was longer than that of Comparative Example A5 described above, and was 6.5 hours or more and 7.5 hours or less.

EXAMPLE D9

The preparation and heating of a heat storage material composition were conducted as in Example D1 except that the sodium acetate concentration w in the aqueous sodium acetate solution was changed to 55% by weight, the total weight of sodium acetate trihydrate (analytical grade) and pure water was changed to 25.1 g, and the amount of 1-propanol added was changed to 1.0 g. A solution containing sodium acetate, water, and 1-propanol (sodium acetate 53 wt %-water 43 wt %-1-propanol 4 wt %) was prepared.

The solution was then cooled, and the supercooled state-preservation time at −20° C. was determined. The supercooled state-preservation time at −20° C. was longer than that of Comparative Example A6 described above, and was 1 hour or more and 2 hours or less.

EXAMPLE D10

The preparation and heating of a heat storage material composition were conducted as in Example D1 except that the sodium acetate concentration w in the aqueous sodium acetate solution was changed to 55% by weight, the total weight of sodium acetate trihydrate (analytical grade) and pure water was changed to 25.1 g, and the amount of 1-propanol added was changed to 1.6 g. A solution containing sodium acetate, water, and 1-propanol (sodium acetate 52 wt %-water 42 wt %-1-propanol 6 wt %) was prepared.

The solution was then cooled, and the supercooled state-preservation time at −20° C. was determined. The supercooled state-preservation time at −20° C. was longer than that of Comparative Example A7 described above, and was 3 hours or more and 4 hours or less.

EXAMPLE D11

The preparation and heating of a heat storage material composition were conducted as in Example D1 except that the sodium acetate concentration w in the aqueous sodium acetate solution was changed to 53% by weight, the total weight of sodium acetate trihydrate (analytical grade) and pure water was changed to 25.1 g, and the amount of 1-propanol added was 0.3 g. A solution containing sodium acetate, water, and 1-propanol (sodium acetate 52 wt %-water 47 wt %-1-propanol 1 wt %) was prepared.

The solution was then cooled, and the supercooled state-preservation time at −20° C. was determined. The supercooled state-preservation time at −20° C. was longer than that of Comparative Example A7 described above, and was 1 hour or more and 2 hours or less.

EXAMPLE D12

The preparation and heating of a heat storage material composition were conducted as in Example D1 except that the sodium acetate concentration w in the aqueous sodium acetate solution was changed to 53% by weight, the total weight of sodium acetate trihydrate (analytical grade) and pure water was changed to 25.0 g, and the amount of 1-propanol added was changed to 0.5 g. A solution containing sodium acetate, water, and 1-propanol (sodium acetate 52 wt %-water 46 wt %-1-propanol 2 wt %) was prepared.

The solution was then cooled, and the supercooled state-preservation time at −20° C. was determined. The supercooled state-preservation time at −20° C. was longer than that of Comparative Example A7 described above, and was 12 hours or more. Thus, it was confirmed that this solution was particularly highly stable in the supercooled state.

COMPARATIVE EXAMPLE DC1

The preparation and heating of a heat storage material composition were conducted as in Example D1 except that the sodium acetate concentration w in the aqueous sodium acetate solution was changed to 53% by weight, the total weight of sodium acetate trihydrate (analytical grade) and pure water was 25.2 g, and the amount of 1-propanol added was changed to 1.1 g. A solution containing sodium acetate, water, and 1-propanol (sodium acetate 51 wt %-water 45 wt %-1-propanol 4 wt %) was prepared.

The solution was then cooled, and the supercooled state-preservation time at −20° C. was determined. The supercooled state-preservation time at −20° C. was 30 minutes or more and less than 1 hour, and was shorter than that of Comparative Example A8 in which an alcohol was not added. In this Comparative Example, since the concentration Ws of sodium acetate is low, the amount of latent heat is small.

TABLE 4

| Example and Comparative Example | Alcohol Type | Alcohol Amount added [g] | Aqueous sodium acetate solution Concentration w [wt %] | Aqueous sodium acetate solution Weight [g] | Concentration [wt %] Sodium acetate Ws | Concentration [wt %] Water Ww | Concentration [wt %] Alcohol Wa | Supercooled state-preservation time at −20° C. |
|---|---|---|---|---|---|---|---|---|
| D1 | 1-Propanol | 0.3 g | 57% | 25.2 g | 56% | 43% | 1% | 1 to 2 h |
| D2 | 1-Propanol | 0.5 g | 57% | 25.2 g | 56% | 42% | 2% | 3 to 5 h |
| D3 | 1-Propanol | 1.0 g | 57% | 25.3 g | 55% | 41% | 4% | 2 to 3 h |
| D4 | 1-Propanol | 1.6 g | 57% | 25.1 g | 54% | 40% | 6% | 12 h or more |
| D5 | 1-Propanol | 2.0 g | 57% | 25.1 g | 53% | 40% | 8% | 12 h or more |
| D6 | 1-Propanol | 2.5 g | 57% | 25.3 g | 52% | 39% | 9% | 12 h or more |

TABLE 4-continued

| Example and Comparative Example | Alcohol Type | Alcohol Amount added [g] | Aqueous sodium acetate solution Concentration w [wt %] | Aqueous sodium acetate solution Weight [g] | Concentration [wt %] Sodium acetate Ws | Concentration [wt %] Water Ww | Concentration [wt %] Alcohol Wa | Supercooled state-preservation time at −20° C. |
|---|---|---|---|---|---|---|---|---|
| D7 | 1-Propanol | 0.2 g | 55% | 25.1 g | 55% | 45% | 1% | 1 to 2 h |
| D8 | 1-Propanol | 0.5 g | 55% | 25.1 g | 54% | 44% | 2% | 6.5 to 7.5 h |
| D9 | 1-Propanol | 1.0 g | 55% | 25.1 g | 53% | 43% | 4% | 1 to 2 h |
| D10 | 1-Propanol | 1.6 g | 55% | 25.1 g | 52% | 42% | 6% | 3 to 4 h |
| D11 | 1-Propanol | 0.3 g | 53% | 25.1 g | 52% | 47% | 1% | 1 to 2 h |
| D12 | 1-Propanol | 0.5 g | 53% | 25.0 g | 52% | 46% | 2% | 12 h or more |
| DC1 | 1-Propanol | 1.1 g | 53% | 25.2 g | 51% | 45% | 4% | 30 min to 1 h |

The results of Examples D1 to D12, Comparative Examples A1 to A9, and Comparative Example DC1 showed that, by adding 1-propanol to an aqueous sodium acetate solution, the stability of the supercooled state could be improved while a decrease in the thermal storage density was suppressed.

On the basis of the results of Examples D1 to D12, Comparative Examples A1 to A9, and Comparative Example DC1, a composition range in which both a large amount of latent heat and high stability of the supercooled state can be realized was found in the heat storage material compositions containing sodium acetate, water, and 1-propanol. The composition range will be described below.

Figure 3:
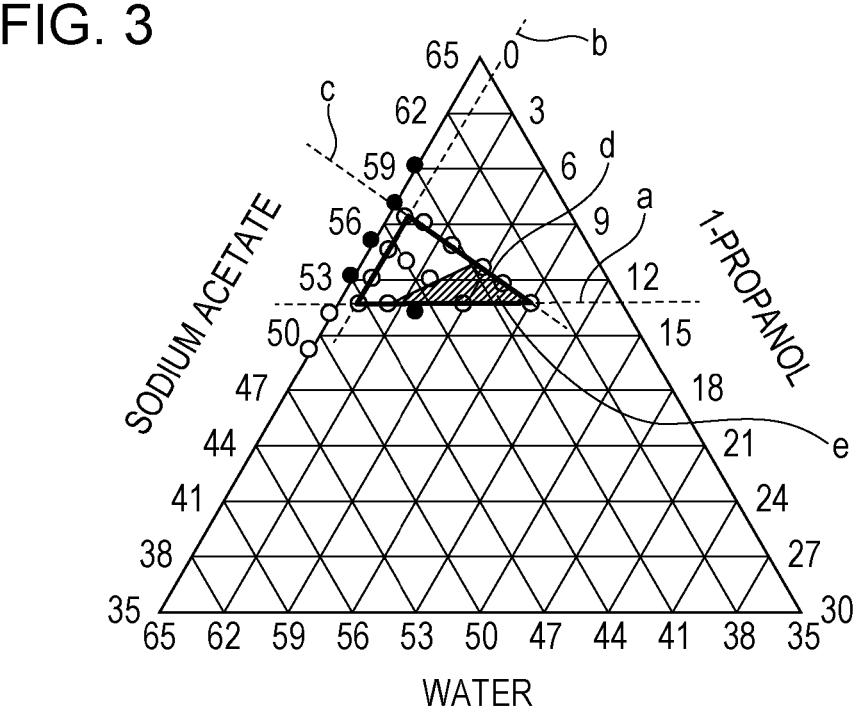
FIG. 3 is a diagram showing a composition range in which the supercooled state is stable in heat storage material compositions containing sodium acetate, water, and 1-propanol.

FIG. 3 is a triangular diagram showing the compositions of sodium acetate, water, and 1-propanol in units of weight percent. As described with reference to FIG. 1, the broken lines a, b, and c in FIG. 3 respectively indicate Ws=52 (wt %), Wa=1 (wt %), and R=57/43.

Examples D1 to D12 described above each have a composition in the region surrounded by the broken lines a, b, and c. Accordingly, it was confirmed that, also in the case where 1-propanol was used as an alcohol, when the composition of the components contained in a heat storage material composition was located in the region surrounded by the broken lines a, b, and c, the stability of the supercooled state could be made higher than that of existing heat storage material compositions while a decrease in the amount of latent heat was suppressed.

Furthermore, in FIG. 3, in a region e (shown by the hatched region) surrounded by lines connecting three points indicating the concentrations Ws, Ww, and Wa of respective components of Examples D4, D6, and D12, the supercooled state-preservation time in the low-temperature environment of −20° C. is 12 hours or more, and thus the supercooled state can be further stably maintained.

(E) Stability of Supercooled State when 2-Propanol was Added

Next, 2-propanol, which is a monohydric alcohol, was added to a sodium acetate solution containing sodium acetate as a main component. The effect of the addition of 2-propanol on the stability of the supercooled state was examined.

In Examples E1 to E12 and Comparative Examples EC1 to EC3, heat storage material compositions containing sodium acetate, water, and 2-propanol were prepared, and the supercooled state-preservation time of each of the heat storage material compositions was determined.

Methods for preparing heat storage material compositions and measurement results of the supercooled state-preservation time of the Examples and Comparative Examples are described below. The method for measuring the supercooled state-preservation time is the same as that used in Comparative Examples A1 to A9 described above, and thus the description of the method is omitted. Table 5 shows the measurement results of the supercooled state-preservation time of each of the Examples and Comparative Examples.

EXAMPLE E1

A composition containing sodium acetate trihydrate (analytical grade) manufactured by Kanto Chemical Co., Inc. and pure water was prepared in a glass sample bottle such that the sodium acetate concentration w became 53% by weight. The total weight of sodium acetate and water was adjusted to 25.1 g. Subsequently, the sample bottle containing the composition was placed in a drying furnace set at 70° C. to heat the composition. Thus, an aqueous sodium acetate solution was prepared. Next, 0.5 g of 2-propanol was added to the aqueous sodium acetate solution to prepare a heat storage material composition of this Example.

The heat storage material composition was heated in the drying furnace set at 70° C. Thus, a solution containing sodium acetate, water, and 2-propanol (sodium acetate 52 wt %-water 46 wt %-2-propanol 2 wt %) was prepared.

The solution was then cooled as in Comparative Examples A1 to A9 described above, and the supercooled state-preservation time at −20° C. was determined. The supercooled state-preservation time at −20° C. was longer than that of Comparative Example A7 described above, and was 1 hour or more and 2 hours or less.

EXAMPLE E2

The preparation and heating of a heat storage material composition were conducted as in Example E1 except that the sodium acetate concentration w in the aqueous sodium acetate solution was changed to 55% by weight, and the total weight of sodium acetate trihydrate (analytical grade) and pure water was changed to 25.0 g. A solution containing sodium acetate, water, and 2-propanol (sodium acetate 54 wt %-water 44 wt %-2-propanol 2 wt %) was prepared.

The supercooled state-preservation time at −20° C. of this solution was longer than that of Comparative Example A5 described above, and was 1 hour or more and 2 hours or less.

EXAMPLE E3

The preparation and heating of a heat storage material composition were conducted as in Example E1 except that the sodium acetate concentration w in the aqueous sodium acetate solution was changed to 55% by weight, the total weight of sodium acetate trihydrate (analytical grade) and pure water was changed to 25.0 g, and the amount of 2-propanol added was changed to 1.0 g. A solution containing sodium acetate, water, and 2-propanol (sodium acetate 53 wt %-water 43 wt %-2-propanol 4 wt %) was prepared.

The supercooled state-preservation time at −20° C. of this solution was longer than that of Comparative Example A6 described above, and was 1 hour or more and 2 hours or less.

EXAMPLE E4

The preparation and heating of a heat storage material composition were conducted as in Example E1 except that the sodium acetate concentration w in the aqueous sodium acetate solution was changed to 55% by weight, the total weight of sodium acetate trihydrate (analytical grade) and pure water was changed to 25.0 g, and the amount of 2-propanol added was changed to 1.5 g. A solution containing sodium acetate, water, and 2-propanol (sodium acetate 52 wt %-water 42 wt %-2-propanol 6 wt %) was prepared.

The solution was then cooled, and the supercooled state-preservation time at −20° C. was determined. The supercooled state-preservation time at −20° C. was longer than that of Comparative Example A7 described above, and was 2 hours or more and 3 hours or less.

EXAMPLE E5

The preparation and heating of a heat storage material composition were conducted as in Example E1 except that the sodium acetate concentration w in the aqueous sodium acetate solution was changed to 55% by weight, the total weight of sodium acetate trihydrate (analytical grade) and pure water was 25.1 g, and the amount of 2-propanol added was changed to 0.3 g. A solution containing sodium acetate, water, and 2-propanol (sodium acetate 56 wt %-water 43 wt %-2-propanol 1 wt %) was prepared.

The supercooled state-preservation time at −20° C. of this solution was longer than that of Comparative Example A3 described above, and was 1 hour or more and 2 hours or less.

EXAMPLE E6

The preparation and heating of a heat storage material composition were conducted as in Example E1 except that the sodium acetate concentration w in the aqueous sodium acetate solution was 53% by weight, the total weight of sodium acetate trihydrate (analytical grade) and pure water was changed to 25.0 g, and the amount of 2-propanol added was changed to 0.3 g. A solution containing sodium acetate, water, and 2-propanol (sodium acetate 52 wt %-water 47 wt %-2-propanol 1 wt %) was prepared.

The supercooled state-preservation time at −20° C. of this solution was longer than that of Comparative Example A7 described above, and the effect of the addition of the alcohol was observed. However, the supercooled state-preservation time at −20° C. of this solution was 30 minutes or more and less than 1 hour.

EXAMPLE E7

The preparation and heating of a heat storage material composition were conducted as in Example E1 except that the sodium acetate concentration w in the aqueous sodium acetate solution was changed to 55% by weight, the total weight of sodium acetate trihydrate (analytical grade) and pure water was changed to 25.0 g, and the amount of 2-propanol added was changed to 0.3 g. A solution containing sodium acetate, water, and 2-propanol (sodium acetate 54 wt %-water 45 wt %-2-propanol 1 wt %) was prepared.

The supercooled state-preservation time at −20° C. of this solution was longer than that of Comparative Example A5 described above, and the effect of the addition of the alcohol was observed. However, the supercooled state-preservation time at −20° C. of this solution was 30 minutes or more and less than 1 hour.

EXAMPLE E8

The preparation and heating of a heat storage material composition were conducted as in Example E1 except that the sodium acetate concentration w in the aqueous sodium acetate solution was changed to 57% by weight, the total weight of sodium acetate trihydrate (analytical grade) and pure water was changed to 25.0 g, and the amount of 2-propanol added was 0.5 g. A solution containing sodium acetate, water, and 2-propanol (sodium acetate 56 wt %-water 42 wt %-2-propanol 2 wt %) was prepared.

The supercooled state-preservation time at −20° C. of this solution was longer than that of Comparative Example A3 described above, and the effect of the addition of the alcohol was observed. However, the supercooled state-preservation time at −20° C. of this solution was 30 minutes or more and less than 1 hour.

EXAMPLE E9

The preparation and heating of a heat storage material composition were conducted as in Example E1 except that the sodium acetate concentration w in the aqueous sodium acetate solution was changed to 57% by weight, the total weight of sodium acetate trihydrate (analytical grade) and pure water was changed to 25.0 g, and the amount of 2-propanol added was changed to 1.0 g. A solution containing sodium acetate, water, and 2-propanol (sodium acetate 55 wt %-water 41 wt %-2-propanol 4 wt %) was prepared.

The supercooled state-preservation time at −20° C. of this solution was longer than that of Comparative Example A4 described above, and the effect of the addition of the alcohol was observed. However, the supercooled state-preservation time at −20° C. of this solution was 30 minutes or more and less than 1 hour.

EXAMPLE E10

The preparation and heating of a heat storage material composition were conducted as in Example E1 except that the sodium acetate concentration w in the aqueous sodium acetate solution was changed to 57% by weight, the total weight of sodium acetate trihydrate (analytical grade) and pure water was changed to 25.0 g, and the amount of 2-propanol added was changed to 1.5 g. A solution containing sodium acetate, water, and 2-propanol (sodium acetate 54 wt %-water 41 wt %-2-propanol 6 wt %) was prepared.

The supercooled state-preservation time at −20° C. of this solution was longer than that of Comparative Example A5 described above, and the effect of the addition of the alcohol was observed. However, the supercooled state-preservation time at −20° C. of this solution was 30 minutes or more and less than 1 hour.

EXAMPLE E11

The preparation and heating of a heat storage material composition were conducted as in Example E1 except that the sodium acetate concentration w in the aqueous sodium acetate solution was changed to 57% by weight, the total weight of sodium acetate trihydrate (analytical grade) and pure water was changed to 25.0 g, and the amount of 2-propanol added was changed to 2.0 g. A solution containing sodium acetate, water, and 2-propanol (sodium acetate 53 wt %-water 40 wt %-2-propanol 7 wt %) was prepared.

The supercooled state-preservation time at −20° C. of this solution was longer than that of Comparative Example A6 described above, and the effect of the addition of the alcohol was observed. However, the supercooled state-preservation time at −20° C. of this solution was 30 minutes or more and less than 1 hour.

EXAMPLE E12

The preparation and heating of a heat storage material composition were conducted as in Example E1 except that the sodium acetate concentration w in the aqueous sodium acetate solution was changed to 57% by weight, the total weight of sodium acetate trihydrate (analytical grade) and pure water was changed to 25.0 g, and the amount of 2-propanol added was changed to 2.5 g. A solution containing sodium acetate, water, and 2-propanol (sodium acetate 52 wt %-water 39 wt %-2-propanol 9 wt %) was prepared.

The supercooled state-preservation time at −20° C. of this solution was longer than that of Comparative Example A7 described above, and the effect of the addition of the alcohol was observed. However, the supercooled state-preservation time at −20° C. of this solution was 30 minutes or more and less than 1 hour.

COMPARATIVE EXAMPLE EC1

The preparation and heating of a heat storage material composition were conducted as in Example E1 except that the amount of 2-propanol added was changed to 1.0 g. A solution containing sodium acetate, water, and 2-propanol (sodium acetate 51 wt %-water 45 wt %-2-propanol 4 wt %) was prepared.

The supercooled state-preservation time at −20° C. of this solution was shorter than that of Comparative Example A8 described above, and was 2 hours or more and 3 hours or less. In addition, since the concentration Ws of sodium acetate is low, the amount of latent heat per weight of the composition is small.

COMPARATIVE EXAMPLE EC2

The preparation and heating of a heat storage material composition were conducted as in Example E1 except that the sodium acetate concentration w in the aqueous sodium acetate solution was changed to 55% by weight, the total weight of sodium acetate trihydrate (analytical grade) and pure water was 25.1 g, and the amount of 2-propanol added was changed to 2.1 g. A solution containing sodium acetate, water, and 2-propanol (sodium acetate 51 wt %-water 42 wt %-2-propanol 8 wt %) was prepared.

The supercooled state-preservation time at −20° C. of this solution was shorter than that of Comparative Example A8 described above, and was 1 hour or more and 2 hours or less. In addition, since the concentration Ws of sodium acetate is low, the amount of latent heat per weight of the composition is small.

COMPARATIVE EXAMPLE EC3

The preparation and heating of a heat storage material composition were conducted as in Example E1 except that the sodium acetate concentration w in the aqueous sodium acetate solution was changed to 57% by weight, the total weight of sodium acetate trihydrate (analytical grade) and pure water was changed to 25.0 g, and the amount of 2-propanol added was changed to 3.0 g. A solution containing sodium acetate, water, and 2-propanol (sodium acetate 51 wt %-water 38 wt %-2-propanol 11 wt %) was prepared.

The solution was then cooled, and the supercooled state-preservation time at −20° C. was determined. The supercooled state-preservation time at −20° C. was shorter than that of Comparative Example A8 described above, and was 30 minutes or more and less than 1 hour. In addition, since the concentration Ws of sodium acetate is low, the amount of latent heat per weight of the composition is small.

TABLE 5

| Example and Comparative Example | Alcohol Type | Amount added [g] | Aqueous sodium acetate solution Concentration w [wt %] | Weight [g] | Concentration [wt %] Sodium acetate Ws | Water Ww | Alcohol Wa | Supercooled state-preservation time at −20° C. |
|---|---|---|---|---|---|---|---|---|
| E1 | 2-Propanol | 0.5 g | 53% | 25.1 g | 52% | 46% | 2% | 1 to 2 h |
| E2 | 2-Propanol | 0.5 g | 55% | 25.0 g | 54% | 44% | 2% | 1 to 2 h |
| E3 | 2-Propanol | 1.0 g | 55% | 25.0 g | 53% | 43% | 4% | 1 to 2 h |
| E4 | 2-Propanol | 1.5 g | 55% | 25.0 g | 52% | 42% | 6% | 2 to 3 h |
| E5 | 2-Propanol | 0.3 g | 55% | 25.1 g | 56% | 43% | 1% | 1 to 2 h |
| E6 | 2-Propanol | 0.3 g | 53% | 25.0 g | 52% | 47% | 1% | 30 min to 1 h |
| E7 | 2-Propanol | 0.3 g | 55% | 25.0 g | 54% | 45% | 1% | 30 min to 1 h |
| E8 | 2-Propanol | 0.5 g | 57% | 25.0 g | 56% | 42% | 2% | 30 min to 1 h |
| E9 | 2-Propanol | 1.0 g | 57% | 25.0 g | 55% | 41% | 4% | 30 min to 1 h |
| E10 | 2-Propanol | 1.5 g | 57% | 25.0 g | 54% | 41% | 6% | 30 min to 1 h |
| E11 | 2-Propanol | 2.0 g | 57% | 25.0 g | 53% | 40% | 7% | 30 min to 1 h |
| E12 | 2-Propanol | 2.5 g | 57% | 25.0 g | 52% | 39% | 9% | 30 min to 1 h |
| EC1 | 2-Propanol | 1.0 g | 53% | 25.1 g | 51% | 45% | 4% | 2 to 3 h |
| EC2 | 2-Propanol | 2.1 g | 55% | 25.1 g | 51% | 42% | 8% | 1 to 2 h |
| EC3 | 2-Propanol | 3.0 g | 57% | 25.0 g | 51% | 38% | 11% | 30 min to 1 h |

The results of Examples E1 to E12, Comparative Examples A1 to A9, and Comparative Examples EC1 to EC3 showed that, by adding 2-propanol to an aqueous sodium acetate solution, the stability of the supercooled state could be improved while a decrease in the thermal storage density was suppressed.

On the basis of the results of Examples E1 to E12, Comparative Examples A1 to A9, and Comparative Examples EC1 to EC3, a composition range in which both a large amount of latent heat and high stability of the supercooled state can be realized was found in the heat storage material compositions containing sodium acetate, water, and 2-propanol. The composition range will be described below.

Figure 4:
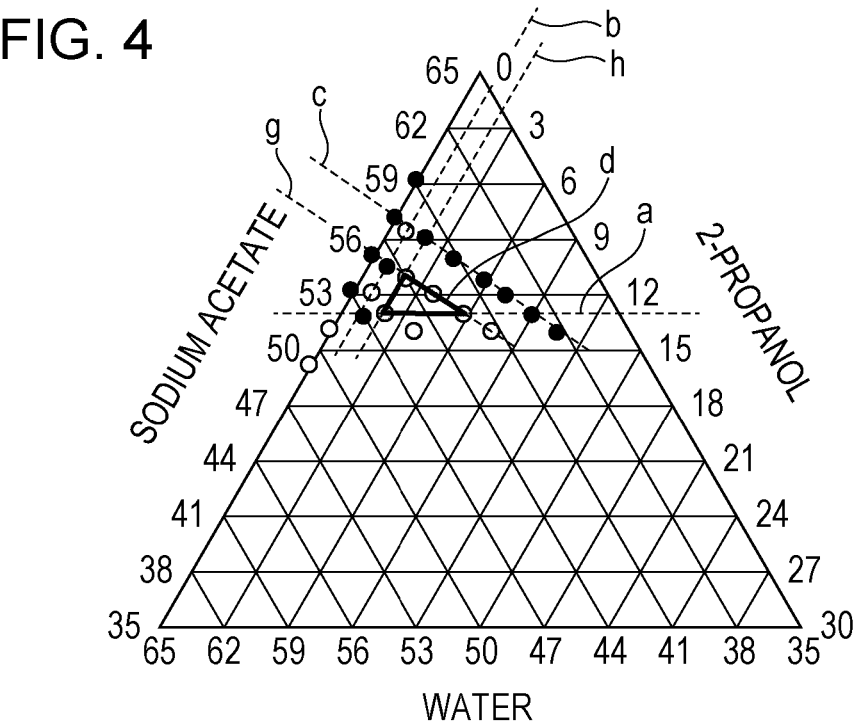
FIG. 4 is a diagram showing a composition range in which the supercooled state is stable in heat storage material compositions containing sodium acetate, water, and 2-propanol.

FIG. 4 is a triangular diagram showing the compositions of sodium acetate, water, and 2-propanol in units of weight percent. As described with reference to FIG. 1, the broken lines a, b, and c in FIG. 4 respectively indicate Ws=52 (wt %), Wa=1 (wt %), and R=57/43.

Examples E1 to E12 described above each have a composition in the region surrounded by the broken lines a, b, and c. Accordingly, it was confirmed that, also in the case where 2-propanol was used as an alcohol, when the composition of the components contained in a heat storage material composition was located in the region surrounded by the broken lines a, b, and c, the stability of the supercooled state could be made higher than that of existing heat storage material compositions while a decrease in the amount of latent heat was suppressed.

Furthermore, in FIG. 4, the stability of the supercooled state can be further improved in a region d (shown by the line d) surrounded by the broken line a, the broken line g indicating a weight ratio R of sodium acetate to water of 55/45, and the broken line h indicating a concentration Wa of 2-propanol of 2% by weight. Specifically, in the case where 2-propanol is used as an alcohol, the more useful composition range of the heat storage material composition is as follows. The weight ratio R of sodium acetate to water is 55/45 or less, the concentration Wa of 2-propanol is 2% by weight or more, and the concentration Ws of sodium acetate is 52% by weight or more. Among the Examples described above, Examples E1 to E4 each have a composition in the region d.

(F) Stability of Supercooled State when n-Butyl Alcohol was Added

Next, n-butyl alcohol, which is a monohydric alcohol, was added to a sodium acetate solution containing sodium acetate as a main component. The effect of the addition of n-butyl alcohol on the stability of the supercooled state was examined.

In Examples F1 to F12, heat storage material compositions containing sodium acetate, water, and n-butyl alcohol were prepared, and the supercooled state-preservation time of each of the heat storage material compositions was determined.

Methods for preparing heat storage material compositions and measurement results of the supercooled state-preservation time of the Examples are described below. The method for measuring the supercooled state-preservation time is the same as that used in Comparative Examples A1 to A9 described above, and thus the description of the method is omitted. Table 6 shows the measurement results of the supercooled state-preservation time of each of the Examples.

EXAMPLE F1

A composition containing sodium acetate trihydrate (analytical grade) manufactured by Kanto Chemical Co., Inc. and pure water was prepared in a glass sample bottle such that the sodium acetate concentration w became 57% by weight. The total weight of sodium acetate and water was adjusted to 25.2 g. Subsequently, the sample bottle containing the composition was placed in a drying furnace set at 70° C. to heat the composition. Thus, an aqueous sodium acetate solution was prepared. Next, 0.5 g of n-butyl alcohol was added to the aqueous sodium acetate solution to prepare a heat storage material composition of this Example.

The heat storage material composition was heated in the drying furnace set at 70° C. Thus, a solution containing sodium acetate, water, and n-butyl alcohol (sodium acetate 56 wt %-water 42 wt %-n-butyl alcohol 2 wt %) was prepared.

The solution was then cooled as in Comparative Examples A1 to A9 described above, and the supercooled state-preservation time at −20° C. was determined. The supercooled state-preservation time at −20° C. was longer than that of Comparative Example A3 described above, and was 1 hour or more and 2 hours or less.

EXAMPLE F2

The preparation and heating of a heat storage material composition were conducted as in Example F1 except that the total weight of sodium acetate trihydrate (analytical grade) and pure water was changed to 25.1 g and the amount of n-butyl alcohol added was changed to 1.0 g. A solution containing sodium acetate, water, and n-butyl alcohol (sodium acetate 55 wt %-water 41 wt %-n-butyl alcohol 4 wt %) was prepared.

The supercooled state-preservation time at −20° C. of this solution was longer than that of Comparative Example A4 described above, and was 12 hours or more. Thus, it was confirmed that this solution was particularly highly stable in the supercooled state.

EXAMPLE F3

The preparation and heating of a heat storage material composition were conducted as in Example F1 except that the total weight of sodium acetate trihydrate (analytical grade) and pure water was changed to 25.0 g and the amount of n-butyl alcohol added was changed to 1.5 g. A solution containing sodium acetate, water, and n-butyl alcohol (sodium acetate 54 wt %-water 41 wt %-n-butyl alcohol 6 wt %) was prepared.

The supercooled state-preservation time at −20° C. of this solution was longer than that of Comparative Example A5 described above, and was 12 hours or more. Thus, it was confirmed that this solution was particularly highly stable in the supercooled state.

EXAMPLE F4

The preparation and heating of a heat storage material composition were conducted as in Example F1 except that the total weight of sodium acetate trihydrate (analytical grade) and pure water was changed to 25.1 g and the amount of n-butyl alcohol added was changed to 2.0 g. A solution containing sodium acetate, water, and n-butyl alcohol (sodium acetate 53 wt %-water 40 wt %-n-butyl alcohol 8 wt %) was prepared.

The supercooled state-preservation time at −20° C. of this solution was longer than that of Comparative Example A6 described above, and was 12 hours or more. Thus, it was confirmed that this solution was particularly highly stable in the supercooled state.

EXAMPLE F5

The preparation and heating of a heat storage material composition were conducted as in Example F1 except that the total weight of sodium acetate trihydrate (analytical grade) and pure water was 25.2 g and the amount of n-butyl alcohol added was changed to 2.5 g. A solution containing sodium acetate, water, and n-butyl alcohol (sodium acetate 52 wt %-water 39 wt %-n-butyl alcohol 9 wt %) was prepared.

The supercooled state-preservation time at −20° C. of this solution was longer than that of Comparative Example A7 described above, and was 12 hours or more. Thus, it was confirmed that this solution was particularly highly stable in the supercooled state.

EXAMPLE F6

The preparation and heating of a heat storage material composition were conducted as in Example F1 except that the sodium acetate concentration w in the aqueous sodium acetate solution was changed to 55% by weight, the total weight of sodium acetate trihydrate (analytical grade) and pure water was 25.2 g, and the amount of n-butyl alcohol added was changed to 0.5 g. A solution containing sodium acetate, water, and n-butyl alcohol (sodium acetate 54 wt %-water 44 wt %-n-butyl alcohol 2 wt %) was prepared.

The supercooled state-preservation time at −20° C. of this solution was longer than that of Comparative Example A5 described above, and was 1 hour or more and 2 hours or less.

EXAMPLE F7

The preparation and heating of a heat storage material composition were conducted as in Example F1 except that the sodium acetate concentration w in the aqueous sodium acetate solution was changed to 55% by weight, the total weight of sodium acetate trihydrate (analytical grade) and pure water was changed to 25.0 g, and the amount of n-butyl alcohol added was changed to 1.1 g. A solution containing sodium acetate, water, and n-butyl alcohol (sodium acetate 53 wt %-water 43 wt %-n-butyl alcohol 4 wt %) was prepared.

The supercooled state-preservation time at −20° C. of this solution was longer than that of Comparative Example A6 described above, and was 12 hours or more. Thus, it was confirmed that this solution was particularly highly stable in the supercooled state.

EXAMPLE F8

The preparation and heating of a heat storage material composition were conducted as in Example F1 except that the sodium acetate concentration w in the aqueous sodium acetate solution was changed to 55% by weight, the total weight of sodium acetate trihydrate (analytical grade) and pure water was changed to 25.0 g, and the amount of n-butyl alcohol added was changed to 1.5 g. A solution containing sodium acetate, water, and n-butyl alcohol (sodium acetate 52 wt %-water 42 wt %-n-butyl alcohol 6 wt %) was prepared.

The supercooled state-preservation time at −20° C. of this solution was longer than that of Comparative Example A7 described above, and was 12 hours or more. Thus, it was confirmed that this solution was particularly highly stable in the supercooled state.

EXAMPLE F9

The preparation and heating of a heat storage material composition were conducted as in Example F1 except that the sodium acetate concentration w in the aqueous sodium acetate solution was changed to 53% by weight, the total weight of sodium acetate trihydrate (analytical grade) and pure water was changed to 25.0 g, and the amount of n-butyl alcohol added was changed to 0.3 g. A solution containing sodium acetate, water, and n-butyl alcohol (sodium acetate 52 wt %-water 47 wt %-n-butyl alcohol 1 wt %) was prepared.

The supercooled state-preservation time at −20° C. of this solution was longer than that of Comparative Example A7 described above, and was 1 hour or more and 2 hours or less.

EXAMPLE F10

The preparation and heating of a heat storage material composition were conducted as in Example F1 except that the sodium acetate concentration w in the aqueous sodium acetate solution was changed to 53% by weight, the total weight of sodium acetate trihydrate (analytical grade) and pure water was changed to 25.1 g, and the amount of n-butyl alcohol added was changed to 0.6 g. A solution containing sodium acetate, water, and n-butyl alcohol (sodium acetate 52 wt %-water 46 wt %-n-butyl alcohol 2 wt %) was prepared.

The supercooled state-preservation time at −20° C. of this solution was longer than that of Comparative Example A7 described above, and was 12 hours or more. Thus, it was confirmed that this solution was particularly highly stable in the supercooled state.

EXAMPLE F11

The preparation and heating of a heat storage material composition were conducted as in Example F1 except that the sodium acetate concentration w in the aqueous sodium acetate solution was 57% by weight, the total weight of sodium acetate trihydrate (analytical grade) and pure water was changed to 25.1 g, and the amount of n-butyl alcohol added was changed to 0.3 g. A solution containing sodium acetate, water, and n-butyl alcohol (sodium acetate 56 wt %-water 43 wt %-n-butyl alcohol 1 wt %) was prepared.

The supercooled state-preservation time at −20° C. of this solution was longer than that of Comparative Example A3 described above, and the effect of the addition of the alcohol was observed. However, the supercooled state-preservation time at −20° C. of this solution was 30 minutes or more and less than 1 hour.

EXAMPLE F12

The preparation and heating of a heat storage material composition were conducted as in Example F1 except that the sodium acetate concentration w in the aqueous sodium acetate solution was changed to 55% by weight, the total weight of sodium acetate trihydrate (analytical grade) and pure water was changed to 25.1 g, and the amount of n-butyl alcohol added was changed to 0.3 g. A solution containing sodium acetate, water, and n-butyl alcohol (sodium acetate 54 wt %-water 45 wt %-n-butyl alcohol 1 wt %) was prepared.

The supercooled state-preservation time at −20° C. of this solution was longer than that of Comparative Example A5 described above, and the effect of the addition of the alcohol was observed. However, the supercooled state-preservation time at −20° C. of this solution was 30 minutes or more and less than 1 hour.

TABLE 6

| Example | Alcohol Type | Alcohol Amount added [g] | Aqueous sodium acetate solution Concentration w [wt %] | Aqueous sodium acetate solution Weight [g] | Concentration [wt %] Sodium acetate Ws | Concentration [wt %] Water Ww | Concentration [wt %] Alcohol Wa | Supercooled state-preservation time at −20° C. |
|---|---|---|---|---|---|---|---|---|
| F1  | n-Butyl alcohol | 0.5 g | 57% | 25.2 g | 56% | 42% | 2% | 1 to 2 h |
| F2  | n-Butyl alcohol | 1.0 g | 57% | 25.1 g | 55% | 41% | 4% | 12 h or more |
| F3  | n-Butyl alcohol | 1.5 g | 57% | 25.0 g | 54% | 41% | 6% | 12 h or more |
| F4  | n-Butyl alcohol | 2.0 g | 57% | 25.1 g | 53% | 40% | 8% | 12 h or more |
| F5  | n-Butyl alcohol | 2.5 g | 57% | 25.2 g | 52% | 39% | 9% | 12 h or more |
| F6  | n-Butyl alcohol | 0.5 g | 55% | 25.2 g | 54% | 44% | 2% | 1 to 2 h |
| F7  | n-Butyl alcohol | 1.1 g | 55% | 25.0 g | 53% | 43% | 4% | 12 h or more |
| F8  | n-Butyl alcohol | 1.5 g | 55% | 25.0 g | 52% | 42% | 6% | 12 h or more |
| F9  | n-Butyl alcohol | 0.3 g | 53% | 25.0 g | 52% | 47% | 1% | 1 to 2 h |
| F10 | n-Butyl alcohol | 0.6 g | 53% | 25.1 g | 52% | 46% | 2% | 12 h or more |
| F11 | n-Butyl alcohol | 0.3 g | 57% | 25.1 g | 56% | 43% | 1% | 30 min to 1 h |
| F12 | n-Butyl alcohol | 0.3 g | 55% | 25.1 g | 54% | 45% | 1% | 30 min to 1 h |

The results of Examples F1 to F12 and Comparative Examples A1 to A9 showed that, by adding n-butyl alcohol to an aqueous sodium acetate solution, the stability of the supercooled state could be improved while a decrease in the thermal storage density was suppressed.

On the basis of the results of Examples F1 to F12 and Comparative Examples A1 to A9, a composition range in which both a large amount of latent heat and high stability of the supercooled state can be realized was found in the heat storage material compositions containing sodium acetate, water, and n-butyl alcohol. The composition range will be described below.

Figure 5:
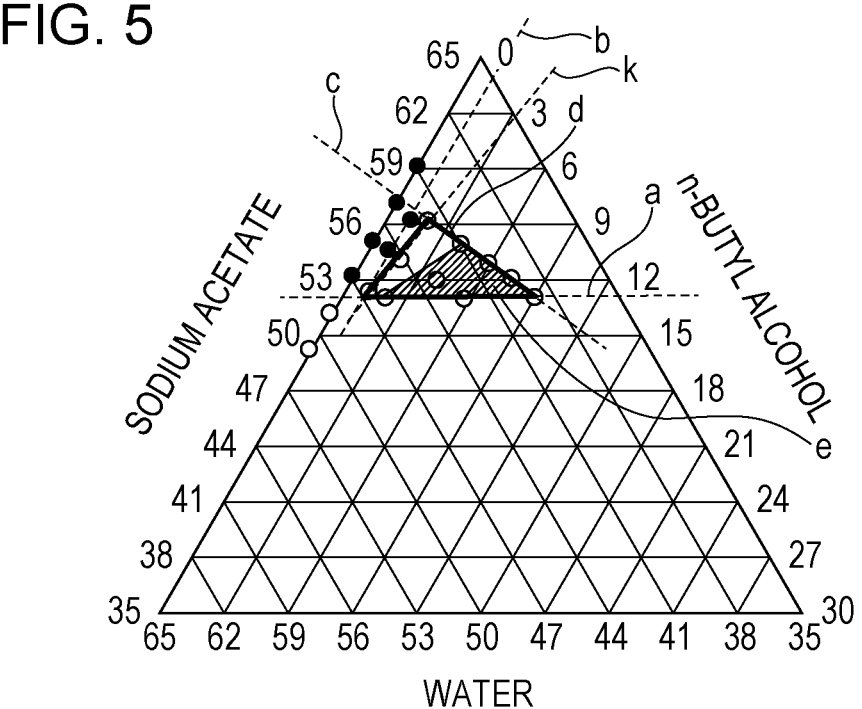
FIG. 5 is a diagram showing a composition range in which the supercooled state is stable in heat storage material compositions containing sodium acetate, water, and n-butyl alcohol.

FIG. 5 is a triangular diagram showing the compositions of sodium acetate, water, and n-butyl alcohol in units of weight percent. As described with reference to FIG. 1, the broken lines a, b, and c in FIG. 5 respectively indicate $W_s=52$ (wt %), $W_a=1$ (wt %), and $R=57/43$.

Examples F1 to F12 described above each have a composition in the region surrounded by the broken lines a, b, and c. Accordingly, it was confirmed that, also in the case where n-butyl alcohol was used as an alcohol, when the composition of the components contained in a heat storage material composition was located in the region surrounded by the broken lines a, b, and c, the stability of the supercooled state could be made higher than that of existing heat storage material compositions while a decrease in the amount of latent heat was suppressed.

Regarding heat storage material compositions in which n-butyl alcohol is used as an alcohol, the stability of the supercooled state can be further improved in a region d (shown by the line d in FIG. 5) where the concentration $W_a$ of n-butyl alcohol is equal to or more than a concentration represented by a straight line connecting a first point A and a second point B described below, the region d being a part of the region surrounded by the broken lines a, b, and c.

A (sodium acetate: 52 wt %, water: 47 wt %, alcohol: 1 wt %)

B (sodium acetate: 56 wt %, water: 42 wt %, alcohol: 2 wt %)

In FIG. 5, the straight line connecting the first point A and the second point B is shown by the broken line k. Among the Examples described above, Examples F1 to F10 each have a composition located in the region d.

Furthermore, in FIG. 5, in a region e (shown by the hatched region) surrounded by lines connecting three points indicating the concentrations Ws, Ww, and Wa of respective components of Examples F2, F5, and F10, the supercooled state-preservation time in the low-temperature environment of −20° C. is 12 hours or more, and thus the supercooled state can be further stably maintained.

(G) Stability of Supercooled State when Tert-Butyl Alcohol was Added

Next, tert-butyl alcohol, which is a monohydric alcohol, was added to a sodium acetate solution containing sodium acetate as a main component. The effect of the addition of tert-butyl alcohol on the stability of the supercooled state was examined.

In Examples G1 to G11, heat storage material compositions containing sodium acetate, water, and tert-butyl alcohol were prepared, and the supercooled state-preservation time of each of the heat storage material compositions was determined.

Methods for preparing heat storage material compositions and measurement results of the supercooled state-preservation time of the Examples are described below. The method for measuring the supercooled state-preservation time is the same as that used in Comparative Examples A1 to A9 described above, and thus the description of the method is omitted. Table 7 shows the measurement results of the supercooled state-preservation time of each of the Examples.

EXAMPLE G1

A composition containing sodium acetate trihydrate (analytical grade) manufactured by Kanto Chemical Co., Inc. and pure water was prepared in a glass sample bottle such that the sodium acetate concentration w became 57% by weight. The total weight of sodium acetate and water was adjusted to 25.1 g. Subsequently, the sample bottle containing the composition was placed in a drying furnace set at 70° C. to heat the composition. Thus, an aqueous sodium acetate solution was prepared. Next, 0.5 g of tert-butyl alcohol was added to the aqueous sodium acetate solution to prepare a heat storage material composition of this Example.

The heat storage material composition was heated in the drying furnace set at 70° C. Thus, a solution containing sodium acetate, water, and tert-butyl alcohol (sodium acetate 56 wt %-water 42 wt %-tert-butyl alcohol 2 wt %) was prepared.

The solution was then cooled as in Comparative Examples A1 to A9 described above, and the supercooled state-preservation time at −20° C. was determined. The supercooled state-preservation time at −20° C. was longer than that of Comparative Example A3 described above, and was 2 hours or more and 3 hours or less.

EXAMPLE G2

The preparation and heating of a heat storage material composition were conducted as in Example G1 except that the amount of tert-butyl alcohol added was changed to 1.0 g. A solution containing sodium acetate, water, and tert-butyl alcohol (sodium acetate 55 wt %-water 41 wt %-tert-butyl alcohol 4 wt %) was prepared.

The supercooled state-preservation time at −20° C. of this solution was longer than that of Comparative Example A4 described above, and was 1 hour or more and 2 hours or less.

EXAMPLE G3

The preparation and heating of a heat storage material composition were conducted as in Example G1 except that the amount of tert-butyl alcohol added was changed to 1.6 g. A solution containing sodium acetate, water, and tert-butyl alcohol (sodium acetate 54 wt %-water 40 wt %-tert-butyl alcohol 6 wt %) was prepared.

The supercooled state-preservation time at −20° C. of this solution was longer than that of Comparative Example A5 described above, and was 2 hours or more and 3 hours or less.

EXAMPLE G4

The preparation and heating of a heat storage material composition were conducted as in Example G1 except that the amount of tert-butyl alcohol added was changed to 2.1 g. A solution containing sodium acetate, water, and tert-butyl alcohol (sodium acetate 53 wt %-water 40 wt %-tert-butyl alcohol 8 wt %) was prepared.

The supercooled state-preservation time at −20° C. of this solution was longer than that of Comparative Example A6 described above, and was 2 hours or more and 3 hours or less.

EXAMPLE G5

The preparation and heating of a heat storage material composition were conducted as in Example G1 except that the total weight of sodium acetate trihydrate (analytical grade) and pure water was changed to 25.5 g and the amount of tert-butyl alcohol added was changed to 2.5 g. A solution containing sodium acetate, water, and tert-butyl alcohol (sodium acetate 52 wt %-water 39 wt %-tert-butyl alcohol 9 wt %) was prepared.

The supercooled state-preservation time at −20° C. of this solution was longer than that of Comparative Example A7 described above, and 1 hour or more and 2 hours or less.

EXAMPLE G6

The preparation and heating of a heat storage material composition were conducted as in Example G1 except that the sodium acetate concentration w in the aqueous sodium acetate solution was changed to 55% by weight, the total weight of sodium acetate trihydrate (analytical grade) and pure water was 25.1 g, and the amount of tert-butyl alcohol added was 0.5 g. A solution containing sodium acetate, water, and tert-butyl alcohol (sodium acetate 54 wt %-water 44 wt %-tert-butyl alcohol 2 wt %) was prepared.

The supercooled state-preservation time at −20° C. of this solution was longer than that of Comparative Example A5 described above, and 2 hours or more and 3 hours or less.

EXAMPLE G7

The preparation and heating of a heat storage material composition were conducted as in Example G1 except that the sodium acetate concentration w in the aqueous sodium acetate solution was changed to 55% by weight, the total weight of sodium acetate trihydrate (analytical grade) and pure water was changed to 25.2 g, and the amount of tert-butyl alcohol added was changed to 1.0 g. A solution containing sodium acetate, water, and tert-butyl alcohol (sodium acetate 53 wt %-water 43 wt %-tert-butyl alcohol 4 wt %) was prepared.

The supercooled state-preservation time at −20° C. of this solution was longer than that of Comparative Example A6 described above, and 1 hour or more and 2 hours or less.

EXAMPLE G8

The preparation and heating of a heat storage material composition were conducted as in Example G1 except that the sodium acetate concentration w in the aqueous sodium acetate solution was changed to 55% by weight, the total weight of sodium acetate trihydrate (analytical grade) and pure water was changed to 25.0 g, and the amount of tert-butyl alcohol added was changed to 1.5 g. A solution containing sodium acetate, water, and tert-butyl alcohol (sodium acetate 52 wt %-water 42 wt %-tert-butyl alcohol 6 wt %) was prepared.

The supercooled state-preservation time at −20° C. of this solution was longer than that of Comparative Example A7 described above, and 1 hour or more and 2 hours or less.

EXAMPLE G9

The preparation and heating of a heat storage material composition were conducted as in Example G1 except that the sodium acetate concentration w in the aqueous sodium acetate solution was 57% by weight, the total weight of sodium acetate trihydrate (analytical grade) and pure water was changed to 25.0 g, and the amount of tert-butyl alcohol added was changed to 0.2 g. A solution containing sodium acetate, water, and tert-butyl alcohol (sodium acetate 56 wt %-water 43 wt %-tert-butyl alcohol 1 wt %) was prepared.

The supercooled state-preservation time at −20° C. of this solution was longer than that of Comparative Example A3 described above, and the effect of the addition of the alcohol was observed. However, the supercooled state-preservation time at −20° C. of this solution was 30 minutes or more and less than 1 hour.

EXAMPLE G10

The preparation and heating of a heat storage material composition were conducted as in Example G1 except that the sodium acetate concentration w in the aqueous sodium acetate solution was changed to 55% by weight, the total weight of sodium acetate trihydrate (analytical grade) and pure water was changed to 25.0 g, and the amount of tert-butyl alcohol added was changed to 0.2 g. A solution containing sodium acetate, water, and tert-butyl alcohol (sodium acetate 54 wt %-water 45 wt %-tert-butyl alcohol 1 wt %) was prepared.

The supercooled state-preservation time at −20° C. of this solution was longer than that of Comparative Example A5 described above, and the effect of the addition of the alcohol was observed. However, the supercooled state-preservation time at −20° C. of this solution was 30 minutes or more and less than 1 hour.

EXAMPLE G11

The preparation and heating of a heat storage material composition were conducted as in Example G1 except that the sodium acetate concentration w in the aqueous sodium acetate solution was changed to 53% by weight, the total weight of sodium acetate trihydrate (analytical grade) and pure water was 25.1 g, and the amount of tert-butyl alcohol added was 0.5 g. A solution containing sodium acetate, water, and tert-butyl alcohol (sodium acetate 52 wt %-water 46 wt %-tert-butyl alcohol 2 wt %) was prepared.

The supercooled state-preservation time at −20° C. of this solution was longer than that of Comparative Example A7 described above, and the effect of the addition of the alcohol was observed. However, the supercooled state-preservation time at −20° C. of this solution was 30 minutes or more and less than 1 hour.

Figure 6:
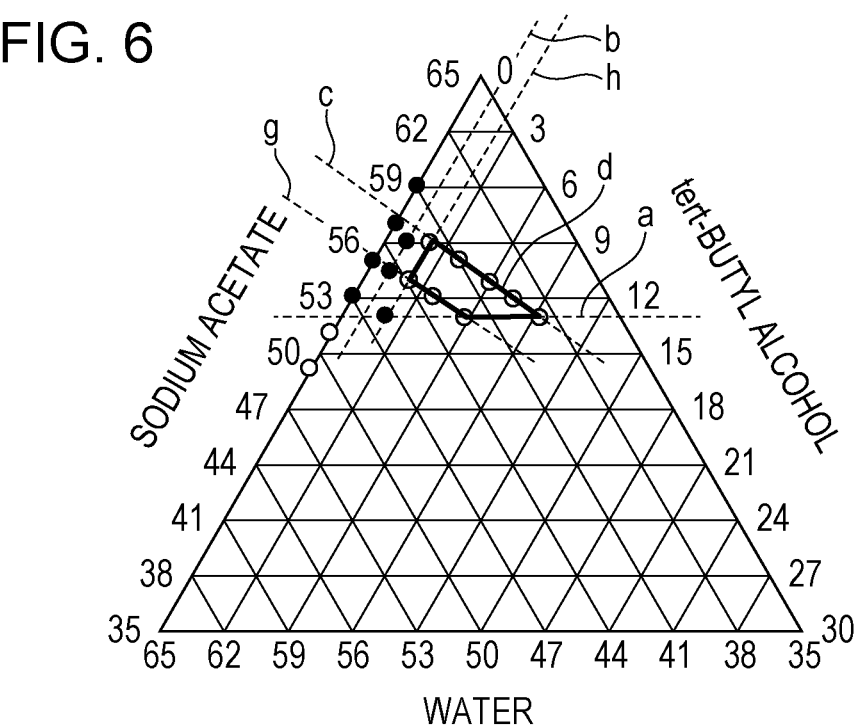
FIG. 6 is a diagram showing a composition range in which the supercooled state is stable in heat storage material compositions containing sodium acetate, water, and tert-butyl alcohol.

Furthermore, in FIG. 6, the stability of the supercooled state can be further improved in a region d (shown by the line d) surrounded by the broken line a, the broken line c, the broken line g indicating a weight ratio R of sodium acetate to water of 55/45, and the broken line h indicating a concentration Wa of tert-butyl alcohol of 2% by weight. Specifically, in the case where tert-butyl alcohol is used as an alcohol, the more useful composition range of the heat storage material composition is as follows. The weight ratio R of sodium acetate to water is 55/45 or more and 57/43 or less, the concentration Wa of tert-butyl alcohol is 2% by weight or more, and the concentration Ws of sodium acetate is 52% by weight or more. Among the Examples described above, Examples G1 to G8 each have a composition in the region d.

(H) Stability of Supercooled State when Ethylene Glycol was Added

Next, ethylene glycol, which is a dihydric alcohol, was added to a sodium acetate solution containing sodium

TABLE 7

| Example | Alcohol Type | Alcohol Amount added [g] | Aqueous sodium acetate solution Concentration w [wt %] | Aqueous sodium acetate solution Weight [g] | Concentration [wt %] Sodium acetate Ws | Concentration [wt %] Water Ww | Concentration [wt %] Alcohol Wa | Supercooled state-preservation time at −20° C. |
|---|---|---|---|---|---|---|---|---|
| G1 | tert-Butyl alcohol | 0.5 g | 57% | 25.1 g | 56% | 42% | 2% | 2 to 3 h |
| G2 | tert-Butyl alcohol | 1.0 g | 57% | 25.1 g | 55% | 41% | 4% | 1 to 2 h |
| G3 | tett-Butyl alcohol | 1.6 g | 57% | 25.1 g | 54% | 40% | 6% | 2 to 3 h |
| G4 | tert-Butyl alcohol | 2.1 g | 57% | 25.1 g | 53% | 40% | 8% | 2 to 3 h |
| G5 | tert-Butyl alcohol | 2.5 g | 57% | 25.5 g | 52% | 39% | 9% | 1 to 2 h |
| G6 | tert-Butyl alcohol | 0.5 g | 55% | 25.1 g | 54% | 44% | 2% | 2 to 3 h |
| G7 | tert-Butyl alcohol | 1.0 g | 55% | 25.2 g | 53% | 43% | 4% | 1 to 2 h |
| G8 | tert-Butyl alcohol | 1.5 g | 55% | 25.0 g | 52% | 42% | 6% | 1 to 2 h |
| G9 | tert-Butyl alcohol | 0.2 g | 57% | 25.0 g | 56% | 43% | 1% | 30 min to 1 h |
| G10 | tert-Butyl alcohol | 0.2 g | 55% | 25.0 g | 54% | 45% | 1% | 30 min to 1 h |
| G11 | tert-Butyl alcohol | 0.5 g | 53% | 25.1 g | 52% | 46% | 2% | 30 min to 1 h |

The results of Examples G1 to G11 and Comparative Examples A1 to A9 showed that, by adding tert-butyl alcohol to an aqueous sodium acetate solution, the stability of the supercooled state could be improved while a decrease in the thermal storage density was suppressed.

On the basis of the results of Examples G1 to G11 and Comparative Examples A1 to A9, a composition range in which both a large amount of latent heat and high stability of the supercooled state can be realized was found in the heat storage material compositions containing sodium acetate, water, and tert-butyl alcohol. The composition range will be described below.

FIG. 6 is a triangular diagram showing the compositions of sodium acetate, water, and tert-butyl alcohol in units of weight percent. As described with reference to FIG. 1, the broken lines a, b, and c in FIG. 6 respectively indicate Ws=52 (wt %), Wa=1 (wt %), and R=57/43.

Examples G1 to G11 described above each have a composition in the region surrounded by the broken lines a, b, and c. Accordingly, it was confirmed that, also in the case where tert-butyl alcohol was used as an alcohol, when the composition of the components contained in a heat storage material composition was located in the region surrounded by the broken lines a, b, and c, the stability of the supercooled state could be made higher than that of existing heat storage material compositions while a decrease in the amount of latent heat was suppressed.

acetate as a main component. The effect of the addition of ethylene glycol on the stability of the supercooled state was examined.

In Examples H1 to H12, heat storage material compositions containing sodium acetate, water, and ethylene glycol were prepared, and the supercooled state-preservation time of each of the heat storage material compositions was determined.

Methods for preparing heat storage material compositions and measurement results of the supercooled state-preservation time of the Examples are described below. The method for measuring the supercooled state-preservation time is the same as that used in Comparative Examples A1 to A9 described above, and thus the description of the method is omitted. Table 8 shows the measurement results of the supercooled state-preservation time of each of the Examples.

EXAMPLE H1

A composition containing sodium acetate trihydrate (analytical grade) manufactured by Kanto Chemical Co., Inc. and pure water was prepared in a glass sample bottle such that the sodium acetate concentration w became 57% by weight. The total weight of sodium acetate and water was adjusted to 25.1 g. Subsequently, the sample bottle containing the composition was placed in a drying furnace set at 70°

C. to heat the composition. Thus, an aqueous sodium acetate solution was prepared. Next, 0.5 g of ethylene glycol was added to the aqueous sodium acetate solution to prepare a heat storage material composition of this Example.

The heat storage material composition was heated in the drying furnace set at 70° C. Thus, a solution containing sodium acetate, water, and ethylene glycol (sodium acetate 56 wt %-water 42 wt %-ethylene glycol 2 wt %) was prepared.

The solution was then cooled as in Comparative Examples A1 to A9 described above, and the supercooled state-preservation time at −20° C. was determined. The supercooled state-preservation time at −20° C. was longer than that of Comparative Example A3 described above, and was 1 hour or more and 2 hours or less.

EXAMPLE H2

The preparation and heating of a heat storage material composition were conducted as in Example H1 except that the total weight of sodium acetate trihydrate (analytical grade) and pure water was changed to 25.2 g and the amount of ethylene glycol added was changed to 1.0 g. A solution containing sodium acetate, water, and ethylene glycol (sodium acetate 55 wt %-water 41 wt %-ethylene glycol 4 wt %) was prepared.

The supercooled state-preservation time at −20° C. of this solution was longer than that of Comparative Example A4 described above, and was 12 hours or more. Thus, it was confirmed that this solution was particularly highly stable in the supercooled state.

EXAMPLE H3

The preparation and heating of a heat storage material composition were conducted as in Example H1 except that the total weight of sodium acetate trihydrate (analytical grade) and pure water was changed to 25.3 g and the amount of ethylene glycol added was changed to 1.5 g. A solution containing sodium acetate, water, and ethylene glycol (sodium acetate 54 wt %-water 41 wt %-ethylene glycol 6 wt %) was prepared.

The supercooled state-preservation time at −20° C. of this solution was longer than that of Comparative Example A5 described above, and was 2 hours or more and 3 hours or less.

EXAMPLE H4

The preparation and heating of a heat storage material composition were conducted as in Example H1 except that the total weight of sodium acetate trihydrate (analytical grade) and pure water was changed to 25.0 g and the amount of ethylene glycol added was changed to 2.1 g. A solution containing sodium acetate, water, and ethylene glycol (sodium acetate 53 wt %-water 40 wt %-ethylene glycol 8 wt %) was prepared.

The supercooled state-preservation time at −20° C. of this solution was longer than that of Comparative Example A6 described above, and was 12 hours or more. Thus, it was confirmed that this solution was particularly highly stable in the supercooled state.

EXAMPLE H5

The preparation and heating of a heat storage material composition were conducted as in Example H1 except that the total weight of sodium acetate trihydrate (analytical grade) and pure water was changed to 25.0 g and the amount of ethylene glycol added was changed to 2.5 g. A solution containing sodium acetate, water, and ethylene glycol (sodium acetate 52 wt %-water 39 wt %-ethylene glycol 9 wt %) was prepared.

The supercooled state-preservation time at −20° C. of this solution was longer than that of Comparative Example A7 described above, and was 12 hours or more. Thus, it was confirmed that this solution was particularly highly stable in the supercooled state.

EXAMPLE H6

The preparation and heating of a heat storage material composition were conducted as in Example H1 except that the sodium acetate concentration w in the aqueous sodium acetate solution was changed to 55% by weight, the total weight of sodium acetate trihydrate (analytical grade) and pure water was changed to 25.2 g, and the amount of ethylene glycol added was 0.5 g. A solution containing sodium acetate, water, and ethylene glycol (sodium acetate 54 wt %-water 44 wt %-ethylene glycol 2 wt %) was prepared.

The supercooled state-preservation time at −20° C. of this solution was longer than that of Comparative Example A5 described above, and was 3 hours or more and 5 hours or less.

EXAMPLE H7

The preparation and heating of a heat storage material composition were conducted as in Example H1 except that the sodium acetate concentration w in the aqueous sodium acetate solution was changed to 55% by weight, the total weight of sodium acetate trihydrate (analytical grade) and pure water was changed to 25.2 g, and the amount of ethylene glycol added was changed to 1.0 g. A solution containing sodium acetate, water, and ethylene glycol (sodium acetate 53 wt %-water 43 wt %-ethylene glycol 4 wt %) was prepared.

The supercooled state-preservation time at −20° C. of this solution was longer than that of Comparative Example A6 described above, and was 1 hour or more and 2 hours or less.

EXAMPLE H8

The preparation and heating of a heat storage material composition were conducted as in Example H1 except that the sodium acetate concentration w in the aqueous sodium acetate solution was changed to 55% by weight, the total weight of sodium acetate trihydrate (analytical grade) and pure water was changed to 25.2 g, and the amount of ethylene glycol added was changed to 1.5 g. A solution containing sodium acetate, water, and ethylene glycol (sodium acetate 52 wt %-water 42 wt %-ethylene glycol 6 wt %) was prepared.

The supercooled state-preservation time at −20° C. of this solution was longer than that of Comparative Example A7 described above, and was 12 hours or more. Thus, it was confirmed that this solution was particularly highly stable in the supercooled state.

EXAMPLE H9

The preparation and heating of a heat storage material composition were conducted as in Example H1 except that the sodium acetate concentration w in the aqueous sodium acetate solution was changed to 53% by weight, the total weight of sodium acetate trihydrate (analytical grade) and pure water was changed to 25.2 g, and the amount of ethylene glycol added was changed to 0.3 g. A solution containing sodium acetate, water, and ethylene glycol (sodium acetate 52 wt %-water 47 wt %-ethylene glycol 1 wt %) was prepared.

The supercooled state-preservation time at −20° C. of this solution was longer than that of Comparative Example A7 described above, and was 1 hour or more and 2 hours or less.

EXAMPLE H10

The preparation and heating of a heat storage material composition were conducted as in Example H1 except that the sodium acetate concentration w in the aqueous sodium acetate solution was changed to 53% by weight, the total weight of sodium acetate trihydrate (analytical grade) and pure water was 25.1 g, and the amount of ethylene glycol added was 0.5 g. A solution containing sodium acetate, water, and ethylene glycol (sodium acetate 52 wt %-water 46 wt %-ethylene glycol 2 wt %) was prepared.

The solution was then cooled, and the supercooled state-preservation time at −20° C. was determined. The supercooled state-preservation time at −20° C. was longer than that of Comparative Example A7 described above, and was 1 hour or more and 2 hours or less.

EXAMPLE H11

The preparation and heating of a heat storage material composition were conducted as in Example H1 except that the sodium acetate concentration w in the aqueous sodium acetate solution was 57% by weight, the total weight of sodium acetate trihydrate (analytical grade) and pure water was changed to 25.0 g, and the amount of ethylene glycol added was 0.2 g. A solution containing sodium acetate, water, and ethylene glycol (sodium acetate 56 wt %-water 43 wt %-ethylene glycol 1 wt %) was prepared.

The supercooled state-preservation time at −20° C. of this solution was longer than that of Comparative Example A3 described above, and the effect of the addition of the alcohol was observed. However, the supercooled state-preservation time at −20° C. of this solution was 30 minutes or more and less than 1 hour.

EXAMPLE H12

The preparation and heating of a heat storage material composition were conducted as in Example H1 except that the sodium acetate concentration w in the aqueous sodium acetate solution was changed to 55% by weight, the total weight of sodium acetate trihydrate (analytical grade) and pure water was changed to 25.0 g, and the amount of ethylene glycol added was changed to 0.3 g. A solution containing sodium acetate, water, and ethylene glycol (sodium acetate 54 wt %-water 44 wt %-ethylene glycol 1 wt %) was prepared.

The supercooled state-preservation time at −20° C. of this solution was longer than that of Comparative Example A5 described above, and the effect of the addition of the alcohol was observed. However, the supercooled state-preservation time at −20° C. of this solution was 30 minutes or more and less than 1 hour.

TABLE 8

| Example | Alcohol | | Aqueous sodium acetate solution | | Concentration [wt %] | | | Supercooled state-preservation time at −20° C. |
| --- | --- | --- | --- | --- | --- | --- | --- | --- |
| | Type | Amount added [g] | Concentration w [wt %] | Weight [g] | Sodium acetate Ws | Water Ww | Alcohol Wa | |
| H1 | Ethylene glycol | 0.5 g | 57% | 25.1 g | 56% | 42% | 2% | 1 to 2 h |
| H2 | Ethylene glycol | 1.0 g | 57% | 25.2 g | 55% | 41% | 4% | 12 h or more |
| H3 | Ethylene glycol | 1.5 g | 57% | 25.3 g | 54% | 41% | 6% | 2 to 3 h |
| H4 | Ethylene glycol | 2.1 g | 57% | 25.0 g | 53% | 40% | 8% | 12 h or more |
| H5 | Ethylene glycol | 2.5 g | 57% | 25.0 g | 52% | 39% | 9% | 12 h or more |
| H6 | Ethylene glycol | 0.5 g | 55% | 25.2 g | 54% | 44% | 2% | 3 to 5 h |
| H7 | Ethylene glycol | 1.0 g | 55% | 25.2 g | 53% | 43% | 4% | 1 to 2 h |
| H8 | Ethylene glycol | 1.5 g | 55% | 25.2 g | 52% | 42% | 6% | 12 h or more |
| H9 | Ethylene glycol | 0.3 g | 53% | 25.2 g | 52% | 47% | 1% | 1 to 2 h |
| H10 | Ethylene glycol | 0.5 g | 53% | 25.1 g | 52% | 46% | 2% | 1 to 2 h |
| H11 | Ethylene glycol | 0.2 g | 57% | 25.0 g | 56% | 43% | 1% | 30 min to 1 h |
| H12 | Ethylene glycol | 0.3 g | 55% | 25.0 g | 54% | 44% | 1% | 30 min to 1 h |

The results of Examples H1 to H12 and Comparative Examples A1 to A9 showed that, by adding ethylene glycol to an aqueous sodium acetate solution, the stability of the supercooled state could be improved while a decrease in the thermal storage density was suppressed.

On the basis of the results of Examples H1 to H12 and Comparative Examples A1 to A9, a composition range in which both a large amount of latent heat and high stability of the supercooled state can be realized was found in the heat storage material compositions containing sodium acetate, water, and ethylene glycol. The composition range will be described below.

Figure 7:
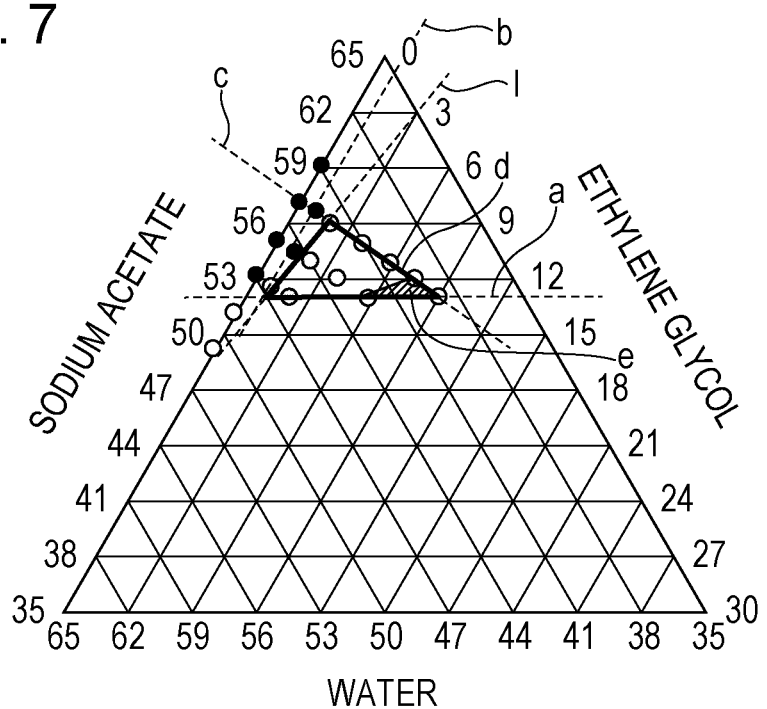
FIG. 7 is a diagram showing a composition range in which the supercooled state is stable in heat storage material compositions containing sodium acetate, water, and ethylene glycol.

FIG. 7 is a triangular diagram showing the compositions of sodium acetate, water, and ethylene glycol in units of weight percent. As described with reference to FIG. 1, the broken lines a, b, and c in FIG. 7 respectively indicate Ws=52 (wt %), Wa=1 (wt %), and R=57/43.

Examples H1 to H12 described above each have a composition in the region surrounded by the broken lines a, b, and c. Accordingly, it was confirmed that, also in the case where ethylene glycol was used as an alcohol, when the composition of the components contained in a heat storage material composition was located in the region surrounded by the broken lines a, b, and c, the stability of the supercooled state could be made higher than that of existing heat storage material compositions while a decrease in the amount of latent heat was suppressed.

Regarding heat storage material compositions in which ethylene glycol is used as an alcohol, the stability of the supercooled state can be further improved in a region d (shown by the line d in FIG. 7) where the concentration Wa of ethylene glycol is equal to or more than a concentration represented by a straight line connecting a first point A and a second point B described below, the region d being a part of the region surrounded by the broken lines a, b, and c.

A (sodium acetate: 56 wt %, water: 42 wt %, alcohol: 2 wt %)

B (sodium acetate: 52 wt %, water: 47 wt %, alcohol: 1 wt %)

In FIG. 7, the straight line connecting the first point A and the second point B is shown by the broken line 1. Among the Examples described above, Examples H1 to H10 each have a composition located in the region d.

Furthermore, in FIG. 7, in a region e (shown by the hatched region) surrounded by lines connecting three points indicating the concentrations Ws, Ww, and Wa of respective components of Examples H8, H4, and H5, the supercooled state-preservation time in the low-temperature environment of −20° C. is 12 hours or more, and thus the supercooled state can be further stably maintained.

(I) Stability of Supercooled State when Propylene Glycol was Added

Next, propylene glycol, which is a dihydric alcohol, was added to a sodium acetate solution containing sodium acetate as a main component. The effect of the addition of propylene glycol on the stability of the supercooled state was examined.

In Examples I1 to I11, heat storage material compositions containing sodium acetate, water, and propylene glycol were prepared, and the supercooled state-preservation time of each of the heat storage material compositions was determined.

Methods for preparing heat storage material compositions and measurement results of the supercooled state-preservation time of the Examples are described below. The method for measuring the supercooled state-preservation time is the same as that used in Comparative Examples A1 to A9 described above, and thus the description of the method is omitted. Table 9 shows the measurement results of the supercooled state-preservation time of each of the Examples.

EXAMPLE I1

A composition containing sodium acetate trihydrate (analytical grade) manufactured by Kanto Chemical Co., Inc. and pure water was prepared in a glass sample bottle such that the sodium acetate concentration w became 57% by weight. The total weight of sodium acetate and water was adjusted to 25.0 g. Subsequently, the sample bottle containing the composition was placed in a drying furnace set at 70° C. to heat the composition. Thus, an aqueous sodium acetate solution was prepared. Next, 0.6 g of propylene glycol was added to the aqueous sodium acetate solution to prepare a heat storage material composition of this Example.

The heat storage material composition was heated in the drying furnace set at 70° C. Thus, a solution containing sodium acetate, water, and propylene glycol (sodium acetate 56 wt %-water 42 wt %-propylene glycol 2 wt %) was prepared.

The solution was then cooled as in Comparative Examples A1 to A9 described above, and the supercooled state-preservation time at −20° C. was determined. The supercooled state-preservation time at −20° C. was longer than that of Comparative Example A3 described above, and was 1 hour or more and 2 hours or less.

EXAMPLE I2

The preparation and heating of a heat storage material composition were conducted as in Example I1 except that the total weight of sodium acetate trihydrate (analytical grade) and pure water was changed to 25.1 g and the amount of propylene glycol added was changed to 1.1 g. A solution containing sodium acetate, water, and propylene glycol (sodium acetate 55 wt %-water 41 wt %-propylene glycol 4 wt %) was prepared.

The supercooled state-preservation time at −20° C. of this solution was longer than that of Comparative Example A4 described above, and was 5 hours or more and 6.5 hours or less.

EXAMPLE I3

The preparation and heating of a heat storage material composition were conducted as in Example I1 except that the total weight of sodium acetate trihydrate (analytical grade) and pure water was changed to 25.2 g and the amount of propylene glycol added was changed to 1.6 g. A solution containing sodium acetate, water, and propylene glycol (sodium acetate 54 wt %-water 40 wt %-propylene glycol 6 wt %) was prepared.

The supercooled state-preservation time at −20° C. of this solution was longer than that of Comparative Example A5 described above, and was 1 hour or more and 2 hours or less.

EXAMPLE I4

The preparation and heating of a heat storage material composition were conducted as in Example I1 except that the total weight of sodium acetate trihydrate (analytical grade) and pure water was 25.0 g and the amount of propylene glycol added was changed to 2.1 g. A solution containing sodium acetate, water, and propylene glycol (sodium acetate 53 wt %-water 40 wt %-propylene glycol 8 wt %) was prepared.

The supercooled state-preservation time at −20° C. of this solution was longer than that of Comparative Example A6 described above, and was 1 hour or more and 2 hours or less.

EXAMPLE I5

The preparation and heating of a heat storage material composition were conducted as in Example I1 except that the total weight of sodium acetate trihydrate (analytical grade) and pure water was changed to 25.7 g and the amount of propylene glycol added was changed to 2.5 g. A solution containing sodium acetate, water, and propylene glycol (sodium acetate 52 wt %-water 39 wt %-propylene glycol 9 wt %) was prepared.

The supercooled state-preservation time at −20° C. of this solution was longer than that of Comparative Example A7 described above, and was 1 hour or more and 2 hours or less.

EXAMPLE I6

The preparation and heating of a heat storage material composition were conducted as in Example I1 except that the sodium acetate concentration w in the aqueous sodium acetate solution was changed to 55% by weight, the total weight of sodium acetate trihydrate (analytical grade) and pure water was changed to 25.1 g, and the amount of propylene glycol added was changed to 0.5 g. A solution containing sodium acetate, water, and propylene glycol (sodium acetate 54 wt %-water 44 wt %-propylene glycol 2 wt %) was prepared.

The supercooled state-preservation time at −20° C. of this solution was longer than that of Comparative Example A5 described above, and was 7.5 hours or more and 8.5 hours or less.

EXAMPLE I7

The preparation and heating of a heat storage material composition were conducted as in Example I1 except that the sodium acetate concentration w in the aqueous sodium acetate solution was changed to 55% by weight, the total weight of sodium acetate trihydrate (analytical grade) and pure water was changed to 25.2 g, and the amount of propylene glycol added was changed to 1.1 g. A solution containing sodium acetate, water, and propylene glycol (sodium acetate 53 wt %-water 43 wt %-propylene glycol 4 wt %) was prepared.

The supercooled state-preservation time at −20° C. of this solution was longer than that of Comparative Example A6 described above, and was 1 hour or more and 2 hours or less.

EXAMPLE I8

The preparation and heating of a heat storage material composition were conducted as in Example I1 except that the sodium acetate concentration w in the aqueous sodium acetate solution was 57% by weight, the total weight of sodium acetate trihydrate (analytical grade) and pure water was changed to 25.1 g, and the amount of propylene glycol added was changed to 0.3 g. A solution containing sodium acetate, water, and propylene glycol (sodium acetate 56 wt %-water 43 wt %-propylene glycol 1 wt %) was prepared.

The supercooled state-preservation time at −20° C. of this solution was longer than that of Comparative Example A3 described above, and the effect of the addition of the alcohol was observed. However, the supercooled state-preservation time at −20° C. of this solution was 30 minutes or more and less than 1 hour.

EXAMPLE I9

The preparation and heating of a heat storage material composition were conducted as in Example I1 except that the sodium acetate concentration w in the aqueous sodium acetate solution was changed to 55% by weight, the total weight of sodium acetate trihydrate (analytical grade) and pure water was 25.0 g, and the amount of propylene glycol added was changed to 0.3 g. A solution containing sodium acetate, water, and propylene glycol (sodium acetate 54 wt %-water 45 wt %-propylene glycol 1 wt %) was prepared.

The supercooled state-preservation time at −20° C. of this solution was longer than that of Comparative Example A5 described above, and the effect of the addition of the alcohol was observed. However, the supercooled state-preservation time at −20° C. of this solution was 30 minutes or more and less than 1 hour.

EXAMPLE I10

The preparation and heating of a heat storage material composition were conducted as in Example I1 except that the sodium acetate concentration w in the aqueous sodium acetate solution was changed to 55% by weight, the total weight of sodium acetate trihydrate (analytical grade) and pure water was 25.0 g, and the amount of propylene glycol added was changed to 1.5 g. A solution containing sodium acetate, water, and propylene glycol (sodium acetate 52 wt %-water 42 wt %-propylene glycol 6 wt %) was prepared.

The supercooled state-preservation time at −20° C. of this solution was longer than that of Comparative Example A7 described above, and the effect of the addition of the alcohol was observed. However, the supercooled state-preservation time at −20° C. of this solution was 30 minutes or more and less than 1 hour.

EXAMPLE I11

The preparation and heating of a heat storage material composition were conducted as in Example I1 except that the sodium acetate concentration w in the aqueous sodium acetate solution was changed to 53% by weight, the total weight of sodium acetate trihydrate (analytical grade) and pure water was 25.0 g, and the amount of propylene glycol added was changed to 0.5 g. A solution containing sodium acetate, water, and propylene glycol (sodium acetate 52 wt %-water 46 wt %-propylene glycol 2 wt %) was prepared.

The supercooled state-preservation time at −20° C. of this solution was longer than that of Comparative Example A7 described above, and the effect of the addition of the alcohol was observed. However, the supercooled state-preservation time at −20° C. of this solution was 30 minutes or more and less than 1 hour.

TABLE 9

| Example | Alcohol | | Aqueous sodium acetate solution | | Concentration [wt %] | | | Supercooled state-preservation time at −20° C. |
|---|---|---|---|---|---|---|---|---|
| | Type | Amount added [g] | Concentration w [wt %] | Weight [g] | Sodium acetate Ws | Water Ww | Alcohol Wa | |
| I1 | Propylene glycol | 0.6 g | 57% | 25.0 g | 56% | 42% | 2% | 1 to 2 h |
| I2 | Propylene glycol | 1.1 g | 57% | 25.1 g | 55% | 41% | 4% | 5 to 6.5 h |
| I3 | Propylene glycol | 1.6 g | 57% | 25.2 g | 54% | 40% | 6% | 1 to 2 h |
| I4 | Propylene glycol | 2.1 g | 57% | 25.0 g | 53% | 40% | 8% | 1 to 2 h |
| I5 | Propylene glycol | 2.5 g | 57% | 25.7 g | 52% | 39% | 9% | 1 to 2 h |
| I6 | Propylene glycol | 0.5 g | 55% | 25.1 g | 54% | 44% | 2% | 7.5 to 8.5 h |
| I7 | Propylene glycol | 1.1 g | 55% | 25.2 g | 53% | 43% | 4% | 1 to 2 h |
| I8 | Propylene glycol | 0.3 g | 57% | 25.1 g | 56% | 43% | 1% | 30 min to 1 h |
| I9 | Propylene glycol | 0.3 g | 55% | 25.0 g | 54% | 45% | 1% | 30 min to 1 h |
| I10 | Propylene glycol | 1.5 g | 55% | 25.0 g | 52% | 42% | 6% | 30 min to 1 h |
| I11 | Propylene glycol | 0.5 g | 53% | 25.0 g | 52% | 46% | 2% | 30 min to 1 h |

The results of Examples I1 to I11 and Comparative Examples A1 to A9 showed that, by adding propylene glycol to an aqueous sodium acetate solution, the stability of the supercooled state could be improved while a decrease in the thermal storage density was suppressed.

On the basis of the results of Examples I1 to I11 and Comparative Examples A1 to A9, a composition range in which both a large amount of latent heat and high stability of the supercooled state can be realized was found in the heat storage material compositions containing sodium acetate, water, and propylene glycol. The composition range will be described below.

Figure 8:
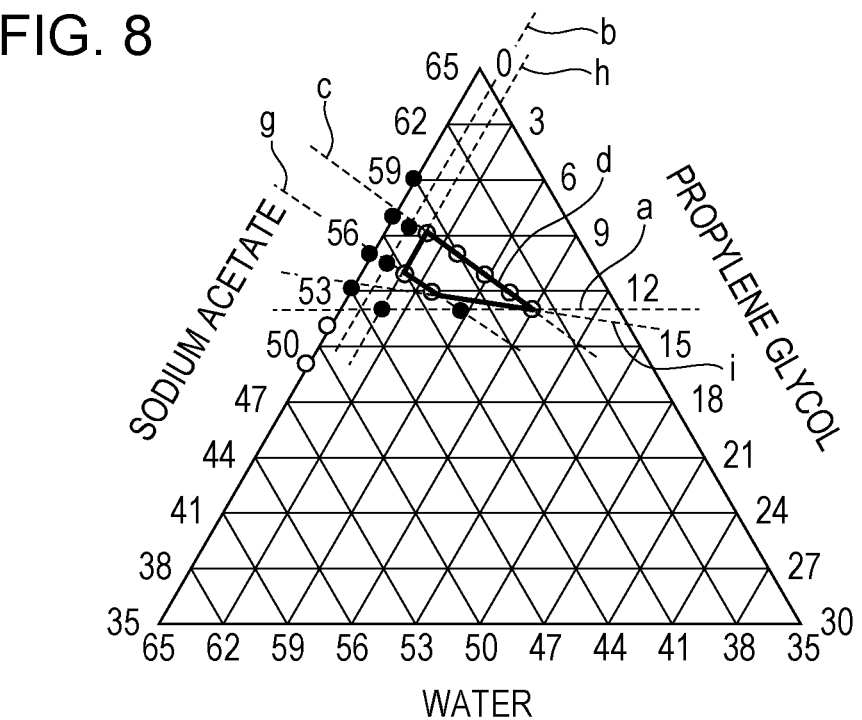
FIG. 8 is a diagram showing a composition range in which the supercooled state is stable in heat storage material compositions containing sodium acetate, water, and propylene glycol.

FIG. 8 is a triangular diagram showing the compositions of sodium acetate, water, and propylene glycol in units of weight percent. As described with reference to FIG. 1, the broken lines a, b, and c in FIG. 8 respectively indicate Ws=52 (wt %), Wa=1 (wt %), and R=57/43.

Examples I1 to I11 described above each have a composition in the region surrounded by the broken lines a, b, and c. Accordingly, it was confirmed that, also in the case where propylene glycol was used as an alcohol, when the composition of the components contained in a heat storage material composition was located in the region surrounded by the broken lines a, b, and c, the stability of the supercooled state could be made higher than that of existing heat storage material compositions while a decrease in the amount of latent heat was suppressed.

Regarding heat storage material compositions in which propylene glycol is used as an alcohol, the stability of the supercooled state can be further improved in a region d (shown by the line d in FIG. 8) where the weight ratio R of sodium acetate to water is 55/45 or more, the concentration Wa of propylene glycol is 2% by weight or more, and the concentration Ws of the sodium acetate is equal to or more than a concentration represented by a straight line (shown by the broken line i) connecting a first point A and a second point B described below, the region d being a part of the region surrounded by the broken lines a, b, and c.

A (sodium acetate: 52 wt %, water: 39 wt %, alcohol: 9 wt %)

B (sodium acetate: 53 wt %, water: 43 wt %, alcohol: 4 wt %)

In FIG. 8, the region d is a region surrounded by the broken line i, the broken line c indicating R=57/43, the broken line g indicating R=55/45, and the broken line h indicating Wa=2 (wt %). Among the Examples described above, Examples 11 to 17 each have a composition located in the region d.

(J) Stability of Supercooled State when Glycerin was Added

Next, glycerin, which is a trihydric alcohol, was added to a sodium acetate solution containing sodium acetate as a main component. The effect of the addition of glycerin on the stability of the supercooled state was examined.

In Examples J1 to J11, heat storage material compositions containing sodium acetate, water, and glycerin were prepared, and the supercooled state-preservation time of each of the heat storage material compositions was determined.

Methods for preparing heat storage material compositions and measurement results of the supercooled state-preservation time of the Examples are described below. The method for measuring the supercooled state-preservation time is the same as that used in Comparative Examples A1 to A9 described above, and thus the description of the method is omitted. Table 10 shows the measurement results of the supercooled state-preservation time of each of the Examples.

EXAMPLE J1

A composition containing sodium acetate trihydrate (analytical grade) manufactured by Kanto Chemical Co., Inc. and pure water was prepared in a glass sample bottle such that the sodium acetate concentration w became 57% by weight. The total weight of sodium acetate and water was adjusted to 25.0 g. Subsequently, the sample bottle containing the composition was placed in a drying furnace set at 70° C. to heat the composition. Thus, an aqueous sodium acetate solution was prepared. Next, 0.6 g of glycerin was added to the aqueous sodium acetate solution to prepare a heat storage material composition of this Example.

The heat storage material composition was heated in the drying furnace set at 70° C. Thus, a solution containing sodium acetate, water, and glycerin (sodium acetate 56 wt %-water 42 wt %-glycerin 2 wt %) was prepared.

The solution was then cooled as in Comparative Examples A1 to A9 described above, and the supercooled state-preservation time at −20° C. was determined. The supercooled state-preservation time at −20° C. was longer than that of Comparative Example A3 described above, and was 3 hours or more and 5 hours or less.

EXAMPLE J2

The preparation and heating of a heat storage material composition were conducted as in Example J1 except that the total weight of sodium acetate trihydrate (analytical grade) and pure water was changed to 25.1 g and the amount of glycerin added was changed to 1.0 g. A solution containing sodium acetate, water, and glycerin (sodium acetate 55 wt %-water 41 wt %-glycerin 4 wt %) was prepared.

The supercooled state-preservation time at −20° C. of this solution was longer than that of Comparative Example A4 described above, and was 2 hours or more and 3 hours or less.

EXAMPLE J3

The preparation and heating of a heat storage material composition were conducted as in Example J1 except that the total weight of sodium acetate trihydrate (analytical grade) and pure water was changed to 25.1 g and the amount of glycerin added was changed to 1.5 g. A solution containing sodium acetate, water, and glycerin (sodium acetate 54 wt %-water 41 wt %-glycerin 6 wt %) was prepared.

The supercooled state-preservation time at −20° C. of this solution was longer than that of Comparative Example A5 described above, and was 1 hour or more and 2 hours or less.

EXAMPLE J4

The preparation and heating of a heat storage material composition were conducted as in Example J1 except that the total weight of sodium acetate trihydrate (analytical grade) and pure water was changed to 25.1 g and the amount of glycerin added was changed to 2.0 g. A solution containing sodium acetate, water, and glycerin (sodium acetate 53 wt %-water 40 wt %-glycerin 7 wt %) was prepared.

The supercooled state-preservation time at −20° C. of this solution was longer than that of Comparative Example A6 described above, and was 1 hour or more and 2 hours or less.

EXAMPLE J5

The preparation and heating of a heat storage material composition were conducted as in Example J1 except that the total weight of sodium acetate trihydrate (analytical grade) and pure water was changed to 25.2 g and the amount of glycerin added was changed to 2.6 g. A solution containing sodium acetate, water, and glycerin (sodium acetate 52 wt %-water 39 wt %-glycerin 9 wt %) was prepared.

The supercooled state-preservation time at −20° C. of this solution was longer than that of Comparative Example A7 described above, and was 2 hours or more and 3 hours or less.

EXAMPLE J6

The preparation and heating of a heat storage material composition were conducted as in Example J1 except that the sodium acetate concentration w in the aqueous sodium acetate solution was changed to 55% by weight, the total weight of sodium acetate trihydrate (analytical grade) and pure water was changed to 25.1 g, and the amount of glycerin added was changed to 0.3 g. A solution containing sodium acetate, water, and glycerin (sodium acetate 54 wt %-water 45 wt %-glycerin 1 wt %) was prepared.

The supercooled state-preservation time at −20° C. of this solution was longer than that of Comparative Example A5 described above, and was 1 hour or more and 2 hours or less.

EXAMPLE J7

The preparation and heating of a heat storage material composition were conducted as in Example J1 except that the sodium acetate concentration w in the aqueous sodium acetate solution was changed to 55% by weight, the total weight of sodium acetate trihydrate (analytical grade) and pure water was changed to 25.1 g, and the amount of glycerin added was 0.6 g. A solution containing sodium acetate, water, and glycerin (sodium acetate 54 wt %-water 44 wt %-glycerin 2 wt %) was prepared.

The supercooled state-preservation time at −20° C. of this solution was longer than that of Comparative Example A5 described above, and was 2 hours or more and 3 hours or less.

EXAMPLE J8

The preparation and heating of a heat storage material composition were conducted as in Example J1 except that the sodium acetate concentration w in the aqueous sodium acetate solution was changed to 55% by weight, the total weight of sodium acetate trihydrate (analytical grade) and pure water was changed to 25.1 g, and the amount of glycerin added was changed to 1.2 g. A solution containing sodium acetate, water, and glycerin (sodium acetate 53 wt %-water 43 wt %-glycerin 4 wt %) was prepared.

The supercooled state-preservation time at −20° C. of this solution was longer than that of Comparative Example A6 described above, and was 1 hour or more and 2 hours or less.

EXAMPLE J9

The preparation and heating of a heat storage material composition were conducted as in Example J1 except that the sodium acetate concentration w in the aqueous sodium acetate solution was changed to 55% by weight, the total weight of sodium acetate trihydrate (analytical grade) and pure water was 25.0 g, and the amount of glycerin added was changed to 1.6 g. A solution containing sodium acetate, water, and glycerin (sodium acetate 52 wt %-water 42 wt %-glycerin 6 wt %) was prepared.

The supercooled state-preservation time at −20° C. of this solution was longer than that of Comparative Example A7 described above, and was 1 hour or more and 2 hours or less.

EXAMPLE J10

The preparation and heating of a heat storage material composition were conducted as in Example J1 except that the sodium acetate concentration w in the aqueous sodium acetate solution was 57% by weight, the total weight of sodium acetate trihydrate (analytical grade) and pure water was changed to 25.1 g, and the amount of glycerin added was changed to 0.3 g. A solution containing sodium acetate, water, and glycerin (sodium acetate 56 wt %-water 43 wt %-glycerin 1 wt %) was prepared.

The supercooled state-preservation time at −20° C. of this solution was longer than that of Comparative Example A3 described above, and the effect of the addition of the alcohol was observed. However, the supercooled state-preservation time at −20° C. of this solution was 30 minutes or more and less than 1 hour.

EXAMPLE J11

The preparation and heating of a heat storage material composition were conducted as in Example J1 except that the sodium acetate concentration w in the aqueous sodium acetate solution was changed to 53% by weight, the total weight of sodium acetate trihydrate (analytical grade) and pure water was changed to 25.2 g, and the amount of glycerin added was changed to 0.3 g. A solution containing sodium acetate, water, and glycerin (sodium acetate 52 wt %-water 46 wt %-glycerin 2 wt %) was prepared.

The supercooled state-preservation time at −20° C. of this solution was longer than that of Comparative Example A7 described above, and the effect of the addition of the alcohol was observed. However, the supercooled state-preservation time at −20° C. of this solution was 30 minutes or more and less than 1 hour.

TABLE 10

| Example | Alcohol Type | Alcohol Amount added [g] | Aqueous sodium acetate solution Concentration w [wt %] | Aqueous sodium acetate solution Weight [g] | Concentration [wt %] Sodium acetate Ws | Concentration [wt %] Water Ww | Concentration [wt %] Alcohol Wa | Supercooled state-preservation time at −20° C. |
|---|---|---|---|---|---|---|---|---|
| J1 | Glycerin | 0.6 g | 57% | 25.0 g | 56% | 42% | 2% | 3 to 5 h |
| J2 | Glycerin | 1.0 g | 57% | 25.1 g | 55% | 41% | 4% | 2 to 3 h |
| J3 | Glycerin | 1.5 g | 57% | 25.1 g | 54% | 41% | 6% | 1 to 2 h |
| J4 | Glycerin | 2.0 g | 57% | 25.1 g | 53% | 40% | 7% | 1 to 2 h |
| J5 | Glycerin | 2.6 g | 57% | 25.2 g | 52% | 39% | 9% | 2 to 3 h |
| J6 | Glycerin | 0.3 g | 55% | 25.1 g | 54% | 45% | 1% | 1 to 2 h |

TABLE 10-continued

| | Alcohol | | Aqueous sodium acetate solution | | Concentration [wt %] | | | Supercooled state- |
|---|---|---|---|---|---|---|---|---|
| Example | Type | Amount added [g] | Concentration w [wt %] | Weight [g] | Sodium acetate Ws | Water Ww | Alcohol Wa | preservation time at −20° C. |
| J7 | Glycerin | 0.6 g | 55% | 25.1 g | 54% | 44% | 2% | 2 to 3 h |
| J8 | Glycerin | 1.2 g | 55% | 25.1 g | 53% | 43% | 4% | 1 to 2 h |
| J9 | Glycerin | 1.6 g | 55% | 25.0 g | 52% | 42% | 6% | 1 to 2 h |
| J10 | Glycerin | 0.3 g | 57% | 25.1 g | 56% | 43% | 1% | 30 min to 1 h |
| J11 | Glycerin | 0.3 g | 53% | 25.2 g | 52% | 46% | 2% | 30 min to 1 h |

The results of Examples J1 to J11 and Comparative Examples A1 to A9 showed that, by adding glycerin to an aqueous sodium acetate solution, the stability of the supercooled state could be improved while a decrease in the thermal storage density was suppressed.

On the basis of the results of Examples J1 to J11 and Comparative Examples A1 to A9, a composition range in which both a large amount of latent heat and high stability of the supercooled state can be realized was found in the heat storage material compositions containing sodium acetate, water, and glycerin. The composition range will be described below.

Figure 9:
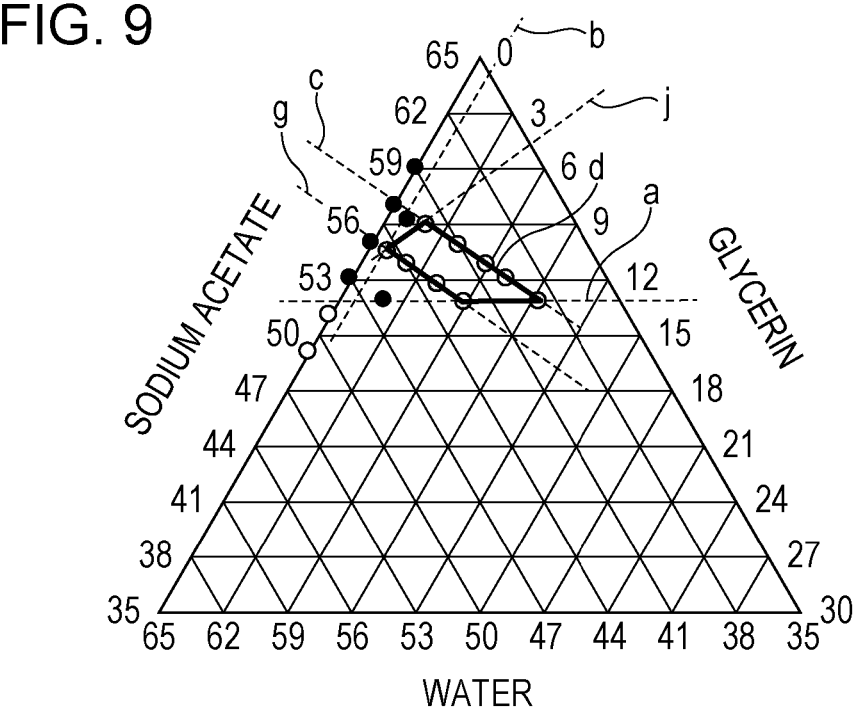
FIG. 9 is a diagram showing a composition range in which the supercooled state is stable in heat storage material compositions containing sodium acetate, water, and glycerin.

FIG. 9 is a triangular diagram showing the compositions of sodium acetate, water, and glycerin in units of weight percent. As described with reference to FIG. 1, the broken lines a, b, and c in FIG. 9 respectively indicate Ws=52 (wt %), Wa=1 (wt %), and R=57/43.

Examples J1 to J11 described above each have a composition in the region surrounded by the broken lines a, b, and c. Accordingly, it was confirmed that, also in the case where glycerin was used as an alcohol, when the composition of the components contained in a heat storage material composition was located in the region surrounded by the broken lines a, b, and c, the stability of the supercooled state could be made higher than that of existing heat storage material compositions while a decrease in the amount of latent heat was suppressed.

Regarding heat storage material compositions in which glycerin is used as an alcohol, the stability of the supercooled state can be further improved in a region d (shown by the line d in FIG. 9) where the weight ratio R of sodium acetate to water is 55/45 or more, the concentration Wa of an alcohol (glycerin) is equal to or more than a concentration represented by a straight line (shown by the broken line j) connecting a first point A and a second point B described below, the region d being a part of the region surrounded by the broken lines a, b, and c.

A (sodium acetate: 56 wt %, water: 42 wt %, alcohol: 2 wt %)

B (sodium acetate: 54 wt %, water: 45 wt %, alcohol: 1 wt %)

In FIG. 9, the region d is a region surrounded by the broken line j, the broken line g indicating R=55/45, the broken line a indicating Ws=52 (wt %), and the broken line c indicating R=57/43. Among the Examples described above, Examples J1 to J9 each have a composition located in the region d.

As is apparent from the experimental results of (A) to (J), by adding an alcohol to an aqueous sodium acetate solution and controlling the composition of respective components, the stability of the supercooled state in a low-temperature environment can be improved while a decrease in the thermal storage density is suppressed. Among alcohols, the use of monohydric alcohols can cause a higher effect. Among monohydric alcohols, in particular, the use of n-butyl alcohol can cause a more significant effect.

(K) Stability of Supercooled State when Dual-end-type/Carbinol-modified Silicone Oil was Added Next, as in the above cases of the alcohols, a dual-end-type/carbinol-modified silicone oil comprising a hydrophobic group and a hydrophilic group was added to a sodium acetate solution containing sodium acetate as a main component. The effect of the addition of the dual-end-type/carbinol-modified silicone oil on the stability of the supercooled state was examined.

In Examples K1 to K12 and Comparative Example KC1, heat storage material compositions containing sodium acetate, water, and a dual-end-type/carbinol-modified silicone oil were prepared, and the supercooled state-preservation time of each of the heat storage material compositions was determined.

Methods for preparing heat storage material compositions and measurement results of the supercooled state-preservation time of the Examples and Comparative Example are described below. The method for measuring the supercooled state-preservation time is the same as that used in Comparative Examples A1 to A9 described above, and thus the description of the method is omitted. Table 11 shows the measurement results of the supercooled state-preservation time of each of the Examples and Comparative Example. In Table 11, the dual-end-type/carbinol-modified silicone oil, which is an alcohol added to a sodium acetate solution, is abbreviated as "modified silicone oil".

EXAMPLE K1

A composition containing sodium acetate trihydrate (analytical grade) manufactured by Kanto Chemical Co., Inc. and pure water was prepared in a glass sample bottle such that the sodium acetate concentration w became 57% by weight. The total weight of sodium acetate and water was adjusted to 25.0 g. Subsequently, the sample bottle containing the composition was placed in a drying furnace set at 70° C. to heat the composition. Thus, an aqueous sodium acetate solution was prepared. Next, 0.25 g of a dual-end-type/carbinol-modified silicone oil (KF6002, manufactured by Shin-Etsu Chemical Co., Ltd.) was added to the aqueous sodium acetate solution to prepare a heat storage material composition of this Example.

The heat storage material composition was heated in the drying furnace set at 70° C. Thus, a solution containing sodium acetate, water, and the dual-end-type/carbinol-modified silicone oil (sodium acetate 56 wt %-water 43 wt %-dual-end-type/carbinol-modified silicone oil 1 wt %) was prepared.

The solution was then cooled as in Comparative Examples A1 to A9 described above, and the supercooled state-preservation time at −20° C. was determined. The supercooled state-preservation time at −20° C. of this solution was longer than that of Comparative Example A3 described above, and the effect of the addition of the dual-end-type/carbinol-modified silicone oil was observed. However, the supercooled state-preservation time at −20° C. of this solution was 30 minutes or more and less than 1 hour.

EXAMPLE K2

The preparation and heating of a heat storage material composition were conducted as in Example K1 except that the sodium acetate concentration w in the aqueous sodium acetate solution was 57% by weight, the total weight of sodium acetate trihydrate (analytical grade) and pure water was 25.0 g, and the amount of dual-end-type/carbinol-modified silicone oil added was changed to 0.5 g. A solution containing sodium acetate, water, and the dual-end-type/carbinol-modified silicone oil (sodium acetate 56 wt %-water 42 wt %-dual-end-type/carbinol-modified silicone oil 2 wt %) was prepared.

The supercooled state-preservation time at −20° C. of this solution was longer than that of Comparative Example A3 described above, and the effect of the addition of the dual-end-type/carbinol-modified silicone oil was observed. However, the supercooled state-preservation time at −20° C. of this solution was 30 minutes or more and less than 1 hour.

EXAMPLE K3

The preparation and heating of a heat storage material composition were conducted as in Example K1 except that the sodium acetate concentration w in the aqueous sodium acetate solution was 57% by weight, the total weight of sodium acetate trihydrate (analytical grade) and pure water was 25.0 g, and the amount of dual-end-type/carbinol-modified silicone oil added was changed to 1.0 g. A solution containing sodium acetate, water, and the dual-end-type/carbinol-modified silicone oil (sodium acetate 55 wt %-water 41 wt %-dual-end-type/carbinol-modified silicone oil 4 wt %) was prepared.

The supercooled state-preservation time at −20° C. of this solution was longer than that of Comparative Example A4 described above, and was 1 hour or more and 2 hours or less.

EXAMPLE K4

The preparation and heating of a heat storage material composition were conducted as in Example K1 except that the sodium acetate concentration w in the aqueous sodium acetate solution was 57% by weight, the total weight of sodium acetate trihydrate (analytical grade) and pure water was 25.0 g, and the amount of dual-end-type/carbinol-modified silicone oil added was changed to 1.5 g. A solution containing sodium acetate, water, and the dual-end-type/carbinol-modified silicone oil (sodium acetate 54 wt %-water 41 wt %-dual-end-type/carbinol-modified silicone oil 6 wt %) was prepared.

The supercooled state-preservation time at −20° C. of this solution was longer than that of Comparative Example A5 described above, and the effect of the addition of the dual-end-type/carbinol-modified silicone oil was observed. However, the supercooled state-preservation time at −20° C. of this solution was 30 minutes or more and less than 1 hour.

EXAMPLE K5

The preparation and heating of a heat storage material composition were conducted as in Example K1 except that the sodium acetate concentration w in the aqueous sodium acetate solution was 57% by weight, the total weight of sodium acetate trihydrate (analytical grade) and pure water was 25.0 g, and the amount of dual-end-type/carbinol-modified silicone oil added was changed to 2.0 g. A solution containing sodium acetate, water, and the dual-end-type/carbinol-modified silicone oil (sodium acetate 53 wt %-water 40 wt %-dual-end-type/carbinol-modified silicone oil 7 wt %) was prepared.

The supercooled state-preservation time at −20° C. of this solution was longer than that of Comparative Example A6 described above, and the effect of the addition of the dual-end-type/carbinol-modified silicone oil was observed. However, the supercooled state-preservation time at −20° C. of this solution was 30 minutes or more and less than 1 hour.

EXAMPLE K6

The preparation and heating of a heat storage material composition were conducted as in Example K1 except that the sodium acetate concentration w in the aqueous sodium acetate solution was 57% by weight, the total weight of sodium acetate trihydrate (analytical grade) and pure water was 25.0 g, and the amount of dual-end-type/carbinol-modified silicone oil added was changed to 2.5 g. A solution containing sodium acetate, water, and the dual-end-type/carbinol-modified silicone oil (sodium acetate 52 wt %-water 39 wt %-dual-end-type/carbinol-modified silicone oil 9 wt %) was prepared.

The supercooled state-preservation time at −20° C. of this solution was longer than that of Comparative Example A7 described above, and the effect of the addition of the dual-end-type/carbinol-modified silicone oil was observed. However, the supercooled state-preservation time at −20° C. of this solution was 30 minutes or more and less than 1 hour.

EXAMPLE K7

The preparation and heating of a heat storage material composition were conducted as in Example K1 except that the sodium acetate concentration w in the aqueous sodium acetate solution was changed to 55% by weight, the total weight of sodium acetate trihydrate (analytical grade) and pure water was 25.0 g, and the amount of dual-end-type/carbinol-modified silicone oil added was changed to 0.25 g. A solution containing sodium acetate, water, and the dual-end-type/carbinol-modified silicone oil (sodium acetate 54 wt %-water 45 wt %-dual-end-type/carbinol-modified silicone oil 1 wt %) was prepared.

The supercooled state-preservation time at −20° C. of this solution was longer than that of Comparative Example A5 described above, and was 1 hour or more and 2 hours or less.

EXAMPLE K8

The preparation and heating of a heat storage material composition were conducted as in Example K1 except that the sodium acetate concentration w in the aqueous sodium acetate solution was changed to 55% by weight, the total weight of sodium acetate trihydrate (analytical grade) and pure water was 25.0 g, and the amount of dual-end-type/carbinol-modified silicone oil added was changed to 0.5 g. A solution containing sodium acetate, water, and the dual-end-type/carbinol-modified silicone oil (sodium acetate 54 wt %-water 44 wt %-dual-end-type/carbinol-modified silicone oil 2 wt %) was prepared.

EXAMPLE K9

The preparation and heating of a heat storage material composition were conducted as in Example K1 except that the sodium acetate concentration w in the aqueous sodium acetate solution was changed to 55% by weight, the total weight of sodium acetate trihydrate (analytical grade) and pure water was 25.0 g, and the amount of dual-end-type/carbinol-modified silicone oil added was changed to 1 g. A solution containing sodium acetate, water, and the dual-end-type/carbinol-modified silicone oil (sodium acetate 53 wt %-water 43 wt %-dual-end-type/carbinol-modified silicone oil 4 wt %) was prepared.

The supercooled state-preservation time at −20° C. of this solution was longer than that of Comparative Example A6 described above, and was 1 hour or more and 2 hours or less.

EXAMPLE K10

The preparation and heating of a heat storage material composition were conducted as in Example K1 except that the sodium acetate concentration w in the aqueous sodium acetate solution was changed to 55% by weight, the total weight of sodium acetate trihydrate (analytical grade) and pure water was 25.0 g, and the amount of dual-end-type/carbinol-modified silicone oil added was changed to 1.5 g. A solution containing sodium acetate, water, and the dual-end-type/carbinol-modified silicone oil (sodium acetate 52 wt %-water 42 wt %-dual-end-type/carbinol-modified silicone oil 6 wt %) was prepared.

The supercooled state-preservation time at −20° C. of this solution was longer than that of Comparative Example A7 described above, and was 2 hours or more and 3 hours or less.

EXAMPLE K11

The preparation and heating of a heat storage material composition were conducted as in Example K1 except that the sodium acetate concentration w in the aqueous sodium acetate solution was changed to 53% by weight, the total weight of sodium acetate trihydrate (analytical grade) and pure water was 25.0 g, and the amount of dual-end-type/carbinol-modified silicone oil added was changed to 0.25 g. A solution containing sodium acetate, water, and the dual-end-type/carbinol-modified silicone oil (sodium acetate 52 wt %-water 47 wt %-dual-end-type/carbinol-modified silicone oil 1 wt %) was prepared.

The supercooled state-preservation time at −20° C. of this solution was longer than that of Comparative Example A7 described above, and was 2 hours or more and 3 hours or less.

EXAMPLE K12

The preparation and heating of a heat storage material composition were conducted as in Example K1 except that the sodium acetate concentration w in the aqueous sodium acetate solution was changed to 53% by weight, the total weight of sodium acetate trihydrate (analytical grade) and pure water was 25.0 g, and the amount of dual-end-type/carbinol-modified silicone oil added was changed to 0.5 g. A solution containing sodium acetate, water, and the dual-end-type/carbinol-modified silicone oil (sodium acetate 52 wt %-water 46 wt %-dual-end-type/carbinol-modified silicone oil 2 wt %) was prepared.

The supercooled state-preservation time at −20° C. of this solution was longer than that of Comparative Example A7 described above, and was 1 hour or more and 2 hours or less.

COMPARATIVE EXAMPLE KC1

The preparation and heating of a heat storage material composition were conducted as in Example K1 except that the sodium acetate concentration w in the aqueous sodium acetate solution was changed to 53% by weight, the total weight of sodium acetate trihydrate (analytical grade) and pure water was 25.0 g, and the amount of dual-end-type/carbinol-modified silicone oil added was changed to 1.0 g. A solution containing sodium acetate, water, and the dual-end-type/carbinol-modified silicone oil (sodium acetate 51 wt %-water 45 wt %-dual-end-type/carbinol-modified silicone oil 4 wt %) was prepared.

The supercooled state-preservation time at −20° C. of this solution was shorter than that of Comparative Example A8 described above, and was 1 hour or more and 2 hours or less. In addition, since the concentration Ws of sodium acetate is low, the amount of latent heat per weight of the composition is small.

TABLE 11

| Example and Comparative Example | Alcohol | | Aqueous sodium acetate solution | | Concentration [wt %] | | | Supercooled state-preservation time at −20° C. |
|---|---|---|---|---|---|---|---|---|
| | Type | Amount added [g] | Concentration w [wt %] | Weight [g] | Sodium acetate Ws | Water Ww | Alcohol Wa | |
| K1 | Modified silicone oil | 0.25 g | 57% | 25.0 g | 56% | 43% | 1% | 30 min to 1 h |
| K2 | Modified silicone oil | 0.5 g | 57% | 25.0 g | 56% | 42% | 2% | 30 min to 1 h |
| K3 | Modified silicone oil | 1.0 g | 57% | 25.0 g | 55% | 41% | 4% | 1 to 2 h |
| K4 | Modified silicone oil | 1.5 g | 57% | 25.0 g | 54% | 41% | 6% | 30 min to 1 h |
| K5 | Modified silicone oil | 2.0 g | 57% | 25.0 g | 53% | 40% | 7% | 30 min to 1 h |
| K6 | Modified silicone oil | 2.5 g | 57% | 25.0 g | 52% | 39% | 9% | 30 min to 1 h |
| K7 | Modified silicone oil | 0.25 g | 55% | 25.0 g | 54% | 45% | 1% | 1 to 2 h |
| K8 | Modified silicone oil | 0.5 g | 55% | 25.0 g | 54% | 44% | 2% | 2 to 3 h |
| K9 | Modified silicone oil | 1.0 g | 55% | 25.0 g | 53% | 43% | 4% | 1 to 2 h |
| K10 | Modified silicone oil | 1.5 g | 55% | 25.0 g | 52% | 42% | 6% | 2 to 3 h |
| K11 | Modified silicone oil | 0.25 g | 53% | 25.0 g | 52% | 47% | 1% | 2 to 3 h |
| K12 | Modified silicone oil | 0.5 g | 53% | 25.0 g | 52% | 46% | 2% | 1 to 2 h |
| KC1 | Modified silicone oil | 1.0 g | 53% | 25.0 g | 51% | 45% | 4% | 1 to 2 h |

The results of Examples K1 to K12, Comparative Examples A1 to A9, and Comparative Example KC1 showed that, by adding a dual-end-type/carbinol-modified silicone oil, which is an organic compound having a hydroxy group as a hydrophilic group, to an aqueous sodium acetate solution, the stability of the supercooled state could be improved while a decrease in the thermal storage density was suppressed. In the dual-end-type/carbinol-modified silicone oil, a hydrophobic group corresponds to —$(Si(CH_3)_2$—$O)_n$—.

On the basis of the results of Examples K1 to K12, Comparative Examples A1 to A9, and Comparative Example KC1, a composition range in which the stability of the supercooled state can be made higher than that of existing heat storage material compositions while a decrease in the amount of latent heat is suppressed was found in the heat storage material compositions containing sodium acetate, water, and the dual-end-type/carbinol-modified silicone oil. The composition range will be described below.

Figure 10:
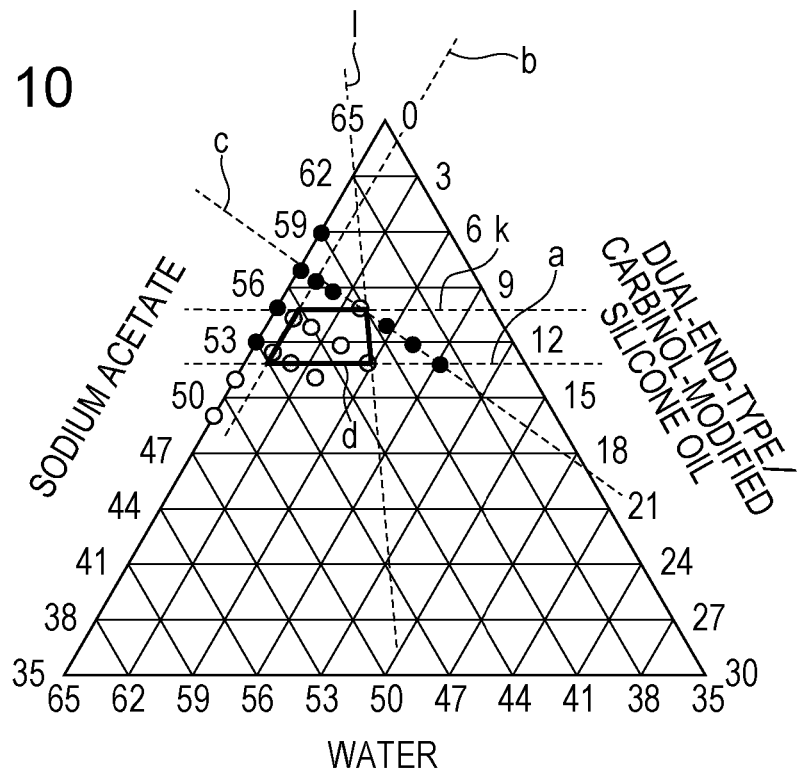
FIG. 10 is a diagram showing a composition range in which the supercooled state is stable in heat storage material compositions containing sodium acetate, water, and a dual-end-type/carbinol-modified silicone oil.

FIG. 10 is a triangular diagram showing the compositions of sodium acetate, water, and the dual-end-type/carbinol-modified silicone oil in units of weight percent. As described with reference to FIG. 1, the broken lines a, b, and c in FIG. 10 respectively indicate Ws=52 (wt %), Wa=1 (wt %), and R=57/43.

Examples K1 to K12 described above each have a composition in the region surrounded by the broken lines a, b, and c. Accordingly, it was confirmed that, also in the case where the dual-end-type/carbinol-modified silicone oil was used, when the composition of the components contained in a heat storage material composition was located in the region surrounded by the broken lines a, b, and c, the stability of the supercooled state could be made higher than that of existing heat storage material compositions while a decrease in the amount of latent heat was suppressed.

In FIG. 10, the stability of the supercooled state can be further improved in a region d (shown by the line d) where the concentration Ws of sodium acetate is 55% by weight or less and the concentration Ww of water is equal to or more than a concentration represented by a straight line (shown by the broken line l) connecting a first point A and a second point B described below, the region d being a part of the region surrounded by the broken lines a, b, and c.

A (sodium acetate: 55 wt %, water: 41 wt %, dual-end-type/carbinol-modified silicone oil: 4 wt %)

B (sodium acetate: 52 wt %, water: 42 wt %, dual-end-type/carbinol-modified silicone oil: 6 wt %)

In FIG. 10, the region d is a region surrounded by the broken line a, the broken line b, the broken line k indicating Ws=55 (wt %), and the broken line l. Among the Examples described above, Example K3 and Examples K7 to K12 each have a composition located in the region d.

(L) Stability of Supercooled State when Methyl orange (sodium 4'-(dimethylamino)azobenzene-4-sulfonate) was Added Next, as in the above cases of the alcohols, methyl orange comprising a hydrophobic group and a hydrophilic group was added to a sodium acetate solution containing sodium acetate as a main component. The effect of the addition of methyl orange on the stability of the supercooled state was examined.

In Examples L1 to L12, heat storage material compositions containing sodium acetate, water, and methyl orange were prepared, and the supercooled state-preservation time of each of the heat storage material compositions was determined. Methyl orange is an example of an amine.

Methods for preparing heat storage material compositions and measurement results of the supercooled state-preservation time of the Examples are described below. The method for measuring the supercooled state-preservation time is the same as that used in Comparative Examples A1 to A9 described above, and thus the description of the method is omitted. Table 12 shows the measurement results of the supercooled state-preservation time of each of the Examples.

EXAMPLE L1

A composition containing sodium acetate trihydrate (analytical grade) manufactured by Kanto Chemical Co., Inc. and pure water was prepared in a glass sample bottle such that the sodium acetate concentration w became 57% by weight. The total weight of sodium acetate and water was adjusted to 25.0 g. Subsequently, the sample bottle containing the composition was placed in a drying furnace set at 70° C. to heat the composition. Thus, an aqueous sodium acetate solution was prepared. Next, 0.25 g of methyl orange was added to the aqueous sodium acetate solution to prepare a heat storage material composition of this Example.

The heat storage material composition was heated in the drying furnace set at 70° C. Thus, a solution containing sodium acetate, water, and methyl orange (sodium acetate 56 wt %-water 43 wt %-methyl orange 1 wt %) was prepared.

The solution was then cooled as in Comparative Examples A1 to A9 described above, and the supercooled state-preservation time at −20° C. was determined. The supercooled state-preservation time at −20° C. of this solution was longer than that of Comparative Example A3 described above, and the effect of the addition of methyl orange was observed. However, the supercooled state-preservation time at −20° C. of this solution was 30 minutes or more and less than 1 hour.

EXAMPLE L2

The preparation and heating of a heat storage material composition were conducted as in Example L1 except that the sodium acetate concentration w in the aqueous sodium acetate solution was 57% by weight, the total weight of sodium acetate trihydrate (analytical grade) and pure water was 25.0 g, and the amount of methyl orange added was changed to 0.5 g. A solution containing sodium acetate, water, and methyl orange (sodium acetate 56 wt %-water 42 wt %-methyl orange 2 wt %) was prepared.

The supercooled state-preservation time at −20° C. of this solution was longer than that of Comparative Example A3 described above, and the effect of the addition of methyl orange was observed. However, the supercooled state-preservation time at −20° C. of this solution was 30 minutes or more and less than 1 hour.

EXAMPLE L3

The preparation and heating of a heat storage material composition were conducted as in Example L1 except that the sodium acetate concentration w in the aqueous sodium acetate solution was 57% by weight, the total weight of sodium acetate trihydrate (analytical grade) and pure water was 25.0 g, and the amount of methyl orange added was changed to 1.0 g. A solution containing sodium acetate, water, and methyl orange (sodium acetate 55 wt %-water 41 wt %-methyl orange 4 wt %) was prepared.

The supercooled state-preservation time at −20° C. of this solution was longer than that of Comparative Example A4 described above, and the effect of the addition of methyl orange was observed. However, the supercooled state-preservation time at −20° C. of this solution was 30 minutes or more and less than 1 hour.

EXAMPLE L4

The preparation and heating of a heat storage material composition were conducted as in Example L1 except that the sodium acetate concentration w in the aqueous sodium acetate solution was 57% by weight, the total weight of sodium acetate trihydrate (analytical grade) and pure water was 25.0 g, and the amount of methyl orange added was changed to 1.5 g. A solution containing sodium acetate, water, and methyl orange (sodium acetate 54 wt %-water 41 wt %-methyl orange 6 wt %) was prepared.

The supercooled state-preservation time at −20° C. of this solution was longer than that of Comparative Example A5 described above, and the effect of the addition of methyl orange was observed. However, the supercooled state-preservation time at −20° C. of this solution was 30 minutes or more and less than 1 hour.

EXAMPLE L5

The preparation and heating of a heat storage material composition were conducted as in Example L1 except that the sodium acetate concentration w in the aqueous sodium acetate solution was 57% by weight, the total weight of sodium acetate trihydrate (analytical grade) and pure water was 25.0 g, and the amount of methyl orange added was changed to 2.0 g. A solution containing sodium acetate, water, and methyl orange (sodium acetate 53 wt %-water 40 wt %-methyl orange 7 wt %) was prepared.

The supercooled state-preservation time at −20° C. of this solution was longer than that of Comparative Example A6 described above, and the effect of the addition of methyl orange was observed. However, the supercooled state-preservation time at −20° C. of this solution was 30 minutes or more and less than 1 hour.

EXAMPLE L6

The preparation and heating of a heat storage material composition were conducted as in Example L1 except that the sodium acetate concentration w in the aqueous sodium acetate solution was 57% by weight, the total weight of sodium acetate trihydrate (analytical grade) and pure water was 25.0 g, and the amount of methyl orange added was changed to 2.5 g. A solution containing sodium acetate, water, and methyl orange (sodium acetate 52 wt %-water 39 wt %-methyl orange 9 wt %) was prepared.

The supercooled state-preservation time at −20° C. of this solution was longer than that of Comparative Example A7 described above, and the effect of the addition of methyl orange was observed. However, the supercooled state-preservation time at −20° C. of this solution was 30 minutes or more and less than 1 hour.

EXAMPLE L7

The preparation and heating of a heat storage material composition were conducted as in Example L1 except that the sodium acetate concentration w in the aqueous sodium acetate solution was changed to 55% by weight, the total weight of sodium acetate trihydrate (analytical grade) and pure water was 25.0 g, and the amount of methyl orange added was changed to 0.25 g. A solution containing sodium acetate, water, and methyl orange (sodium acetate 54 wt %-water 45 wt %-methyl orange 1 wt %) was prepared.

The supercooled state-preservation time at −20° C. of this solution was longer than that of Comparative Example A5 described above, and the effect of the addition of methyl orange was observed. However, the supercooled state-preservation time at −20° C. of this solution was 30 minutes or more and less than 1 hour.

EXAMPLE L8

The preparation and heating of a heat storage material composition were conducted as in Example L1 except that the sodium acetate concentration w in the aqueous sodium acetate solution was changed to 55% by weight, the total weight of sodium acetate trihydrate (analytical grade) and pure water was 25.0 g, and the amount of methyl orange added was changed to 0.5 g. A solution containing sodium acetate, water, and methyl orange (sodium acetate 54 wt %-water 44 wt %-methyl orange 2 wt %) was prepared.

The supercooled state-preservation time at −20° C. of this solution was longer than that of Comparative Example A5 described above, and the effect of the addition of methyl orange was observed. However, the supercooled state-preservation time at −20° C. of this solution was 30 minutes or more and less than 1 hour.

EXAMPLE L9

The preparation and heating of a heat storage material composition were conducted as in Example L1 except that the sodium acetate concentration w in the aqueous sodium acetate solution was changed to 55% by weight, the total weight of sodium acetate trihydrate (analytical grade) and pure water was 25.0 g, and the amount of methyl orange added was changed to 1 g. A solution containing sodium acetate, water, and methyl orange (sodium acetate 53 wt %-water 43 wt %-methyl orange 4 wt %) was prepared.

The supercooled state-preservation time at −20° C. of this solution was longer than that of Comparative Example A6 described above, and was 1 hour or more and 2 hours or less.

EXAMPLE L10

The preparation and heating of a heat storage material composition were conducted as in Example L1 except that the sodium acetate concentration w in the aqueous sodium acetate solution was changed to 55% by weight, the total weight of sodium acetate trihydrate (analytical grade) and pure water was 25.0 g, and the amount of methyl orange added was changed to 1.5 g. A solution containing sodium acetate, water, and methyl orange (sodium acetate 52 wt %-water 42 wt %-methyl orange 6 wt %) was prepared.

The supercooled state-preservation time at −20° C. of this solution was longer than that of Comparative Example A7 described above, and the effect of the addition of methyl orange was observed. However, the supercooled state-preservation time at −20° C. of this solution was 30 minutes or more and less than 1 hour.

EXAMPLE L11

The preparation and heating of a heat storage material composition were conducted as in Example L1 except that the sodium acetate concentration w in the aqueous sodium acetate solution was changed to 53% by weight, the total weight of sodium acetate trihydrate (analytical grade) and pure water was 25.0 g, and the amount of methyl orange added was changed to 0.25 g. A solution containing sodium acetate, water, and methyl orange (sodium acetate 52 wt %-water 47 wt %-methyl orange 1 wt %) was prepared.

The supercooled state-preservation time at −20° C. of this solution was longer than that of Comparative Example A7 described above, and the effect of the addition of methyl orange was observed. However, the supercooled state-preservation time at −20° C. of this solution was 30 minutes or more and less than 1 hour.

EXAMPLE L12

The preparation and heating of a heat storage material composition were conducted as in Example L1 except that the sodium acetate concentration w in the aqueous sodium acetate solution was changed to 53% by weight, the total weight of sodium acetate trihydrate (analytical grade) and pure water was 25.0 g, and the amount of methyl orange added was changed to 0.5 g. A solution containing sodium acetate, water, and methyl orange (sodium acetate 52 wt %-water 46 wt %-methyl orange 2 wt %) was prepared.

The supercooled state-preservation time at −20° C. of this solution was longer than that of Comparative Example A7 described above, and was 1 hour or more and 2 hours or less.

and c. Accordingly, it was confirmed that, also in the case where methyl orange was used, when the composition of the components contained in a heat storage material composition was located in the region surrounded by the broken lines a, b, and c, the stability of the supercooled state could be made higher than that of existing heat storage material compositions while a decrease in the amount of latent heat was suppressed.

Figure 11:
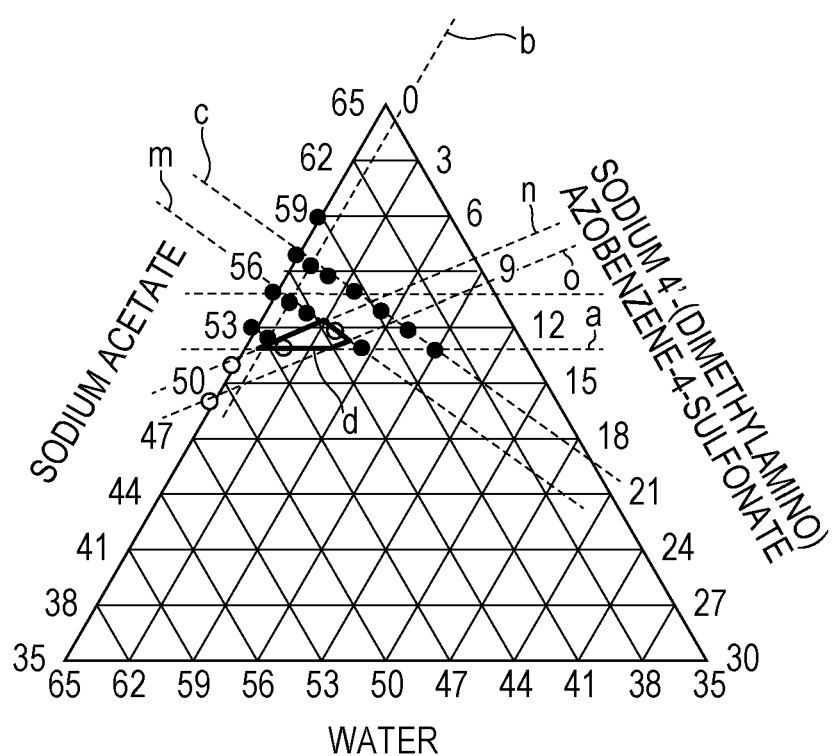
FIG. 11 is a diagram showing a composition range in which the supercooled state is stable in heat storage material compositions containing sodium acetate, water, and methyl orange.

In FIG. 11, the stability of the supercooled state can be further improved in a region d (shown by the line d) where the weight ratio R of sodium acetate to water is 55/45 or less, the concentration Ww of water is equal to or less than a concentration represented by a straight line (shown by the broken line n) connecting a first point A and a second point B described below, and the concentration Ww of water is equal to or more than a concentration represented by a straight line (shown by the broken line o) connecting a first point C and a second point D described below, the region d being a part of the region surrounded by the broken lines a, b, and c.

A (sodium acetate: 53.5 wt %, water: 43.5 wt %, methyl orange: 3 wt %)
B (sodium acetate: 52.5 wt %, water: 46 wt %, methyl orange: 1.5 wt %)
C (sodium acetate: 52.5 wt %, water: 42.5 wt %, methyl orange: 5 wt %)
D (sodium acetate: 52 wt %, water: 44 wt %, methyl orange: 4 wt %)

TABLE 12

| Example | Amine Type | Amine Amount added [g] | Aqueous sodium acetate solution Concentration w [wt %] | Aqueous sodium acetate solution Weight [g] | Concentration [wt %] Sodium acetate Ws | Concentration [wt %] Water Ww | Concentration [wt %] Amine Wa | Supercooled state-preservation time at −20° C. |
|---|---|---|---|---|---|---|---|---|
| L1 | Methyl orange | 0.25 g | 57% | 25.0 g | 56% | 43% | 1% | 30 min to 1 h |
| L2 | Methyl orange | 0.5 g | 57% | 25.0 g | 56% | 42% | 2% | 30 min to 1 h |
| L3 | Methyl orange | 1.0 g | 57% | 25.0 g | 55% | 41% | 4% | 30 min to 1 h |
| L4 | Methyl orange | 1.5 g | 57% | 25.0 g | 54% | 41% | 6% | 30 min to 1 h |
| L5 | Methyl orange | 2.0 g | 57% | 25.0 g | 53% | 40% | 7% | 30 min to 1 h |
| L6 | Methyl orange | 2.5 g | 57% | 25.0 g | 52% | 39% | 9% | 30 min to 1 h |
| L7 | Methyl orange | 0.25 g | 55% | 25.0 g | 54% | 45% | 1% | 30 min to 1 h |
| L8 | Methyl orange | 0.5 g | 55% | 25.0 g | 54% | 44% | 2% | 30 min to 1 h |
| L9 | Methyl orange | 1.0 g | 55% | 25.0 g | 53% | 43% | 4% | 1 to 2 h |
| L10 | Methyl orange | 1.5 g | 55% | 25.0 g | 52% | 42% | 6% | 30 min to 1 h |
| L11 | Methyl orange | 0.25 g | 53% | 25.0 g | 52% | 47% | 1% | 30 min to 1 h |
| L12 | Methyl orange | 0.5 g | 53% | 25.0 g | 52% | 46% | 2% | 1 to 2 h |

The results of Examples L1 to L12 and Comparative Examples A1 to A9 showed that, by adding methyl orange, which is an amine, to an aqueous sodium acetate solution, the stability of the supercooled state could be improved while a decrease in the thermal storage density was suppressed.

On the basis of the results of Examples L1 to L12 and Comparative Examples A1 to A9, a composition range in which the stability of the supercooled state can be made higher than that of existing heat storage material compositions while a decrease in the amount of latent heat is suppressed was found in the heat storage material compositions containing sodium acetate, water, and methyl orange. The composition range will be described below.

FIG. 11 is a triangular diagram showing the compositions of sodium acetate, water, and methyl orange in units of weight percent. As described with reference to FIG. 1, the broken lines a, b, and c in FIG. 11 respectively indicate Ws=52 (wt %), Wa=1 (wt %), and R=57/43.

Examples L1 to L12 described above each have a composition in the region surrounded by the broken lines a, b, In FIG. 11, the region d is a region surrounded by the broken line a, the broken line m indicating R=55/45, the broken line n, and the broken line o. Among the Examples described above, Examples L9 and L12 each have a composition located in the region d.

(M) Examination of Mechanism for Improving Stability of Supercooled State

Next, the mechanism for improving the stability of a supercooled state was examined by nuclear magnetic resonance (NMR) analysis.

In this experiment, measurement samples in which different types of alcohols were added to sodium acetate were prepared by the procedure described below.

First, samples for the measurement were prepared by mixing sodium acetate with an alcohol such that the number of moles of an OH group of the alcohol became the same as the number of moles of sodium acetate. The concentration of each of the samples was adjusted to 0.0055 mol/g. Specifically, an equimolar amount of a monohydric alcohol was mixed relative to one mole of sodium acetate, ½ a mole of a dihydric alcohol was mixed relative to one mole of sodium acetate, and ⅓ a mole of a trihydric alcohol was mixed relative to one mole of sodium acetate. For comparison, a sample (blank) containing sodium acetate alone was also prepared.

Among the alcohols, butanol is not easily dissolved. Accordingly, a sample was prepared by mixing butanol with sodium acetate as described above, and then diluting the resulting mixture with pure water by 6-fold. Furthermore, the following two samples were also prepared in order to make a comparison, under the same condition, with the sample to which butanol was added. Specifically, a sample was prepared by diluting the above sample (blank) containing sodium acetate alone by 6-fold, and another sample was prepared by adding 1-propanol to sodium acetate and then diluting the resulting mixture by 6-fold.

In the 13C-NMR analysis, a nuclear magnetic resonance spectrometer AVANCE 500 (manufactured by Bruker Corporation) was used as the apparatus, and a deuterated chloroform ($CDCl_3$) double tube was used as a lock solvent. In this experiment, the above samples were measured at a temperature of 35° C. and a number of acquisitions of 512.

Figure 12:
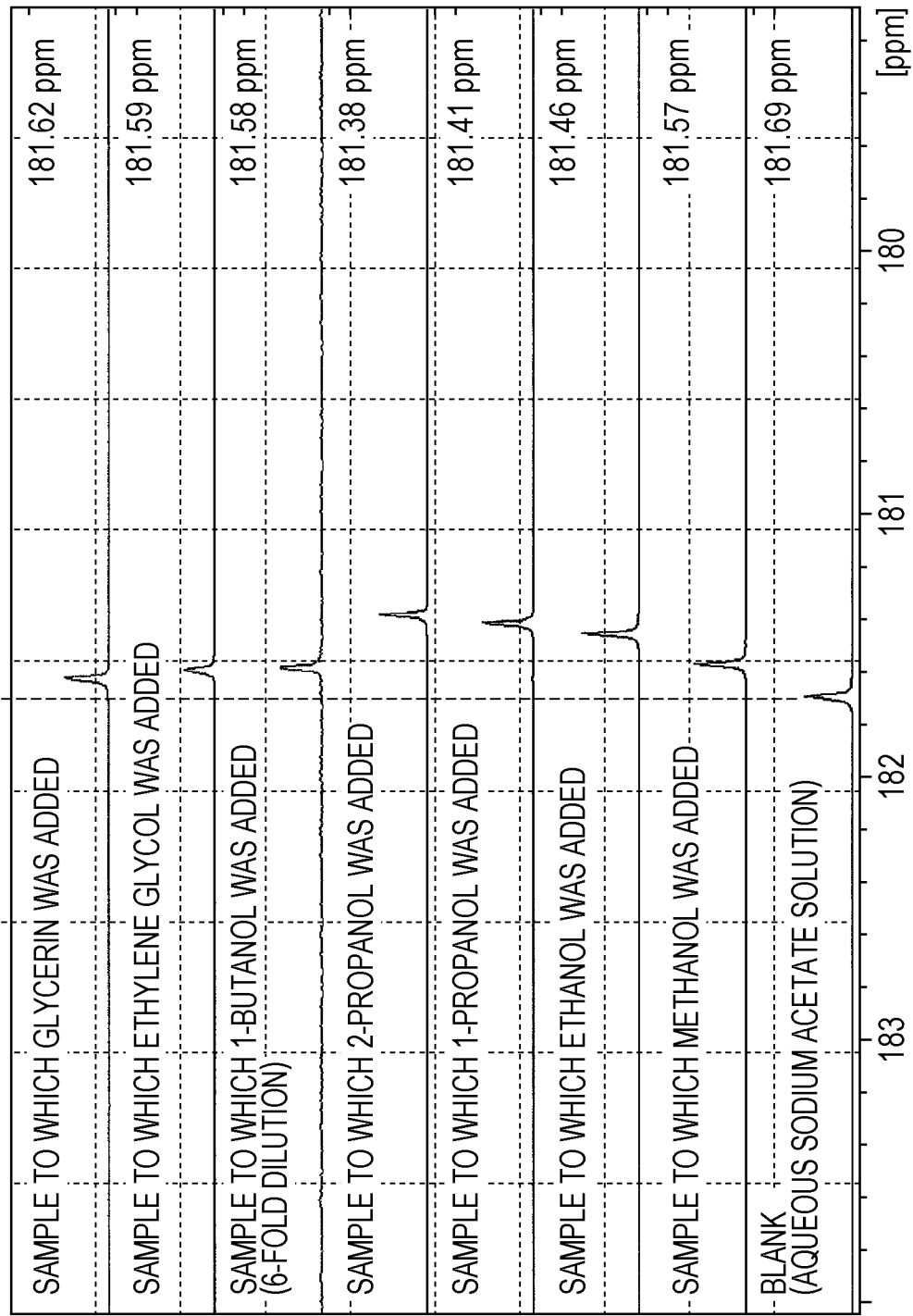
FIG. 12 is an enlarged chart showing the vicinity of a C=O peak of 13C-NMR spectra of samples containing an alcohol and sodium acetate.
Figure 13:
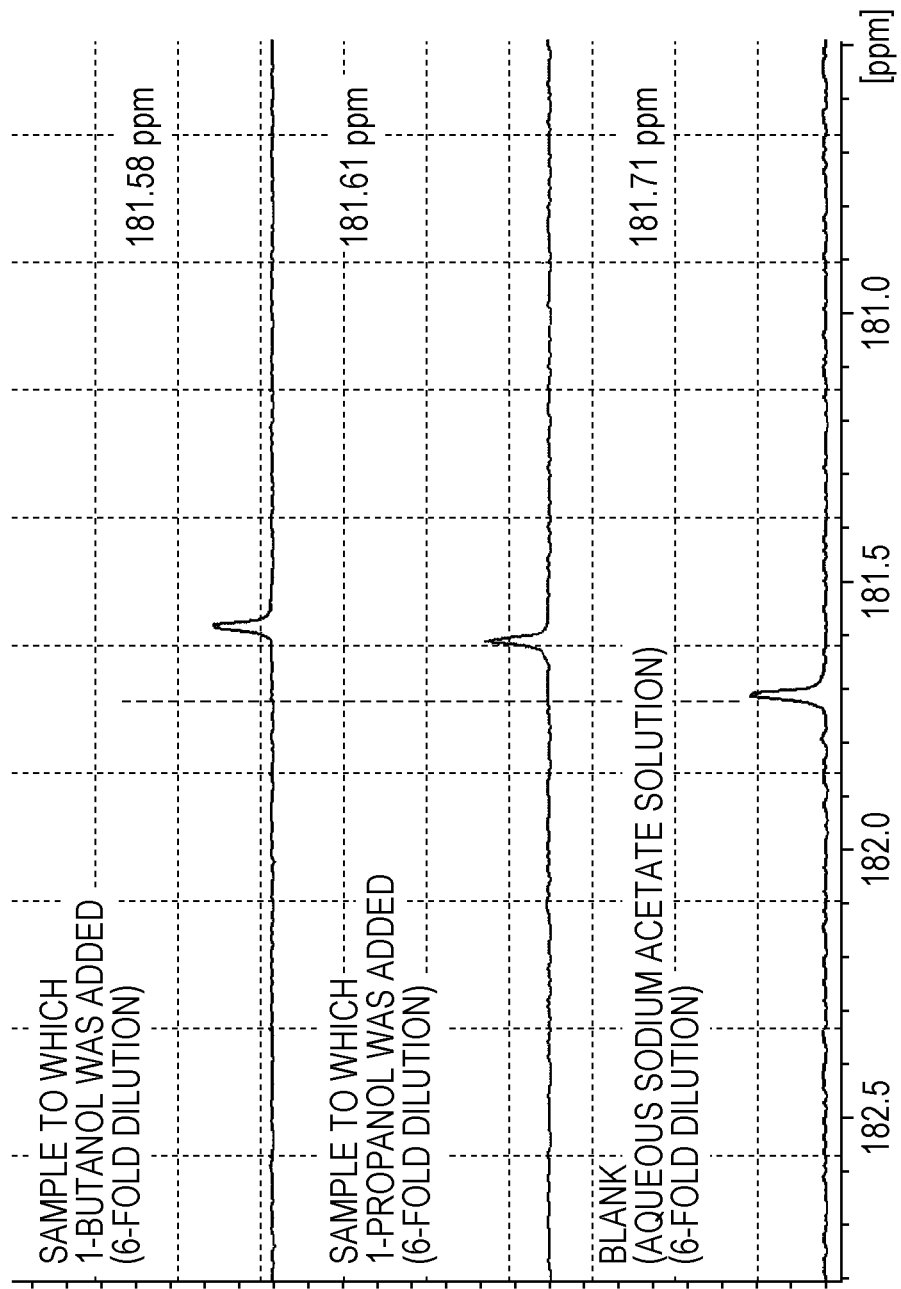
FIG. 13 is an enlarged chart showing the vicinity of a C=O peak of 13C-NMR spectra of samples containing an alcohol and sodium acetate and diluted with pure water by 6-fold.

The measurement results are shown in FIGS. 12 and 13.

FIG. 12 is an enlarged chart showing the vicinity of a C=O peak of 13C-NMR spectra. FIG. 13 is an enlarged chart showing the vicinity of a C=O peak of 13C-NMR spectra of samples diluted by 6-fold.

In FIG. 12, the position of the peak of the sample of sodium acetate alone (blank) is used as a reference. As is apparent from FIG. 12, regarding the samples to which a monohydric alcohol was added (0.0055 mol/g), the position of the peak was shifted to the right side (high-magnetic field side) from the reference position. More specifically, with an increase in the carbon number from methanol to 1-propanol, the amount by which the position of the peak is shifted to the right side increased. Furthermore, as is apparent from the results shown in FIG. 13, the amount by which the position of the peak of the sample containing butanol was shifted to the right side (high-magnetic field side) was larger than the amount by which the position of the peak of the sample containing propanol was shifted to the right side. These results show that the larger the carbon number of an alcohol, the larger the amount by which the position of the peak due to a carbonyl group is shifted to the high-magnetic field side. Furthermore, the amount by which the position of the peak of a branched chain alcohol was shifted to the right side (high-magnetic field side) was larger than the amount by which the position of the peak of a straight-chain alcohol was shifted to the right side. It is believed that the larger the amount by which the position of the peak is shifted to the high-magnetic field side, the larger the interaction between the alcohol and sodium acetate. It is believed that the shift to the high-magnetic field side depends on the electron-donating property of a hydrocarbon group (hydrophobic group) of an alcohol. It is also believed that, with an increase in the carbon number of an alcohol, the hydrocarbon group (hydrophobic group) of the alcohol are more easily present around a sodium acetate ion, and consequently, the interaction between the electron-withdrawing carboxyl group of sodium acetate and the electron-donating hydrocarbon group (hydrophobic group) of the alcohol increases.

Regarding the samples of sodium acetate alone (blank) and the samples to which propanol was added, comparing the peak positions shown in FIG. 12 with the peak positions in the case of the 6-fold dilution (FIG. 13), the peaks were shifted to the low-magnetic field side by diluting the samples (that is, by decreasing the concentration of the solute).

On the other hand, regarding the samples to which a polyhydric alcohol such as ethylene glycol or glycerin was added, the amount of shift to the high-magnetic field side was smaller than those of samples to which a monohydric alcohol was added. The reason for this is believed to be as follows. The electron-donating properties of alcohols increase with an increase in the chain length of a portion of a hydrocarbon group, the portion being apart from an OH group. The chain length of such a portion of a hydrocarbon group of polyhydric alcohols, the portion being apart from an OH group, is shorter than that of monohydric alcohols. Consequently, the electron-donating properties of polyhydric alcohols are lower than those of monohydric alcohols.

From the results of the NMR analysis and the results described in (A) to (J), it is confirmed that the magnitude of the amount of shift to the high-magnetic field side (magnitude of the interaction) and the effect of suppressing crystallization of sodium acetate trihydrate are related to each other. That is, it is believed that the larger the interaction between sodium acetate, water, and an alcohol becomes, the more crystallization (coagulation) of sodium acetate trihydrate is suppressed and the more supercooling is accelerated. Specifically, crystallization (coagulation) of sodium acetate trihydrate is suppressed by the interaction between the carbonyl group of sodium acetate and a hydrocarbon group (hydrophobic group) of an alcohol and the interaction between a water molecule in sodium acetate trihydrate and an OH group (hydrophilic group) of the alcohol. Therefore, the use of n-butyl alcohol, which has a long carbon chain, as an alcohol can increase the interactions. Accordingly, crystallization of sodium acetate trihydrate is further suppressed and the stability of the supercooled state can be improved.

In the above Examples, cases where an alcohol is added to an aqueous sodium acetate solution have been examined. It is believed that similar results are obtained also in the cases where an organic compound other than alcohols, the organic compound comprising a hydrophobic group and a hydrophilic group, is added to an aqueous sodium acetate solution. Specifically, crystallization (coagulation) of sodium acetate trihydrate is suppressed by the interaction between the carbonyl group of sodium acetate and the hydrophobic group of the organic compound and the interaction between water and the hydrophilic group of the organic compound. In addition, when the hydrophobic group is a hydrocarbon group, the larger the carbon number, the larger the interactions become. Thus, crystallization of sodium acetate trihydrate is further suppressed, and the stability of the supercooled state can be improved.

(N) Method for Storing Heat

Figure 14:
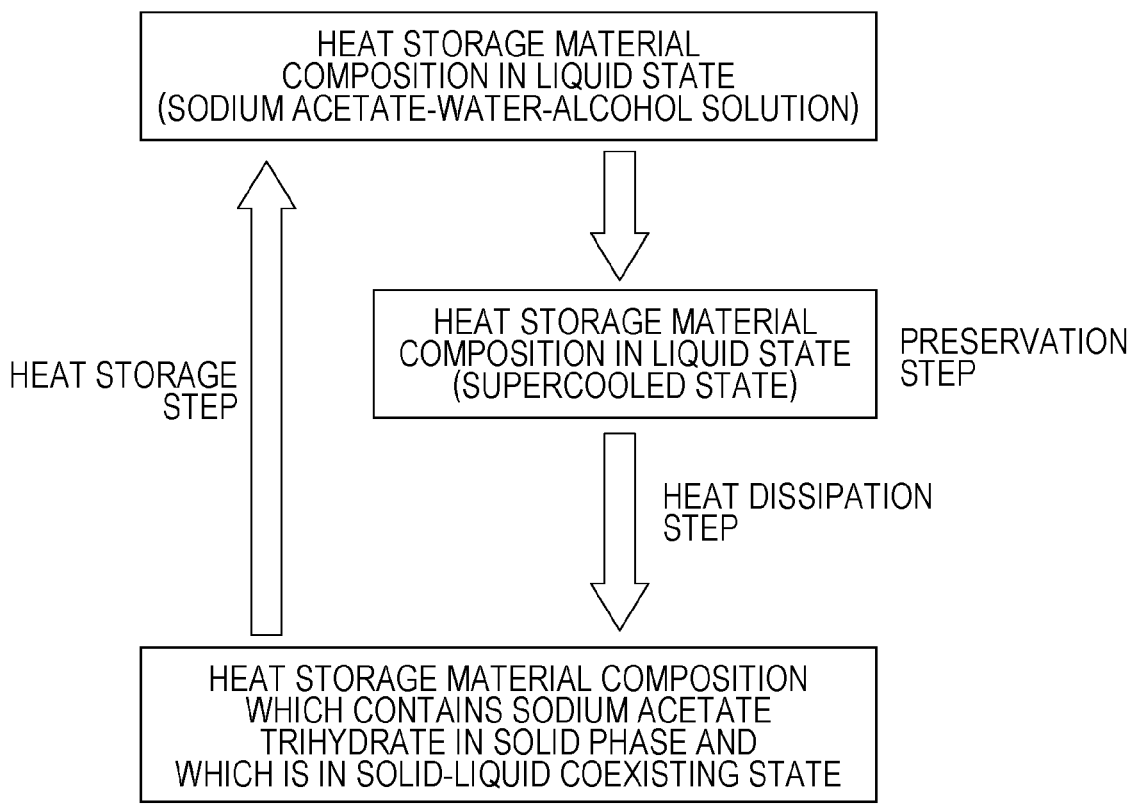
FIG. 14 is a diagram showing an example of a method for storing heat according to an embodiment.

An example of a method for storing heat using the heat storage material composition according to the present embodiment will be described with reference to FIG. 14.

First, a heat storage material composition in a first state, the heat storage material composition being contained in a heat storage material container, is prepared. The term "first state" refers to a state of a heat storage material composition before heat storage. The first state is, for example, a solid-liquid coexisting state of a heat storage material composition containing sodium acetate trihydrate which is in a solid phase.

The heat storage material composition in the first state, the heat storage material composition being contained in the heat storage material container, is then heated to a first temperature (for example, 70° C.) equal to or higher than a phase-change temperature of sodium acetate trihydrate by allowing a heat medium to flow such that heat exchange is performed between the heat medium and the heat storage material container (heat storage step). As a result, sodium acetate trihydrate is melted and the state of the heat storage material composition is changed to a second state. The term "second state" refers to a state of a heat storage material composition in which heat is stored by the melting of sodium acetate trihydrate. The second state is, for example, a liquid state (sodium acetate-water-alcohol solution).

The heat storage material composition in the second state is then preserved in the heat storage material container at a second temperature (−20° C. or higher and 25° C. or lower, for example, −20° C.) lower than the phase-change temperature of sodium acetate trihydrate (supercooling preservation step). The temperature of the heat storage material composition may be decreased to the second temperature by, for example, stopping the heating with the heat medium. The heat storage material composition is preserved in the second state (liquid state). Accordingly, the preserved heat storage material composition is in a supercooled state.

Sodium acetate trihydrate in the heat storage material composition in the second state, the heat storage material composition being preserved in the heat storage material container, is then coagulated, as required (supercooling-releasing step). As a result, the state of the heat storage material composition is changed to the first state. The method for coagulating sodium acetate trihydrate (supercooling releasing device) is not particularly limited, and a known method can be used. For example, Patent Literature 1 discloses that crystallization of sodium acetate trihydrate is induced by providing a stimulus with a metal bar or the like.

When sodium acetate trihydrate is coagulated, latent heat is released from the heat storage material composition. At least part of the released heat is recovered (heat recovery step). The heat may be recovered by, for example, allowing a heat medium to flow such that heat exchange is performed between the heat medium and the heat storage material container.

Figure 15:
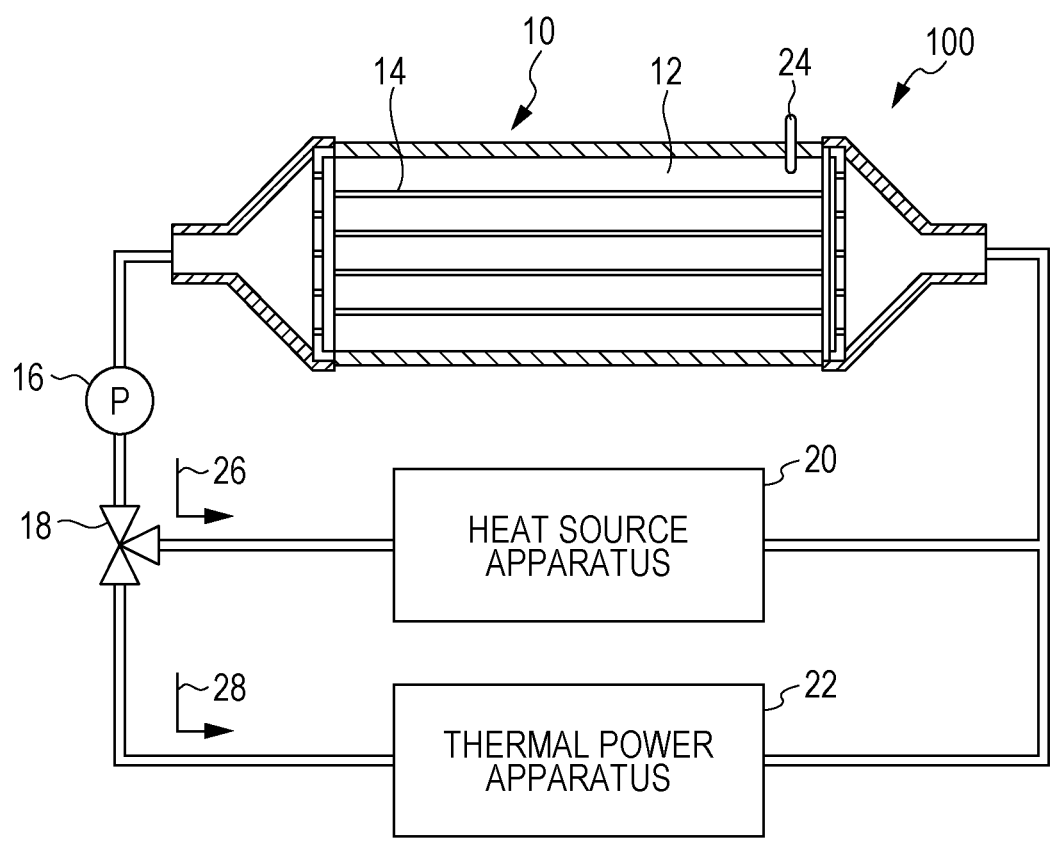
FIG. 15 is a schematic view showing an example of the structure of a heat storage system according to an embodiment.

An example of a heat storage system for performing the above method for storing heat will be described with reference to FIG. 15.

A heat storage system 100 includes a heat storage apparatus 10, a heat source apparatus 20, a thermal power apparatus 22, and a heat medium flow conduit 14 that allows a heat medium to flow through the heat storage apparatus 10, the heat source apparatus 20, and the thermal power apparatus 22. The heat storage apparatus 10 includes a container 12 that contains a heat storage material composition and a supercooling releasing device 24 for releasing a supercooled state of the heat storage material composition. A pump 16 and a three-way valve 18 are provided in the heat medium flow conduit 14. The heat medium flow conduit 14 is configured so that the heat medium can be subjected to heat exchange with the heat storage material composition through the container 12.

In the heat storage step, the heat medium (for example, water) is allowed to flow in the direction shown by an arrow 26. The heat medium circulates through the heat storage apparatus 10 and the heat source apparatus 20, and heats the heat storage material composition in the heat storage apparatus 10. As a result, sodium acetate trihydrate in the heat storage material composition is melted, and the state of the heat storage material composition is changed to the second state.

In the supercooling preservation step, for example, the flow of the heat medium is stopped. As a result, the temperature of the heat storage material composition decreases, and the state of the heat storage material composition is changed to a supercooled state. If necessary, the heat storage material composition may be heated to a particular temperature by allowing the heat medium to flow in accordance with the change in the outside temperature.

In the supercooling-releasing step and the heat recovery step, sodium acetate trihydrate in the heat storage material composition is coagulated in the container 12 by using the supercooling releasing device 24 to release heat from the heat storage material composition. In this case, the heat medium (for example, water) is allowed to flow in the direction shown by an arrow 28. The heat medium circulates through the heat storage apparatus 10 and the thermal power apparatus 22. Thus, heat released from the heat storage material composition can be recovered to the thermal power apparatus 22. The recovered heat is used from the thermal power apparatus 22 according to use such as heating or hot-water supply.

The method for storing heat according to the present embodiment is not limited to the above method. However, it is believed that, considering the content of sodium acetate, the fluidity of the heat storage material composition in the first state is not high. Therefore, it is useful to perform the heat storage step to the heat recovery step in a state where the heat storage material composition is contained in a heat storage material container, as described above. The heat storage material composition according to the present embodiment may be used in other systems having various structures besides the heat storage system shown in FIG. 15. The heat storage material composition according to the present embodiment may be used in, for example, the heat storage system disclosed in Patent Literature 1. The entire contents of the disclosure of Patent Literature 1 are incorporated by reference herein in its entirety. The heat storage material composition used in the method for storing heat according to the present embodiment is not limited to the above examples containing sodium acetate, water, and an alcohol as essential components. The form of the heat storage material composition is not particularly limited as long as the heat storage material composition contains, as essential components, sodium acetate, water, and an organic compound comprising a hydrophobic group and a hydrophilic group. The heat storage material composition used in the method for storing heat according to the present embodiment may contain, for example, sodium acetate, water, and an amine as essential components.

The heat storage material composition according to an embodiment of the present disclosure can be used in various heat storage apparatuses or systems. In particular, the heat storage material composition in the supercooled state can be stably preserved even in an environment at a low temperature (for example, −20° C.) equal to or lower than the freezing point, such as cold regions. Accordingly, the heat storage material composition may be used in, for example, a heat storage apparatus in which waste heat of an internal combustion engine of an automobile or a boiler or the like is used as a heat source.

What is claimed is:
1. A heat storage material composition comprising:
sodium acetate;
water; and
an organic compound comprising a hydrophobic group and a hydrophilic group that is selected from the group consisting of methanol, ethanol, 1-propanol, 2-propanol, n-butyl alcohol, and tert-butyl alcohol,
wherein a concentration $W_s$ is a concentration of the sodium acetate, wherein a concentration Wa is a concentration of the organic compound comprising a hydrophobic group and a hydrophilic group, wherein a concentration Ww is a concentration of the water, wherein, when the organic compound is methanol, the heat storage material composition has a weight ratio R of the sodium acetate to the water is 55/45 or more and 57/43 or less, the concentration Ws is 52% by weight or more, and the concentration Wa is 1% by weight or more, wherein, when the organic compound is ethanol, the heat storage material composition is derivable from a triangular diagram that shows a composition of the sodium acetate, the water, and the ethanol in units of weight percent, the heat storage material composition being defined by a region surrounded by lines connecting three points, where
- a first of the three points indicating that the concentration Ws of the sodium acetate is 53 wt %, the concentration Ww of the water is 40 wt %, and the concentration Wa of the ethanol is 7 wt %,
- a second of the three points indicating that the concentration Ws of the sodium acetate is 52 wt %, the concentration Ww of the water is 39 wt %, and the concentration Wa of the ethanol is 9 wt %, and
- a third of the three points indicating that the concentration Ws of the sodium acetate is 52 wt %, the concentration Ww of the water is 42 wt %, and the concentration Wa of the ethanol is 6 wt %, and wherein, when the organic compound is 1-propanol, the heat storage material composition has a weight ratio R of the sodium acetate to the water is 57/43 or less, the concentration Ws is 52% by weight or more, and the concentration Wa of the 1-propanol is 1% by weight or more, wherein, when the organic compound is 2-propanol, the heat storage material composition has a weight ratio R of the sodium acetate to the water is 55/45 or less, the concentration Ws is 52% by weight or more, and the concentration Wa of the 2-propanol is 2% by weight or more, wherein, when the organic compound is n-butyl alcohol, in a triangular diagram that shows a composition of the sodium acetate, the water, and the n-butyl alcohol in units of weight percent, the concentration Wa of the n-butyl alcohol is equal to or more than a concentration represented by a straight line connecting a first point A and a second point B, where
- the first point A indicating that the concentration Ws of the sodium acetate is 52 wt %, the concentration Ww of the water is 47 wt %, and the concentration Wa of the n-butyl alcohol is 1 wt %,
- the second point B indicating that the concentration Ws of the sodium acetate is 56 wt %, the concentration Ww of the water is 42 wt %, and the concentration Wa of the n-butyl alcohol is 2 wt %, the concentration Ws is 52% by weight or more, and
the weight ratio R of the sodium acetate to the water is 57/43 or less, and wherein, when the organic compound is tert-butyl alcohol, the heat storage material composition has a weight ratio R of the sodium acetate to the water is 55/45 or more and 57/43 or less, the concentration Ws is 52% by weight or more, and the concentration Wa of the tert-butyl alcohol is 2% by weight or more.

2. A method comprising the steps of:
(a) heating the heat storage material composition of claim 1 in a first state, the heat storage material composition containing sodium acetate trihydrate in a solid phase and being contained in a heat storage material container, to a first temperature equal to or higher than a phase-change temperature of the sodium acetate trihydrate by allowing a heat medium to flow such that heat exchange is performed between the heat medium and the heat storage material container to thereby melt the sodium acetate trihydrate and change the state of the heat storage material composition to a second state;
(b) preserving the heat storage material composition in the second state in the heat storage material container at a second temperature lower than the phase-change temperature of the sodium acetate trihydrate;
(c) coagulating the sodium acetate trihydrate in the heat storage material container to thereby change the state of the preserved heat storage material composition in the second state to the first state; and
(d) recovering at least part of heat released from the heat storage material composition by coagulation of the sodium acetate trihydrate by allowing a heat medium to flow such that heat exchange is performed between the heat medium and the heat storage material container.

* * * * *